(12) United States Patent
Orio et al.

(10) Patent No.: US 11,710,440 B2
(45) Date of Patent: Jul. 25, 2023

(54) DISPLAY DRIVER, IMAGE PROCESSING CIRCUITRY, AND METHOD

(71) Applicant: Synaptics Incorporated, San Jose, CA (US)

(72) Inventors: Masao Orio, Tokyo (JP); Hirobumi Furihata, Tokyo (JP); Kazutoshi Aogaki, Tokyo (JP); Takashi Nose, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/880,603

(22) Filed: Aug. 3, 2022

(65) Prior Publication Data

US 2022/0383797 A1 Dec. 1, 2022

Related U.S. Application Data

(63) Continuation of application No. 16/622,788, filed as application No. PCT/JP2018/022735 on Jun. 14, 2018, now Pat. No. 11,436,968.

(30) Foreign Application Priority Data

Jun. 16, 2017 (JP) .................................. 2017-118497
Jun. 19, 2017 (JP) .................................. 2017-119507

(51) Int. Cl.
*G09G 3/20* (2006.01)
*G09G 3/3208* (2016.01)
*G09G 3/36* (2006.01)

(52) U.S. Cl.
CPC ......... *G09G 3/2074* (2013.01); *G09G 3/3208* (2013.01); *G09G 3/3607* (2013.01);
(Continued)

(58) Field of Classification Search
CPC .. G09G 3/2074; G09G 3/3208; G09G 3/3607; G09G 2300/0452;
(Continued)

(56) References Cited

U.S. PATENT DOCUMENTS 7,277,075 B1 10/2007 Hirano et al.
2005/0001815 A1 1/2005 Tsunoda
(Continued)

FOREIGN PATENT DOCUMENTS

JP 2001147666 A 5/2001
JP 2005025170 A 1/2005
(Continued)

OTHER PUBLICATIONS

Application No. PCT/JP2018/022735, International Preliminary Report on Patentability, dated Dec. 26, 2019 (8 pages).

*Primary Examiner* — Kenneth B Lee, Jr.
(74) *Attorney, Agent, or Firm* — Ferguson Braswell Fraser Kubasta PC

(57) ABSTRACT

A display driver that drives a display panel comprises storage circuitry, color addition processing circuitry, and drive circuitry. The storage circuitry stores F subpixel data acquired from color coordinate data indicating color coordinates of a displayed color in a predetermined color space displayed on the display panel when an R subpixel, a G subpixel, and a B subpixel in each of a plurality of pixels of the display panel are driven with drive signals corresponding to a minimum grayscale value and an F subpixel in each of the plurality of pixels which displays an additional color other than a primary color R, a primary color G, and a primary color B is driven with a drive signal corresponding to a maximum grayscale value. The color addition process-
(Continued)

ing circuitry generates output FRGB data from input RGB data, in response to the F subpixel data stored in the storage circuitry.

20 Claims, 25 Drawing Sheets

(52) U.S. Cl.
CPC ............ *G09G 2300/0452* (2013.01); *G09G 2320/0666* (2013.01); *G09G 2320/0673* (2013.01); *G09G 2340/06* (2013.01); *G09G 2360/16* (2013.01)

(58) Field of Classification Search
CPC ... G09G 2320/0666; G09G 2320/0673; G09G 2340/06; G09G 2360/16
See application file for complete search history.

(56) References Cited

U.S. PATENT DOCUMENTS

| 2007/0139437 | A1* | 6/2007 | Boroson ............. H01L 27/3213 345/590 |
|---|---|---|---|
| 2009/0102769 | A1 | 4/2009 | Kouno et al. |

FOREIGN PATENT DOCUMENTS

| JP | 2009103926 A | 5/2009 |
|---|---|---|
| JP | 2009520241 A | 5/2009 |

* cited by examiner

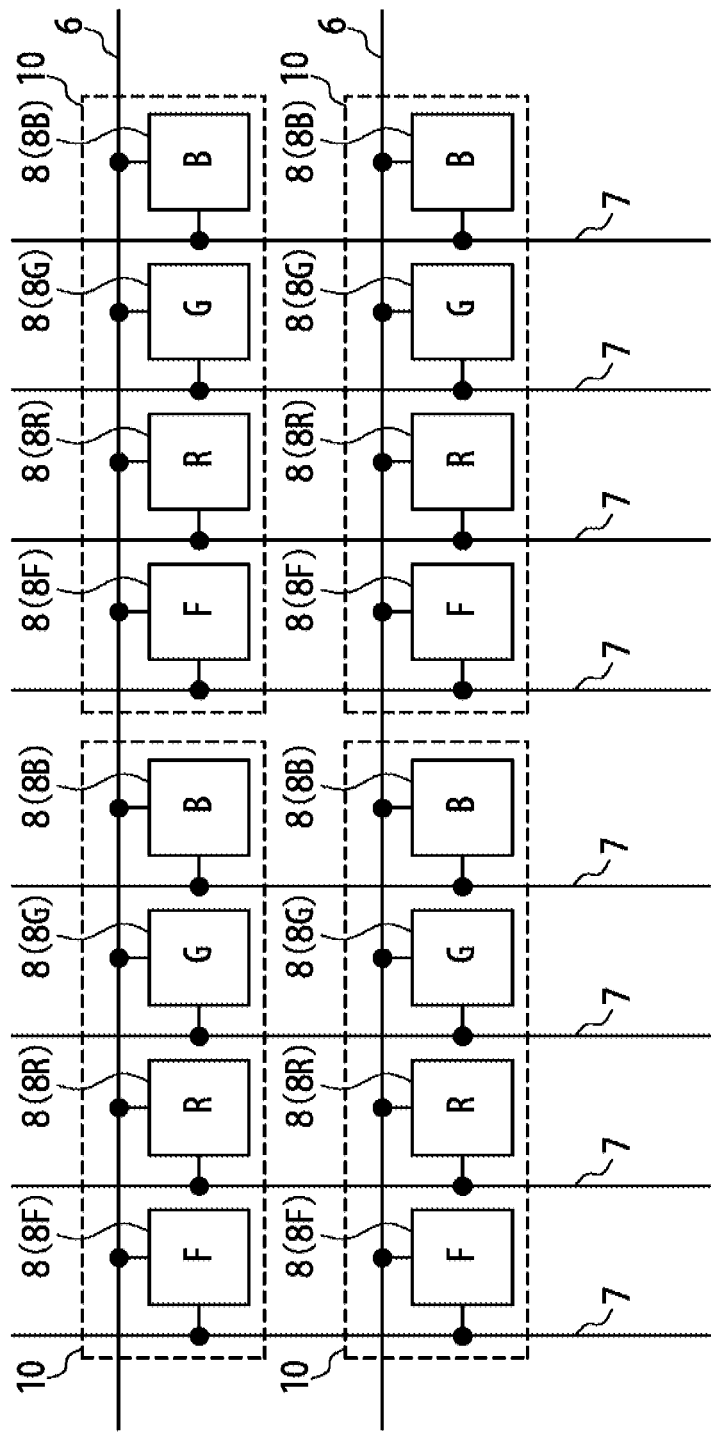

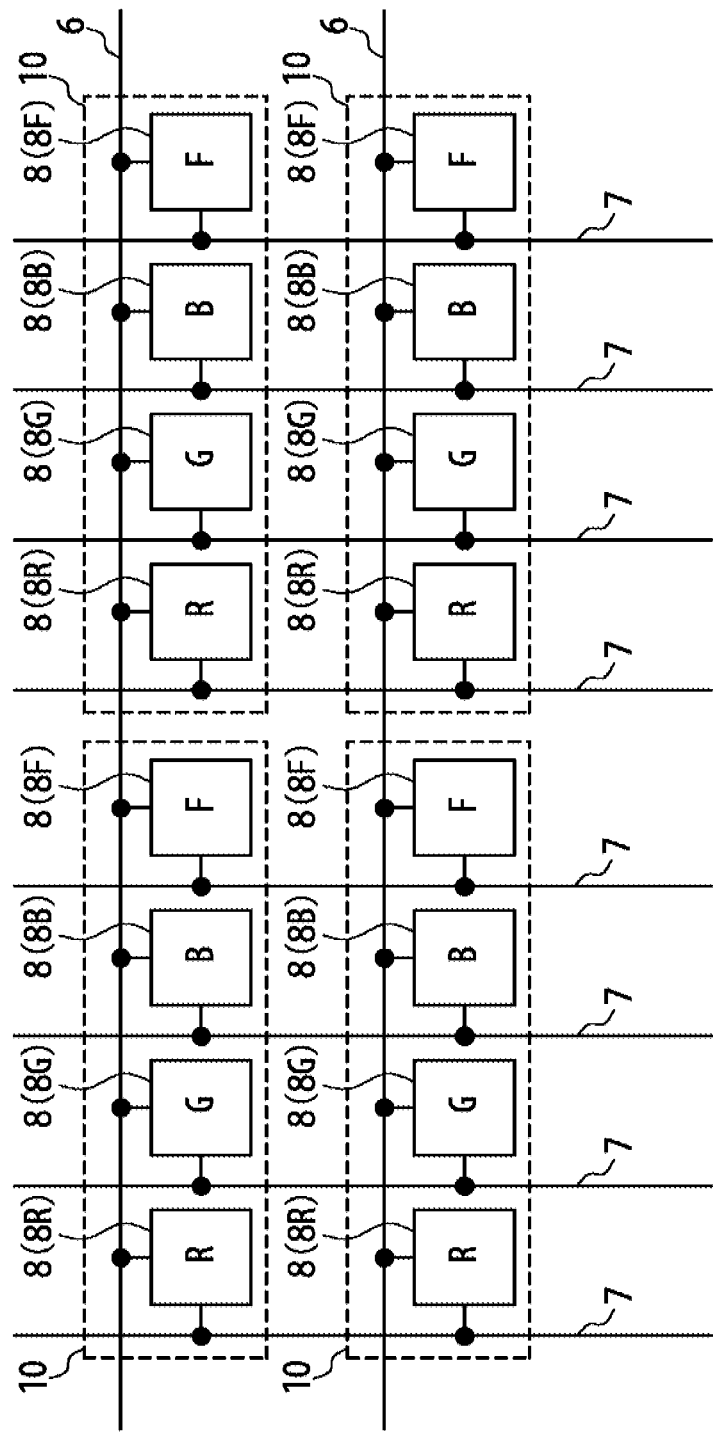

F I G. 16
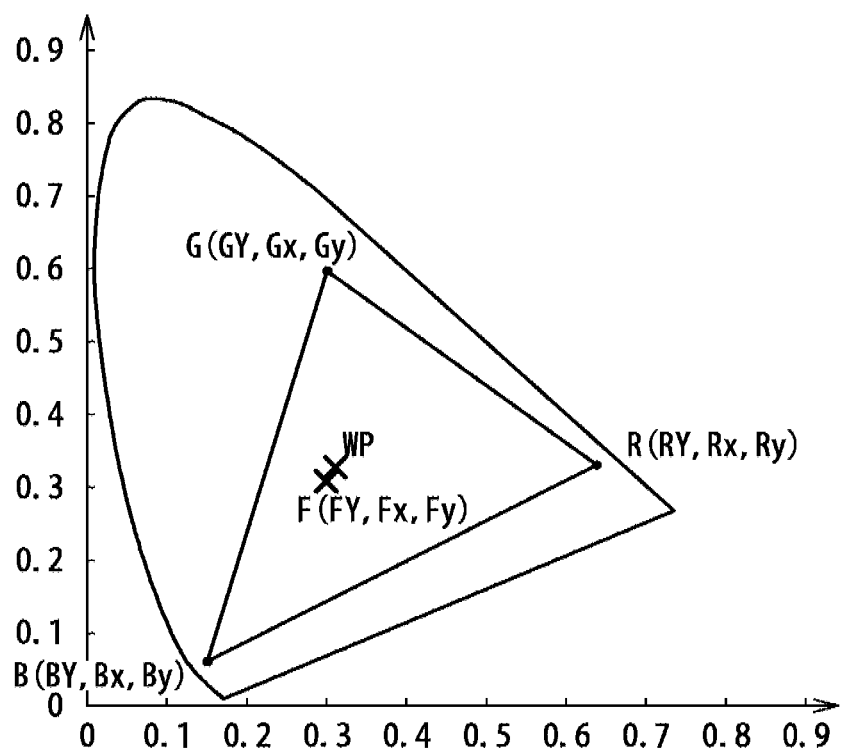

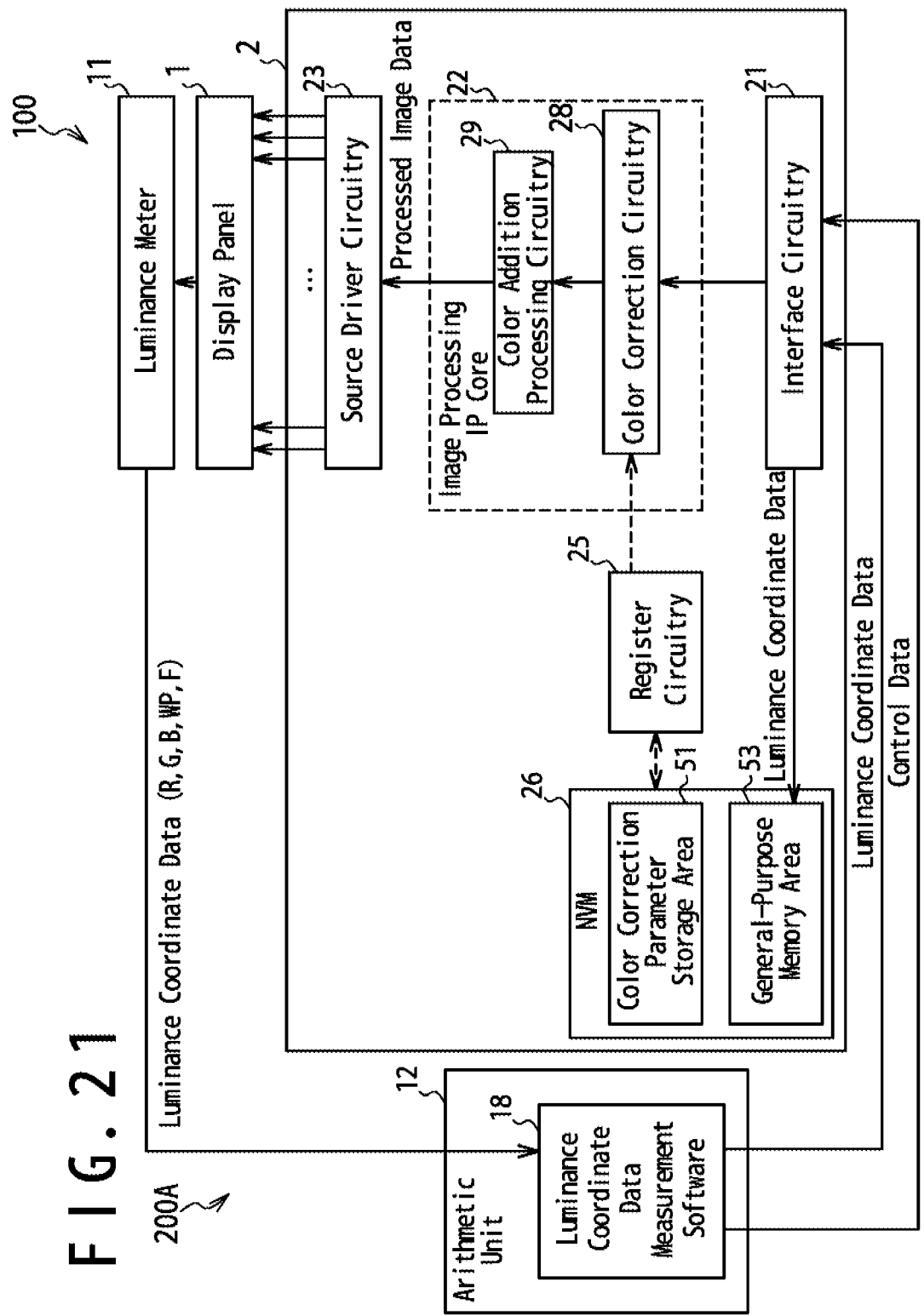
F I G. 21

DISPLAY DRIVER, IMAGE PROCESSING CIRCUITRY, AND METHOD

CROSS REFERENCE TO RELATED APPLICATIONS

This application is a continuation of, and thereby claims benefit under 35 U.S.C. § 120 to U.S. patent application Ser. No. 16/622,788 filed on Dec. 13, 2019. U.S. patent application Ser. No. 16/622,788 claims benefit to PCT application number PCT/JP2018/022735 filed on Jun. 14, 2018, Japanese Pat. Application Serial No. 2017-119507 filed on Jun. 19, 2017, and Japanese Pat. Application Serial No. 2017-118497 filed on Jun. 16, 2017.

TECHNICAL FIELD

The present disclosure relates to a display driver, image processing circuitry and a method for displaying three primary colors and an additional color.

BACKGROUND

Image data formats include RGB data. The RGB data have a format describing grayscale values specifying grayscale levels of a primary color red (R), a primary color green (G), and a primary color blue (B) for each pixel in an image. Each grayscale value of the primary color R, the primary color G, and the primary color B is described, for example, with eight bits. Image data in the RGB format may be hereinafter simply referred to as RGB data.

On the other hand, in order to improve image quality, each pixel in recent display panels, such as a liquid crystal display (LCD) panel and an organic light emitting diode (OLED) display panel, may include an additional subpixel displaying an additional color other than the primary colors R, G, and B. The additional subpixel is in addition to an R subpixel displaying the primary color R, a G subpixel displaying the primary color G, and a B subpixel displaying the primary color B. As for the additional color, for example, yellow Y, cyan C, or white W may be used. The additional color may be hereinafter denoted by a symbol "F," and a subpixel displaying the color F may be denoted as an F subpixel.

When an image is displayed based on RGB data on a display panel in which each pixel comprises an F subpixel in addition to an R subpixel, a G subpixel, and a B subpixel according to RGB data, color addition processing may be performed on the RGB data. Since grayscale values of F subpixels are not described in the RGB data, image data describing grayscale values of the R subpixel, the G subpixel, the B subpixel, and the F subpixel are generated from the RGB data. Properly designing color addition processing is useful for improving image quality of a display panel. Image data in a format describing grayscale values of the R subpixel, the G subpixel, the B subpixel, and the F subpixel in each pixel may be hereinafter referred to as FRGB data.

Color correction processing is another technology that contributes to improve the image quality of a display panel. The color correction processing involves, for example, color space management for matching a color gamut used in generation of image data, such as a color gamut defined in the sRGB standard or the Adobe RGB standard, with a color gamut of an image displayed on a display panel. Appropriate color space management is useful for displaying an image on a display panel with coloring intended in generation of image data and improving image quality of the display panel.

SUMMARY

In one embodiment, a display driver that drives a display panel comprises: storage circuitry that stores F subpixel data acquired from color coordinate data indicating color coordinates of a displayed color in a predetermined color space displayed on the display panel when an R subpixel, a G subpixel, and a B subpixel in each of a plurality of pixels of the display panel are driven with drive signals corresponding to a minimum grayscale value and an F subpixel in each of the plurality of pixels which displays an additional color other than a primary color R, a primary color G, and a primary color B is driven with a drive signal corresponding to a maximum grayscale value; and color addition processing circuitry configured to generate output FRGB data comprising an F grayscale value specifying a grayscale level of the F subpixel, an R grayscale value specifying a grayscale level of the R subpixel, a G grayscale value specifying a grayscale level of the G subpixel, and a B grayscale value specifying a grayscale level of the B subpixel, based on first input RGB data corresponding to a first pixel, based on the F subpixel data stored in the storage circuitry.

In one embodiment, a display driver with such a configuration is used for driving a display panel in a display device.

In another embodiment, image processing circuitry comprises: storage circuitry that stores F subpixel data acquired from color coordinate data indicating color coordinates of a displayed color in a predetermined color space displayed on a display panel when an R subpixel, a G subpixel, and a B subpixel in each of a plurality of pixels of the display panel are driven with drive signals corresponding to a minimum grayscale value and an F subpixel in each of the plurality of pixels which displays an additional color other than a primary color R, a primary color G, and a primary color B is driven with a drive signal corresponding to a maximum grayscale value; and color addition processing circuitry that generates, from input RGB data, output FRGB data comprising an F grayscale value specifying a grayscale level of the F subpixel, an R grayscale value specifying a grayscale level of the R subpixel, a G grayscale value specifying a grayscale level of the G subpixel, and a B grayscale value specifying a grayscale level of the B subpixel, based on the F subpixel data stored in the storage circuitry.

In still another embodiment, a method comprises: preparing an F subpixel data acquired from color coordinate data indicating color coordinates of a displayed color in a predetermined color space displayed on a display panel when an R subpixel, a G subpixel, and a B subpixel in each of a plurality of pixels of the display panel are driven with drive signals corresponding to a minimum grayscale value and an F subpixel included in each of the plurality of pixels to display an additional color other than a primary color R, a primary color G, and a primary color B is driven with a drive signal corresponding to a maximum grayscale value; and generating, from input RGB data, output FRGB data comprising an F grayscale value specifying a grayscale level of the F subpixel, an R grayscale value specifying a grayscale level of the R subpixel, a G grayscale value specifying a grayscale level of the G subpixel, and a B grayscale value specifying a grayscale level of the B subpixel, based on the F subpixel data.

BRIEF DESCRIPTION OF DRAWINGS

FIG. 2A is a diagram illustrating an example arrangement of subpixels in each pixel in a display panel.

FIG. 2B is a diagram illustrating another example arrangement of subpixels in each pixel in the display panel.

FIG. 16 is a chromaticity diagram illustrating luminance coordinate data of the primary color R, the primary color G, the primary color B, and the color F for a maximum grayscale value, and luminance coordinate data of the white point (WP) in an xyY color system.

FIG. 21 is a block diagram schematically illustrating configurations of a luminance coordinate measurement device and a display device, according to yet another embodiment.

DESCRIPTION OF EMBODIMENTS

Figure 1:
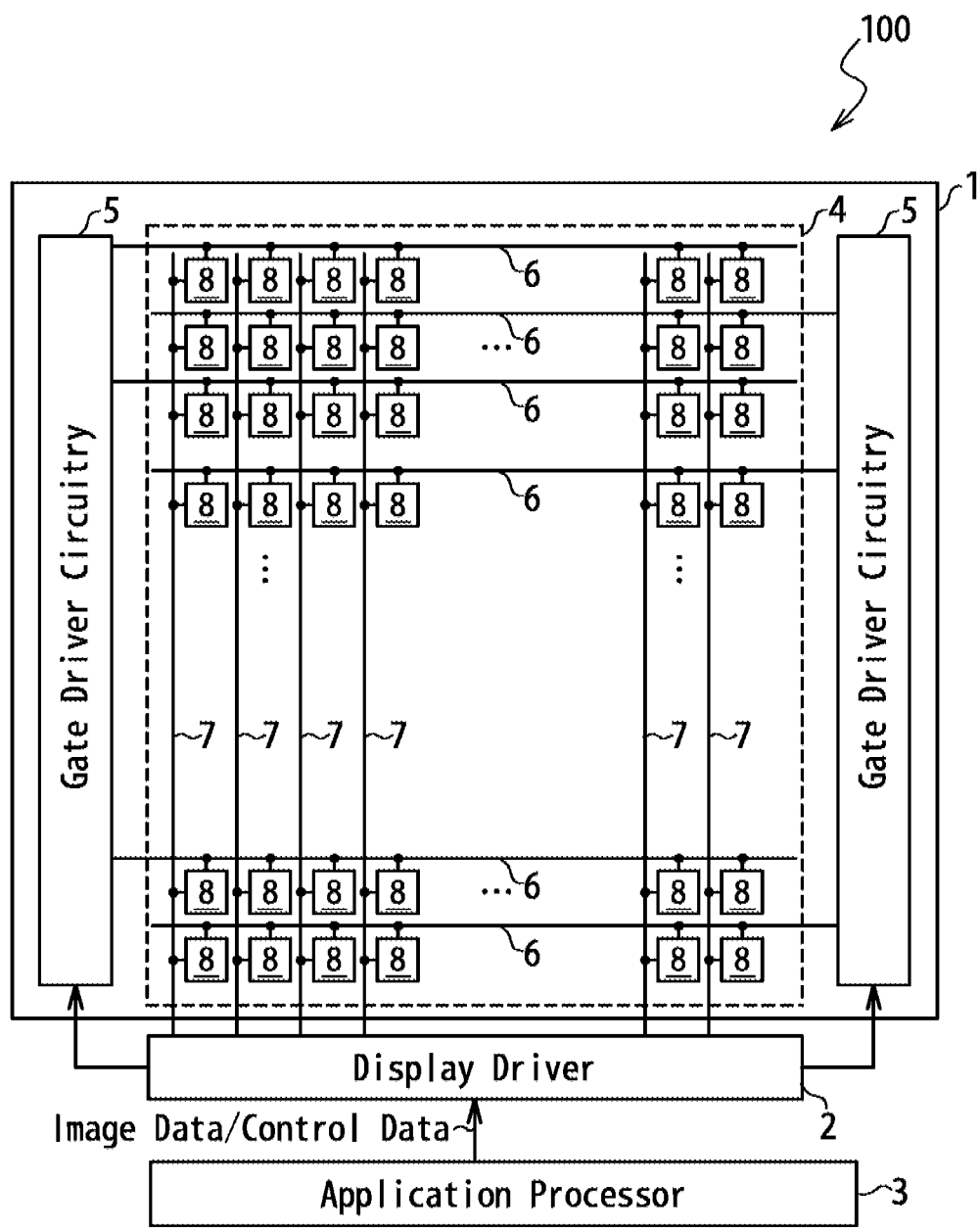
FIG. 1 is a block diagram illustrating a configuration of a display device according to a first embodiment.

Embodiments will be described below referring to accompanying drawings. It should be noted that the same or corresponding components may be denoted by the same or corresponding reference numerals in the following description.

FIG. 1 is a block diagram illustrating a configuration of a display device 100, according to a first embodiment. In the present embodiment, the display device 100 comprises a display panel 1 and a display driver 2. The display device 100 is configured to receive image data from an application processor 3 and display an image corresponding to the received image data on the display panel 1. In the present embodiment, the image data supplied from the application processor 3 to the display driver 2 are in an RGB format and describe grayscale values specifying grayscale levels of a primary color R, a primary color G, and a primary color B for each pixel. In one embodiment, each of grayscale levels of the primary color R, the primary color G, and the primary color B may be specified by an 8-bit grayscale value.

The display panel 1 comprises an active area 4 and gate driver circuitries 5. Arranged in the active area 4 are a plurality of gate lines 6, a plurality of source lines 7, and a plurality of pixel circuits 8. The pixel circuits 8 are arranged in rows and columns, and each pixel circuit 8 is provided at an intersection of a corresponding gate line 6 and source line 7. Note that the direction in which the gate lines 6 extends may be hereinafter referred to as "horizontal direction," and the direction in which the source lines 7 extends may be referred to as "vertical direction." Further, "right" herein means a specific direction parallel to the horizontal direction, and "left" means the direction that is parallel to the horizontal direction and opposite to the specific direction.

When the display panel 1 is configured as a liquid crystal display panel, each pixel circuit 8 may comprise a select transistor, a pixel electrode, and a holding capacitor in one embodiment. The select transistor, the pixel electrode, and the holding capacitor are not illustrated in FIG. 1. In this case, a drive voltage is applied between the pixel electrode in each pixel circuit 8 and an unillustrated common electrode in the display panel 1, and the orientation of liquid crystal disposed between the pixel electrode and the common electrode is controlled by an electric field generated between the pixel electrode and the common electrode.

Further, when the display panel 1 is configured as an organic light emitting diode (OLED) display panel, a pixel circuit 8 may comprise an OLED element, a drive circuit that drives the OLED element, and a hold capacitor that stores a drive voltage. The OLED element, the drive circuit, and the hold capacitor are not illustrated in FIG. 1. In this case, a current corresponding to the voltage held across the hold capacitor is supplied to the OLED element to drive the OLED element.

FIG. 2A is a diagram illustrating an example configuration of each pixel 10 of the display panel 1. In the present embodiment, each pixel 10 comprises a pixel circuit 8 displaying an additional color F in addition to pixel circuits 8 respectively displaying the primary color red (R), the primary color green (G), and the primary color blue (B). For example, yellow Y, cyan C, or white W may be used as the additional color F. A pixel circuit 8 displaying the primary color R is used as an R subpixel, and a pixel circuit 8 displaying the primary color G is used as a G subpixel. Further, a pixel circuit 8 displaying the primary color B is used as a B subpixel, and a pixel circuit 8 displaying the color F is used as an F subpixel. Pixel circuits 8 displaying the primary color R, the primary color G, the primary color B, and the color F may be hereinafter referred to as R subpixel 8R, G subpixel 8G, B subpixel 8B, and F subpixel 8F, respectively. In the present embodiment, the R subpixel 8R, the G subpixel 8G, the B subpixel 8B, and the F subpixel 8F in each pixel 10 are arrayed in the horizontal direction and are connected to the same gate line 6.

While FIG. 2A illustrates the arrangement in which the F subpixel 8F, the R subpixel 8R, the G subpixel 8G, and the B subpixel 8B are arranged in this order in each pixel 10, that is, the arrangement in which the F subpixel 8F is positioned at the left end of each pixel 10, the arrangement of the F subpixel 8F, the R subpixel 8R, the G subpixel 8G, and the B subpixel 8B is not limited to the arrangement illustrated in FIG. 2A. FIG. 2B illustrates another example arrangement of the F subpixel 8F, the R subpixel 8R, the G subpixel 8G, and the B subpixel 8B in each pixel 10. Illustrated in FIG. 2B is an arrangement in which the R subpixel 8R, the G subpixel 8G, the B subpixel 8B, and the F subpixel 8F are arranged in this order in each pixel 10, that is, an arrangement in which the F subpixel 8F is positioned at the right end of each pixel 10.

Returning to FIG. 1, the gate driver circuitries 5 drive the gate lines 6 based on control signals received from the display driver 2. In the present embodiment, a pair of gate driver circuitries 5 are disposed on the left and right of the active area 4. The gate driver circuitries 5 are integrated into the display panel 1 with a system-on-glass (SoG) technology.

The display driver 2 is a semiconductor device operating as follows. The display driver 2 has source outputs connected to the source lines 7 of the display panel 1 and drives the respective pixel circuits 8 in the display panel 1 based on image data received from the application processor 3. Further, the display driver 2 supplies gate control signals to the gate driver circuitries 5 based on control data received from the application processor 3 and thereby controls the gate driver circuitries 5.

Figure 3:
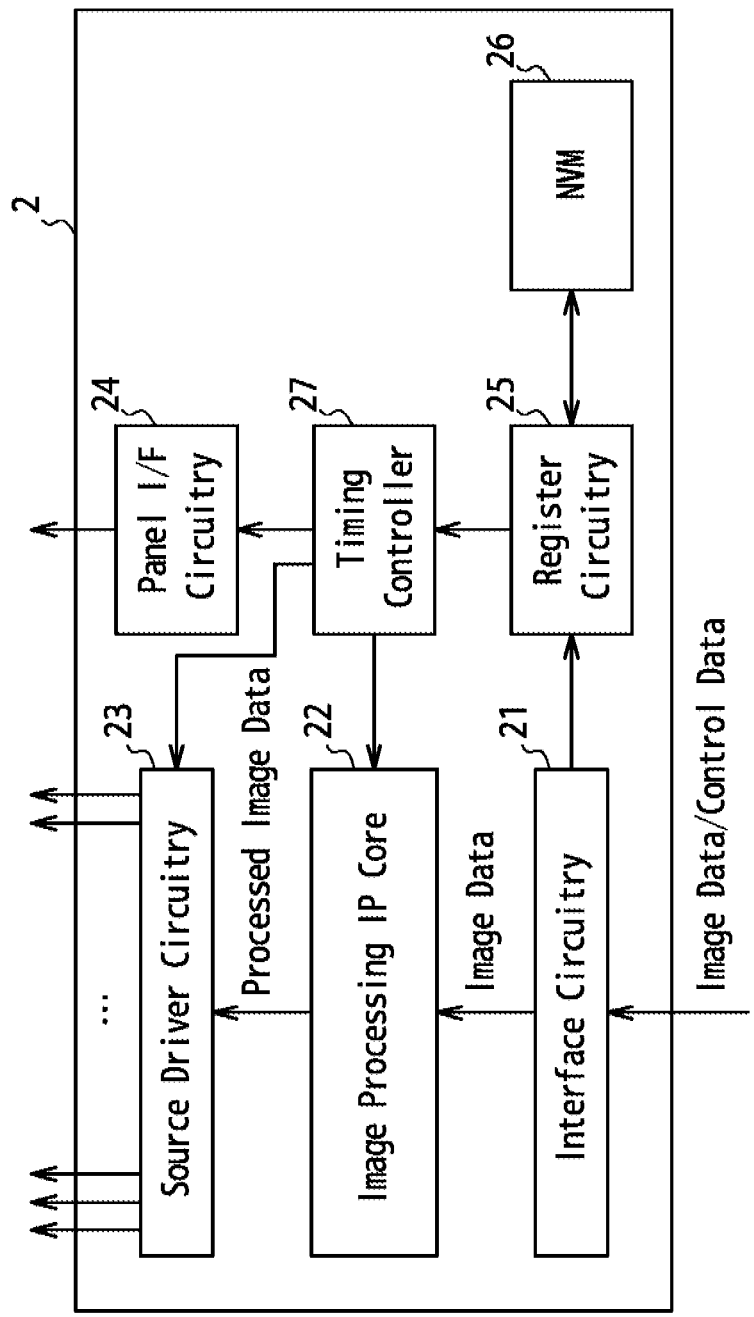
FIG. 3 is a block diagram illustrating a configuration of a display driver, according to the first embodiment.

FIG. 3 is a block diagram schematically illustrating a configuration of the display driver 2 in the present embodiment. The display driver 2 comprises interface circuitry 21, an image processing IP core 22, source driver circuitry 23, panel interface circuitry 24, register circuitry 25, a nonvolatile memory 26, and a timing controller 27.

The interface circuitry 21 receives image data from the application processor 3 and transfers the received image data to the image processing IP core 22. The interface circuitry 21 further receives control data from the application processor 3 and stores commands and control parameters contained in the control data into the register circuitry 25.

The image processing IP core 22 operates as image processing circuitry that generates processed image data by performing desired image processing on the image data received from the interface circuitry 21. The image processing performed in the image processing IP core 22 comprises color addition processing, and the processed image data have a format that describes grayscale values specifying grayscale levels of the R subpixel 8R, the G subpixel 8G, the B subpixel 8B, and the F subpixel 8F. The color addition processing performed in the image processing IP core 22 and the circuit configuration of image processing circuitry performing the color addition processing will be described later in detail. The image processing performed in the image processing IP core 22 may comprise image processing other than the color addition processing.

The source driver circuitry 23 operates as drive circuitry that drives the source lines 7 of the display panel 1 based on the processed image data received from the image processing IP core 22.

The panel interface circuitry 24 generates the gate control signals based on the control data received from the application processor 3 and supplies the generated gate control signals to the gate driver circuitries 5.

The register circuitry 25 holds commands and control parameters used for controlling the display driver 2. The commands and the control parameters contained in the control data received from the application processor 3 are stored in the register circuitry 25.

The nonvolatile memory 26 stores control parameters used for controlling the display driver 2 in a nonvolatile manner. The control parameters stored in the nonvolatile memory 26 are read out and stored into the register circuitry 25 on startup of the display driver 2, and the control parameters stored in the register circuitry 25 are used for controlling the display driver 2.

The timing controller 27 performs timing control of circuitry included in the display driver 2, such as the image processing IP core 22, the source driver circuitry 23, and the panel interface circuitry 24, based on the commands and the control parameters stored in the register circuitry 25.

In the following, a description is given of the color addition processing performed in the image processing IP core 22 in the present embodiment.

In the present embodiment, F subpixel data comprising information related to characteristics of the display panel 1 when an image is displayed on the display panel 1 are used in the color addition processing performed in the image processing IP core 22. Specifically, in the present embodiment, color coordinate data indicating color coordinates of the color F in a predetermined color space are acquired, and the F subpixel data used in the color addition processing are generated from the acquired color coordinate data. More strictly, the color coordinate data of the color F comprises data indicating color coordinates of the displayed color in the predetermined color space displayed on the display panel 1 when R subpixels 8R, G subpixels 8G, and B subpixels 8B of the display panel 1 are driven with drive signals corresponding to a minimum grayscale value and F subpixels 8F are driven with drive signals corresponding to a maximum grayscale value. In the present embodiment, color addition processing suppressing a color change is achieved by performing the color addition processing based on the F subpixel data thus generated.

The acquired color coordinate data of the color F may be stored as the F subpixel data. However, as will be described later, the F subpixel data having a format suitable for color addition processing be stored in storage circuitry provided in the display driver 2, such as the register circuitry 25 and the nonvolatile memory 26, reducing the amount of data processing in the image processing IP core 22.

In one embodiment, measurement data comprising color coordinate data of the color F may be acquired by performing a measurement on the display panel 1, and F subpixel data may be generated from the measurement data. In this case, color coordinate data indicating the color coordinates of the displayed color in a predetermined color space displayed on the display panel 1 in a state in which, for all the pixels 10 of the display panel 1, the F subpixels 8F are driven with drive signals corresponding to the maximum grayscale value, and the other subpixels (the R subpixels 8R, the G subpixels 8G, and the B subpixels 8B) are driven with drive signals corresponding to the minimum grayscale value are measured as color coordinate data of the color F by a measurement device such as a luminance meter. The xyY color system may be used as the color space, for example. In this case, the color coordinate data of the color F may be acquired as luminance coordinate data indicating a stimulus value (luminance) Y and chromaticity coordinates (x, y) in the xyY color system.

The operation of driving the F subpixels 8F with the drive signals corresponding to the maximum grayscale value and driving the other subpixels (the R subpixels 8R, the G subpixels 8G, and the B subpixels 8B) with the drive signals corresponding to the minimum grayscale value can be achieved by supplying, to the source driver circuitry 23, image data in which the grayscale values of the F subpixels 8F are the maximum grayscale value and the grayscale values of the R subpixel 8R, the G subpixel 8G, and the B subpixel 8B are the minimum grayscale value throughout the display panel 1 and driving the display panel 1 based on the image data by the source driver circuitry 23. When the image data supplied to the source driver circuitry 23 describe the grayscale values of the F subpixel 8F, the R subpixel 8R, the G subpixel 8G, and the B subpixel 8B with eight bits, the maximum grayscale value is "255," and the minimum grayscale value is "0."

In another embodiment, the color coordinate data of the color F, that is, the color coordinate data or luminance coordinate data of a displayed color displayed on the display panel 1 when the R subpixels 8R, the G subpixels 8G, and the B subpixels 8B of the display panel 1 are driven with drive signals corresponding to the minimum grayscale value and the F subpixels 8F are driven with drive signals corresponding to the maximum grayscale value may be calculated from design data of the display panel 1, such as data indicating characteristics of a filter disposed in the display panel 1. In this case, the F subpixel data may be generated from the calculated color coordinate data or luminance coordinate data of the color F.

In one embodiment, the F subpixel data may be stored in the nonvolatile memory 26, the F subpixel data stored in the nonvolatile memory 26 may be read out to the register circuitry 25 on startup of the display driver 2, and the F subpixel data read out to the register circuitry 25 may be used in the color addition processing performed in the image processing IP core 22.

Each pixel 10 of the display panel 1 may comprise a plurality of F subpixels 8F displaying a plurality of colors F different from one another, respectively. In this case, the F subpixel data are generated for the respective plurality of colors F and are used in the color addition processing. In the color addition processing, image data describing a grayscale value for each of the plurality of F subpixels 8F in addition to grayscale values of the R subpixel 8R, the G subpixel 8G, and the B subpixel 8B are generated. For example, when each pixel 10 comprises an F subpixel 8F displaying an additional color $F_1$ and an F subpixel 8F displaying an additional color $F_2$, F subpixel data calculated for the additional color $F_1$ and F subpixel data calculated for the additional color $F_2$ are generated and used in the color addition processing. In the color addition processing, based on these F subpixel data, image data describing grayscale values of the F subpixel 8F displaying the additional color $F_1$ and the F subpixel 8F displaying the additional color $F_2$ in addition to grayscale values of the R subpixel 8R, the G subpixel 8G, and the B subpixel 8B are generated.

In the following, a description is given of details of the color addition processing, according to the present embodiment.

In an advance preparation, the F subpixel data are generated, and the generated F subpixel data are stored into storage circuitry provided in the display driver 2, in the present embodiment, into the nonvolatile memory 26. The F subpixel data may be stored into the storage circuitry, more specifically, into the nonvolatile memory 26, for example, in a calibration process of the display device 100 before shipping. When the display driver 2 is configured to allow rewriting of control parameters stored in the nonvolatile memory 26 from an external device, the F subpixel data may be written into the nonvolatile memory 26 from the external device, such as the application processor 3 and an inspection device inspecting the display driver 2. The F subpixel data may be rewritten by accessing the nonvolatile memory 26 from the application processor 3.

Figure 4:
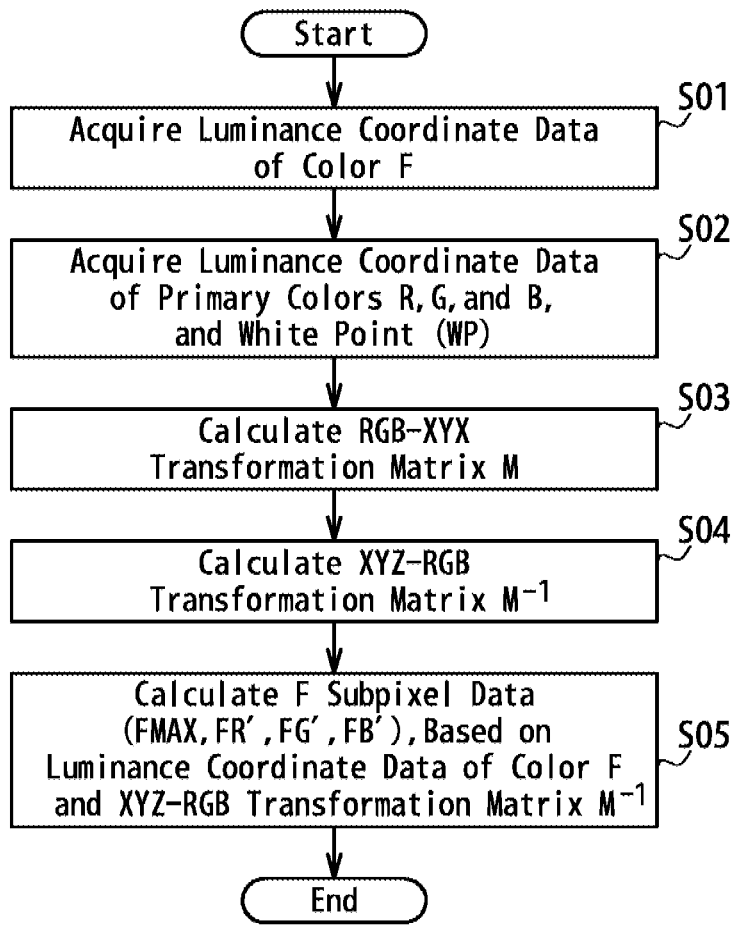
FIG. 4 is a flowchart illustrating an example procedure of generating F subpixel data.

FIG. 4 is a flowchart illustrating an example generation procedure of the F subpixel data.

Figure 5:
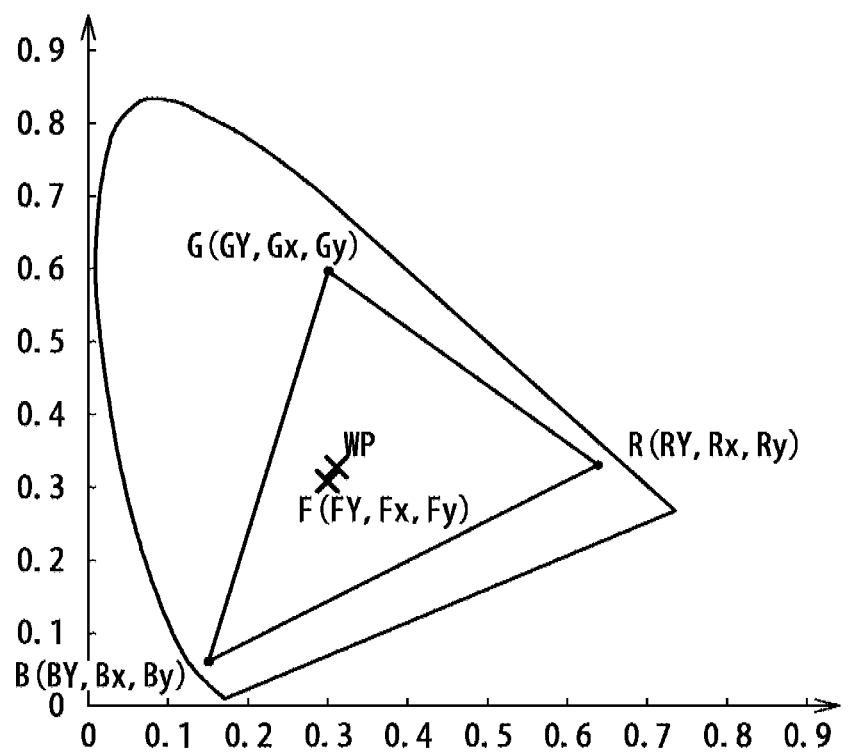
FIG. 5 is a chromaticity diagram illustrating luminance coordinate data of a color F, primary colors R, G, and B, and a white point.

In step S01, luminance coordinate data of the color F is acquired. In the present embodiment, the luminance coordinate data of the color F is acquired as luminance coordinate data describing a stimulus value Y and chromaticity coordinates (x, y) of the displayed color in the xyY color system displayed on the display panel 1 in a state in which the F subpixels 8F of the display panel 1 are driven with drive signals corresponding to the maximum grayscale value and the other subpixels (the R subpixels 8R, the G subpixels 8G, and the B subpixels 8B) are driven with drive signals corresponding to the minimum grayscale value. The luminance coordinate data of the color F may be hereinafter denoted as (FY, Fx, Fy). FY denotes a stimulus value Y of the color F, and Fx and Fy denote chromaticity coordinates x and y of the color F, respectively. The chromaticity diagram in FIG. 5 illustrates luminance coordinate data (FY, Fx, Fy) of the color F in the xyY color system.

Returning to FIG. 4, in steps S02 to S04, an XYZ-RGB transformation matrix indicating display characteristics of the display panel 1 when an image is displayed by use of only the R subpixels 8R, the G subpixels 8G, and the B subpixels 8B without using the F subpixels 8F is calculated with respect to the display panel 1. In one embodiment, the calculation of the XYZ-RGB transformation matrix is performed through the following procedure.

In step S02, luminance coordinate data of the primary colors R, G, and B, and a white point (WP) are acquired. In one embodiment, luminance coordinate data of the primary colors R, G, B, and the white point (WP) are acquired by actually performing a measurement on the display panel 1. In another embodiment, the luminance coordinate data of the primary colors R, G, B, and the white point (WP) may be calculated from design data of the display panel 1, such as data indicating characteristics of a filter disposed in the display panel 1.

More specifically, the luminance coordinate data of the primary color R are measured as data comprising a stimulus value Y and chromaticity coordinates (x, y) of a color in the xyY color system displayed on the display panel 1 in a state in which the R subpixels 8R of the display panel 1 is driven with drive signals corresponding to the maximum grayscale value and the other subpixels, that is, the F subpixels 8F, the G subpixels 8G, and the B subpixels 8B are driven with drive signals corresponding to the minimum grayscale value. The luminance coordinate data of the primary color R may be hereinafter denoted as (RY, Rx, Ry), where RY denotes a stimulus value Y of the primary color R, and Rx and Ry denote chromaticity coordinates x and y of the primary color R, respectively.

Similarly, the luminance coordinate data of the primary color G are measured as data comprising a stimulus value Y and chromaticity coordinates (x, y) of a color in the xyY color system displayed on the display panel 1 in a state in which the G subpixels 8G of the display panel 1 are driven with drive signals corresponding to the maximum grayscale value, and the other subpixels, that is, the F subpixels 8F, the R subpixels 8R, and the B subpixels 8B are driven with drive signals corresponding to the minimum grayscale value. The luminance coordinate data of the primary color G may be hereinafter denoted as (GY, Gx, Gy), where GY denotes a stimulus value Y of the primary color G, and Gx and Gy denote chromaticity coordinates x and y of the primary color G, respectively.

Furthermore, the luminance coordinate data of the primary color B are measured as data comprising a stimulus value Y and chromaticity coordinates (x, y) of a color in the xyY color system displayed on the display panel 1 in a state in which the B subpixels 8B of the display panel 1 are driven with drive signals corresponding to the maximum grayscale value and the other subpixels, that is, the F subpixels 8F, the R subpixels 8R, and the G subpixels 8G are driven with drive signals corresponding to the minimum grayscale value. The luminance coordinate data of the primary color B may be hereinafter denoted as (BY, Bx, By), where BY denotes a stimulus value Y of the primary color B, and Bx and By denote chromaticity coordinates x and y of the primary color B, respectively.

Meanwhile, the luminance coordinate data of the white point (WP) may be measured as data comprising a stimulus value Y and chromaticity coordinates (x, y) of a color in the xyY color system displayed on the display panel 1 in a state in which the R subpixels 8R, the G subpixels 8G, and the B subpixels 8B of the display panel 1 are driven with drive signals corresponding to the maximum grayscale value and the F subpixels 8F are driven with drive signals corresponding to the minimum grayscale value. The luminance coordinate data of the white point may be hereinafter denoted as (WY, Wx, Wy), where WY denotes a stimulus value Y of the white point, and Wx and Wy denote chromaticity coordinates x and y of the white point, respectively.

Illustrated in the chromaticity diagram of FIG. 5 are the luminance coordinate data (RY, Rx, Ry) of the primary color R, the luminance coordinate data (GY, Gx, Gy) of the primary color G, the luminance coordinate data (BY, Bx, By) of the primary color B, and the luminance coordinate data (FY, Fx, Fy) of the color F in the xyY color system.

Referring back to FIG. 4, in step S03, based on the luminance coordinate data of the primary colors R, G, and B, and the white point (WP) acquired in step S02, an RGB-XYZ transformation matrix indicating display characteristics of the display panel 1 is calculated. The RGB-XYZ transformation matrix is calculated as a transformation matrix M in equation (1a) described below:

$$M = \begin{pmatrix} rRx/Ry & gGx/Gy & bBx/By \\ r & g & b \\ rRz/Ry & gGz/Gy & bBz/By \end{pmatrix} \tag{1a}$$

Note that r, g, and b denote the luminances of the primary colors R, G, and B, respectively, when the luminance of the white point is assumed to be 1, and are acquired by solving simultaneous equation (1b) described below:

$$\begin{pmatrix} Wx/Wy \\ 1 \\ Wz/Wy \end{pmatrix} = \begin{pmatrix} Rx/Ry & Gx/Gy & Bx/By \\ 1 & 1 & 1 \\ Rz/Ry & Gz/Gy & Bz/By \end{pmatrix} \begin{pmatrix} r \\ g \\ b \end{pmatrix} \tag{1b}$$

In step S04, an XYZ-RGB transformation matrix is acquired as the inverse matrix $M^{-1}$ of the RGB-XYZ transformation matrix M. Specifically, the XYZ-RGB transformation matrix $M^{-1}$ is expressed by equation (2) described below:

$$M^{-1} = \begin{pmatrix} rRx/Ry & gGx/Gy & bBx/By \\ r & g & b \\ rRz/Ry & gGz/Gy & bBz/By \end{pmatrix}^{-1} \tag{2}$$

In step S05, the F subpixel data is calculated based on the luminance coordinate data (FY, Fx, Fy) of the color F and the XYZ-RGB transformation matrix $M^{-1}$.

More specifically, the luminance coordinate data (FY, Fx, Fy) of the color F is first transformed into color coordinate data (FX, FY, FZ) in the XYZ color system, in accordance with (3a) and (3b) described below:

$$FX = FY \times Fx/Fy, \text{ and} \tag{3a}$$

$$FZ = FY \times (1 - Fx - Fy)/Fy. \tag{3b}$$

The stimulus value FY of the luminance coordinate data is used as FY in color coordinate data in the XYZ color system.

Furthermore, RGB data (FR, FG, FB) of the color F are calculated through an XYZ-RGB transformation by applying the XYZ-RGB transformation matrix to the color coordinate data (FX, FY, FZ) of the color F. The RGB data (FR, FG, FB) of the color F are expressed as equation (4) described below:

$$\begin{pmatrix} FR \\ FG \\ FB \end{pmatrix} = M^{-1} \begin{pmatrix} FX \\ FY \\ FZ \end{pmatrix} \tag{4}$$

In the present embodiment, the F subpixel data comprise parameters FMAX, FR', FG', and FB' calculated in accordance with equations (5a) to (5d) described below.

$$FMAX = \text{Max}(FR, FG, FB), \tag{5a}$$

$$FR' = RGB_{MAX} \times FR/FMAX, \tag{5b}$$

$$FG' = RGB_{MAX} \times FG/FMAX, \text{ and} \tag{5c}$$

$$FB' = RGB_{MAX} \times FB/FMAX. \tag{5d}$$

The function Max in equation (5a) gives the maximum value among arguments, and therefore equation (5a) means FMAX is the maximum value among FR, FG, and FB. Further, FR', FG', and FB' are values acquired by normalizing FR, FG, and FB with respect to FMAX, respectively. $RGB_{MAX}$ is the allowed maximum grayscale value of the grayscale values of the primary color R, the primary color G, and the primary color B described in RGB data given as the input to the color addition processing. When grayscale values of the primary color R, the primary color G, and the primary color B are expressed with eight bits, $RGB_{MAX}$ is "255." In this case, equations (5b) to (5d) can be rewritten into equations (5b') to (5d') described below.

$$FR'=255\times FR/FMAX, \tag{5b'}$$

$$FG'=255\times FG/FMAX, \text{ and} \tag{5c'}$$

$$FB'=255\times FB/FMAX. \tag{5d'}$$

The F subpixel data (that is, FMAX, FR', FG', and FB') thus calculated is stored in the storage circuitry provided in the display driver 2, more specifically, in the nonvolatile memory 26. When the color addition processing is performed in the image processing IP core 22, the F subpixel data read out from the nonvolatile memory 26 and stored in the register circuitry 25 is supplied to the image processing IP core 22, and the image processing IP core 22 performs the color addition processing by use of the supplied F subpixel data.

Figure 6:
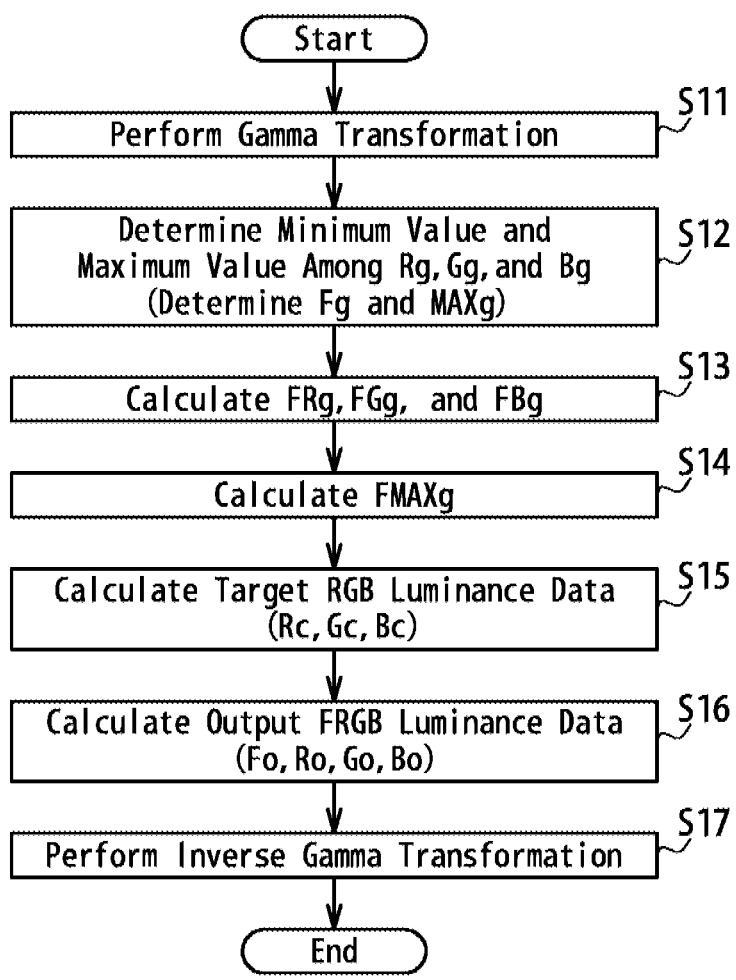
FIG. 6 is a flowchart illustrating color addition processing, according to a first embodiment.

FIG. 6 is a flowchart illustrating the color addition processing performed in the image processing IP core 22. Image data in the RGB format given as an input to the color addition processing are hereinafter referred to as input RGB data, and the grayscale values of the primary colors R, G, and B described in the input RGB data are denoted as Ri, Gi, and Bi, respectively.

The input RGB data (Ri, Gi, Bi) may comprise RGB data acquired by performing image processing for color space management on image data supplied from the application processor 3 to the display driver 2. Since the color addition processing according to the present embodiment suppresses a color change, applying the color addition processing according to the present embodiment to input RGB data acquired by performing the image processing for color space management is effective in maintaining a color gamut acquired by the color space management.

In step S11, gamma-transformed RGB data (Rg, Gg, Bg) is calculated by performing a gamma transformation on the input RGB data (Ri, Gi, Bi), where Rg, Gg, and Bg denotes luminance values of the primary color R, the primary color G, and the primary color B described in the gamma-transformed RGB data, respectively. The gamma-transformed RGB data (Rg, Gg, Bg) is calculated in accordance with equations (6a) to (6c) described below, by use of a gamma value γ set to the display device 100:

$$Rg=Ri^\gamma, \tag{6a}$$

$$Gg=Gi^\gamma, \text{ and} \tag{6b}$$

$$Bg=Bi^\gamma, \tag{6c}$$

where "^" is a symbol expressing exponentiation. In other words, Rg, Gg, and Bg in the gamma-transformed RGB data is calculated as the γ-th powers of the grayscale values Ri, Gi, and Bi, respectively.

In step S12, the minimum value and the maximum value among the luminance values Rg, Gg, and Bg are determined. The minimum value among the luminance values Rg, Gg, and Bg is determined as a luminance value Fg of the color F added in the color addition processing, and the maximum value among the luminance values Rg, Gg, and Bg is determined as a parameter MAXg. In other words, Fg and MAXg are determined in accordance with equations (7a) and (7b) described below:

$$Fg=\text{Min}(Rg,Gg,Bg), \text{ and} \tag{7a}$$

$$MAXg=\text{Max}(Rg,Gg,Bg). \tag{7b}$$

Note that Min in equation (7a) is a function that gives the minimum value among arguments.

Next, in step S13, a luminance value FRg of a component of the primary color R of the color F, a luminance value FGg of a component of the primary color G of the color F, and a luminance value FBg of a component of the primary color B of the color F are calculated from the luminance value Fg of the color F in accordance with equations (8a) to (8c) described below:

$$FRg=Fg\times FR'/RGB_{MAX}, \tag{8a}$$

$$FGg=Fg\times FG'/RGB_{MAX}, \text{ and} \tag{8b}$$

$$FBg=Fg\times FB'/RGB_{MAX}. \tag{8c}$$

When the grayscale values of the primary color R, the primary color G, and the primary color B are expressed with eight bits in the input RGB data, $RGB_{MAX}$ is "255." In this case, equations (8a) to (8c) can be rewritten into equations (8a') to (8c'):

$$FRg=Fg\times FR'/255, \tag{8a'}$$

$$FGg=Fg\times FG'/255, \text{ and} \tag{8b'}$$

$$FBg=Fg\times FB'/255. \tag{8c'}$$

In equations (8a) to (8c), the added amount of the color F may be adjusted by using an appropriate value $F_{CTRL}$ in place of the maximum grayscale value $RGB_{MAX}$. Specifically, FRg, FGg, and FBg may be calculated in accordance with equations (9a) to (9c) described below by use of the value $F_{CTRL}$:

$$FRg=Fg\times FR'/F_{CTRL}, \tag{9a}$$

$$FGg=Fg\times FG'/F_{CTRL}, \text{ and} \tag{9b}$$

$$FBg=Fg\times FB'/F_{CTRL}. \tag{9c}$$

Equations (8a) to (8c) may be considered as a special case where the value $F_{CTRL}$ is set to the maximum grayscale value $RGB_{MAX}$.

Furthermore, in step S14, a parameter FMAXg is calculated in accordance with equations (10a) to (10c) described below:

$$FMAXg=MAXg+FRg, \text{ if } MAXg=Rg, \tag{10a}$$

$$FMAXg=MAXg+FGg, \text{ if } MAXg=Gg, \text{ and} \tag{10b}$$

$$FMAXg=MAXg+FBg, \text{ if } MAXg=Bg. \tag{10c}$$

In other words, the parameter FMAXg is calculated as described below:

(a) When the luminance value Rg is selected as MAXg, FMAXg is calculated as the sum of MAXg and the luminance value FRg.

(b) When the luminance value Gg is selected as MAXg, FMAXg is calculated as the sum of MAXg and the luminance value FGg.

(c) When the luminance value Bg is selected as MAXg, FMAXg is calculated as the sum of MAXg and the luminance value FBg.

Next, in step S15, target RGB luminance data (Rc, Gc, Bc) is calculated by multiplying the gamma-transformed RGB data (Rg, Gg, Bg) by a ratio FMAXg/MAXg. Luminance values Rc, Gc, and Bc described in the target RGB luminance data (Rc, Gc, Bc) respectively indicates luminance values of components of the primary color R, the primary color G, and the primary color B to be achieved by the output FRGB data acquired in the color addition processing. The target RGB luminance data (Rc, Gc, Bc) is calculated in accordance with equations (11a) to (11c) described below:

$$Rc = Rg \times FMAXg/MAXg, \quad (11a)$$

$$Gc = Gg \times FMAXg/MAXg, \text{ and} \quad (11b)$$

$$Bc = Bg \times FMAXg/MAXg. \quad (11c)$$

Furthermore, output FRGB luminance data (Fo, Ro, Go, Bo) is calculated in accordance with equations (12a) to (12d) described below (in step S16):

$$Fo = Fg \times RGB_{MAX}/FMAX, \quad (12a)$$

$$Ro = Rc - FRg, \quad (12b)$$

$$Go = Gc - FGg, \text{ and} \quad (12c)$$

$$Bo = Bc - FBg. \quad (12d)$$

Specifically, the luminance value Fo is calculated as the product of Fg and a ratio $RGB_{MAX}/FMAX$. The luminance values Ro, Go, and Bo are calculated as differences acquired by subtracting the luminance values FRg, FGg, and FBg from the luminance values Rc, Gc, and Bc, respectively. When the grayscale values of the primary color R, the primary color G, and the primary color B are expressed with eight bits in the input RGB data, $RGB_{MAX}$ is "255," and in this case, equation (12a) can be rewritten into equation (12a') described below:

$$Fo = Fg \times 255/FMAX. \quad (12a')$$

The output FRGB data ($F_{OUT}$, $R_{OUT}$, $G_{OUT}$, $B_{OUT}$) to be finally output in the color addition processing are generated by performing an inverse gamma transformation on the output FRGB luminance data (Fo, Ro, Go, Bo) (in step S17), where $F_{OUT}$, $R_{OUT}$, $G_{OUT}$, and $B_{OUT}$ denote the grayscale values of the color F, the primary color R, the primary color G, and the primary color B, respectively. More specifically, the output FRGB data ($F_{OUT}$, $R_{OUT}$, $G_{OUT}$, $B_{OUT}$) is calculated in accordance with equations (13a) to (13d) described below by use of the gamma value γ set to the display device 100:

$$F_{OUT} = Fo\,\hat{}\,(1/\gamma), \quad (13a)$$

$$R_{OUT} = Ro\,\hat{}\,(1/\gamma), \quad (13b)$$

$$G_{OUT} = Go\,\hat{}\,(1/\gamma), \text{ and} \quad (13c)$$

$$B_{OUT} = Bo\,\hat{}\,(1/\gamma). \quad (13d)$$

The thus acquired output FRGB data ($F_{OUT}$, $R_{OUT}$, $G_{OUT}$, $B_{OUT}$) may be supplied to the source driver circuitry 23 as the processed image data output from the image processing IP core 22. Alternatively, image data acquired by performing desired image processing on the output FRGB data ($F_{OUT}$, $R_{OUT}$, $G_{OUT}$, $B_{OUT}$) may be supplied to the source driver circuitry 23 as the processed image data.

Figure 7:
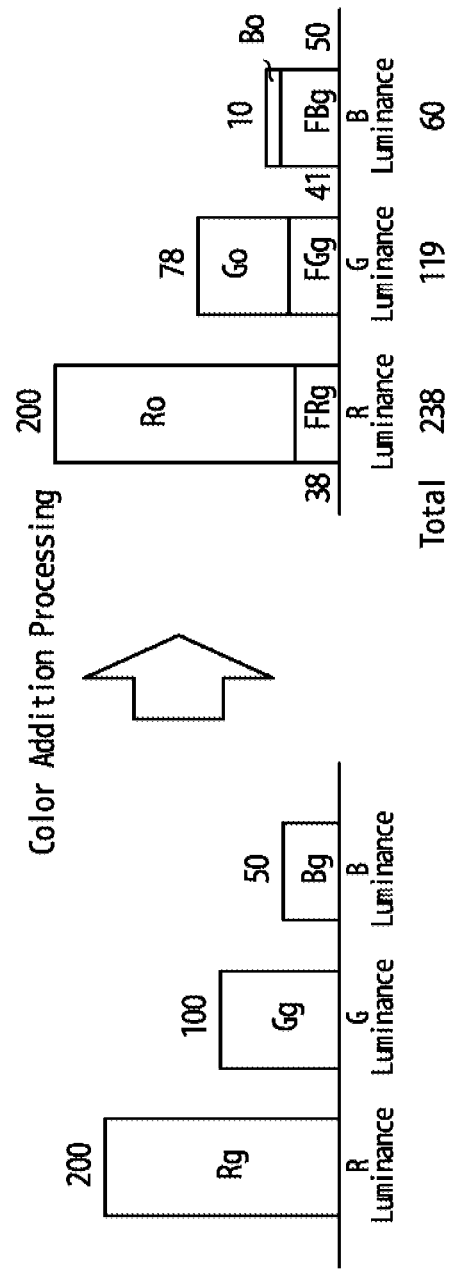
FIG. 7 is a diagram schematically illustrating an example of the color addition processing, according to a first embodiment.

FIG. 7 is a diagram illustrating an example of the color addition processing, according to the present embodiment. It is assumed that the RGB data (FR, FG, FB) of the color F are acquired as (300, 320, 390) in the generation of the F subpixel data. In this case, FMAX is calculated as the maximum value 390 among FR, FG, and FB, and FR', FG', and FB' acquired through normalization are calculated as 196, 209, and 255, respectively. In the calculation of FR', FG', and FB', rounding processing, more specifically rounding to the nearest integer is performed on the fractions. Alternatively, the rounding processing may comprise a truncation.

Discussed below is a case where values of gamma-transformed RGB data (Rg, Gg, Bg) acquired by performing the gamma transformation on the input RGB data are (200, 100, 50) as illustrated in the diagram on the left in FIG. 7. Rg, Gg, and Bg indicate the luminance values of the primary colors R, G, and B, respectively.

In this case, the luminance value Fg of the color F is determined as Bg, which is the minimum value among Rg, Gg, and Bg, that is, 50, and MAXg is determined as Rg, which is the maximum value among Rg, Gg, and Bg, that is, 200. FRg, FGg, and FBg are calculated from the luminance value Fg in accordance with equations (8a') to (8c'). Specifically, FRg, FGg, and FBg are calculated as described below:

$$FRg = 50 \times 196/255 = 38,$$

$$FGg = 50 \times 209/255 = 41, \text{ and}$$

$$FBg = 50 \times 255/255 = 50.$$

In calculation of FRg, FGg, and FBg, rounding processing, more specifically, rounding to the nearest integer is performed on the fractions. Alternatively, the rounding processing may comprise a truncation.

In embodiments where Rg is selected as the maximum value MAXg, FMAXg is calculated as the sum 238 of MAXg (=200) and FRg (=38).

Furthermore, the RGB data (Rc, Gc, Bc) are calculated in accordance with equations (11a) to (11c). Specifically, Rc, Gc, and Bc are calculated as described below:

$$Rc = 200 \times 238/200 = 238,$$

$$Gc = 100 \times 238/200 = 119, \text{ and}$$

$$Bc = 50 \times 238/200 = 60.$$

In the calculation of Rc, Gc, and Bc, rounding processing, more specifically, rounding to the nearest integer is performed on the fractions. The rounding processing may comprise a truncation.

Ro, Go, and Bo in the output FRGB luminance data are calculated by subtracting FRg, FGg, and FBg from Rc, Gc, and Bc, respectively. Specifically, Ro, Go, and Bo are calculated as described below:

$$Ro = 238 - 38 = 200,$$

$$Go = 119 - 41 = 78, \text{ and}$$

$$Bo = 60 - 50 = 10.$$

Further, Fo in the output FRGB luminance data is calculated as described below in accordance with equation (12a'):

$$Fo = 50 \times 255/390 = 33.$$

Usefulness of the color addition processing according to the present embodiment resides in a capability to suppress a color change due to the color addition processing. Suppression of a color change can be evaluated with the difference between the ratio among the luminances of the R component, the G component, and the B component in the output FRGB luminance data (Fo, Ro, Go, Bo) and the ratio Rg:Gg:Bg of the gamma-transformed RGB data (Rg, Gg, Bg). A match between the ratio among the luminances of the R component, the G component, and the B component included in the output FRGB luminance data (Fo, Ro, Go, Bo) and the ratio Rg:Gg:Bg of the gamma-transformed RGB data (Rg, Gg, Bg) means that the chromaticity coordinates (x, y) of the color displayed on the display panel 1 is not changed by the color addition processing. The luminance of the R component in the output FRGB luminance data (Fo, Ro, Go, Bo) is the sum of FRg and Ro, the luminance of the G component is the sum of FGg and Go, and the luminance of the B component is the sum of FBg and Bo. Accordingly, when the ratio FRg+Ro:FGg+Go:FBg+Bo is close to the ratio Rg:Gg:Bg, a color change by the color addition processing may be considered small.

The diagram on the right in FIG. 7 illustrates FRg, FGg, and FBg, which are the luminances of the R, G, and B components of the added color F, and Ro, Go, and Bo in the output FRGB luminance data. In the example in FIG. 7, the ratio FRg+Ro:FGg+Go:FBg+Bo is 238:119:60, and is close to the ratio Rg:Gg:Bg (=4:2:1) of the gamma-transformed RGB data (Rg, Gg, Bg). In such embodiments, the color change is suppressed in the color addition processing according to the present embodiment.

Figure 8:
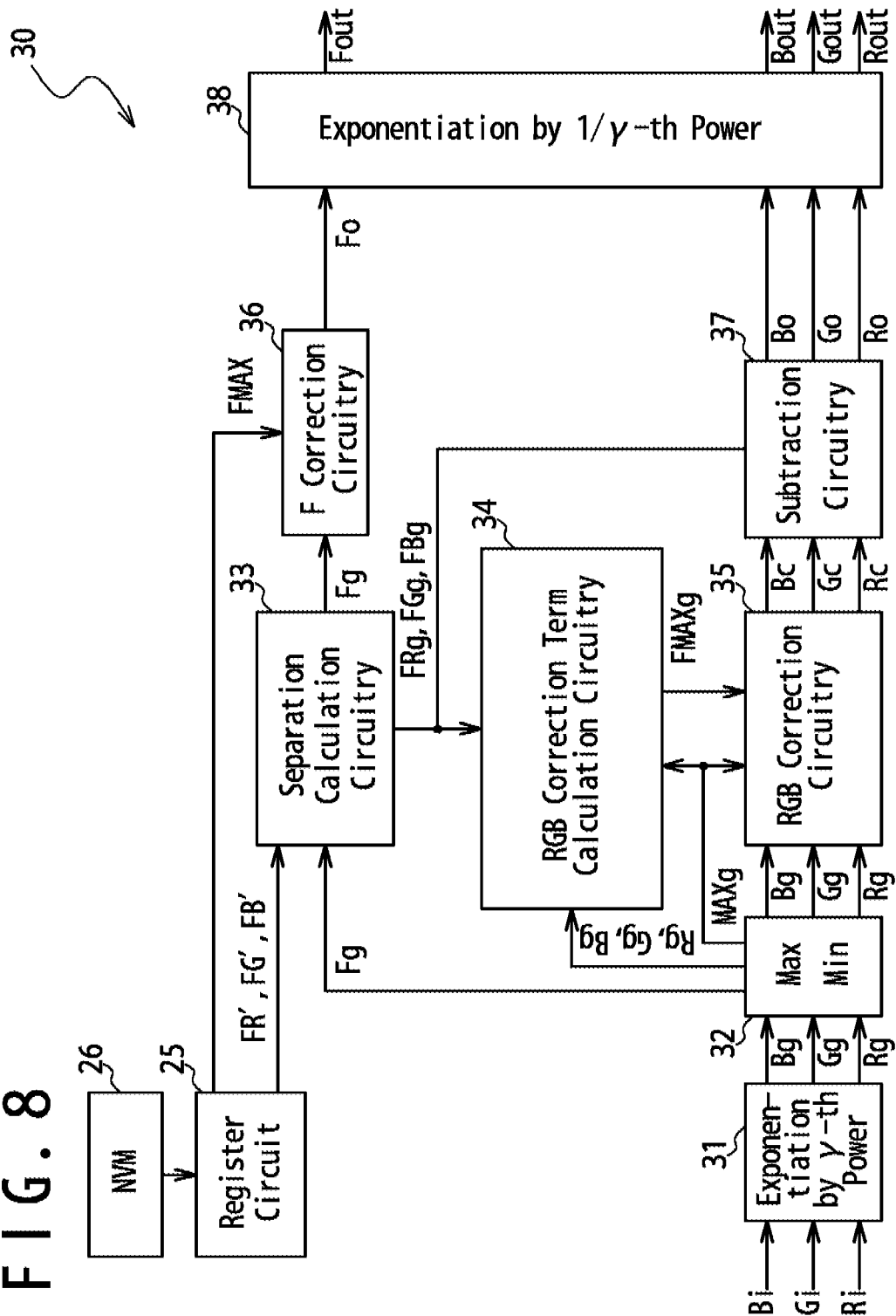
FIG. 8 is a block diagram illustrating an example configuration of color addition processing circuitry, according to a first embodiment.

FIG. 8 is a block diagram illustrating an example configuration of the color addition processing circuitry 30 that performs the color addition processing according to the first embodiment. The color addition processing circuitry 30 is incorporated and used, for example, in the image processing IP core 22. In the present embodiment, the color addition processing circuitry 30 is configured to perform the color addition processing based on the F subpixel data stored in the register circuitry 25. The F subpixel data stored in the register circuitry 25 comprises the parameters FMAX, FR', FG', and FB' calculated in accordance with equations (5a) to (5d) described above. In one embodiment, the F subpixel data may be stored in the nonvolatile memory 26 in a nonvolatile manner, read out from the nonvolatile memory 26 and stored into the register circuitry 25 on startup of the display driver 2, and the F subpixel data stored in the register circuitry 25 may be used in the color addition processing in the color addition processing circuitry 30.

More specifically, the color addition processing circuitry 30 comprises gamma transformation circuitry 31, maximum-minimum determination circuitry 32, separation calculation circuitry 33, RGB correction term calculation circuitry 34, RGB correction circuitry 35, F correction circuitry 36, subtraction circuitry 37, and inverse gamma transformation circuitry 38.

The gamma transformation circuitry 31 calculates gamma-transformed RGB data (Rg, Gg, Bg) by performing a gamma transformation on the input RGB data (Ri, Gi, Bi). More specifically, the gamma transformation circuitry 31 calculates Rg, Gg, and Bg as the γ-th powers of Ri, Gi, and Bi, respectively (refer to equations (6a) to (6c)).

The maximum-minimum determination circuitry 32 selects the minimum value among Rg, Gg, and Bg as the luminance value Fg of the color F added in the color addition processing and selects the maximum value among Rg, Gg, and Bg as MAXg.

The separation calculation circuitry 33 receives FR', FG', and FB' contained in the F subpixel data from the register circuitry 25 and receives Fg from the maximum-minimum determination circuitry 32. The separation calculation circuitry 33 calculates the luminance value FRg of the component of the primary color R of the color F, the luminance value FGg of the component of the primary color G of the color F, and the luminance value FBg of the component of the primary color B of the color F from the received FR', FG', FB', and Fg in accordance with equations (8a) to (8c), or equations (8a') to (8c'), or equations (9a) to (9c) described above.

The RGB correction term calculation circuitry 34 calculates FMAXg in accordance with equations (10a) to (10c) described above.

The RGB correction circuitry 35 calculates the target RGB luminance data (Rc, Gc, Bc) by multiplying the gamma-transformed RGB data (Rg, Gg, Bg) by the ratio FMAXg/MAXg (refer to equations (11a) to (11c)).

The F correction circuitry 36 calculates Fo in the output FRGB luminance data as the product of Fg and a ratio $RGB_{MAX}$/FMAX.

The subtraction circuitry 37 calculates Ro, Go, and Bo in the output FRGB luminance data as the differences acquired by subtracting FRg, FGg, and FBg from Rc, Gc, and Bc, respectively.

The inverse gamma transformation circuitry 38 calculates the output FRGB data ($F_{OUT}$, $R_{OUT}$, $G_{OUT}$, $B_{OUT}$) to be finally output in the color addition processing by performing an inverse gamma transformation on the output FRGB luminance data (Fo, Ro, Go, Bo). More specifically, the inverse gamma transformation circuitry 38 calculates $F_{OUT}$, $R_{OUT}$, $G_{OUT}$, and $B_{OUT}$ as the (1/γ)-th powers of Fo, Ro, Go, and Bo, respectively (refer to equations (13a) to (13d)).

Accordingly, the color addition processing circuitry 30 thus configured can execute the aforementioned color addition processing.

While the above-described embodiment recites that the F subpixel data stored in the nonvolatile memory 26 comprise the parameters FMAX, FR', FG', and FB' calculated in accordance with the above-described equations (5a) to (5d), the F subpixel data stored in the nonvolatile memory 26 may instead comprise a set of data based on which the parameters FMAX, FR', FG', and FB' can be calculated. For example, the F subpixel data may comprise data describing the luminance coordinate data (FY, Fx, Fy) of the color F and the XYZ-RGB transformation matrix indicating the characteristics of the display panel 1. In this case, the parameters FMAX, FR', FG', and FB' are calculated in the image processing IP core 22 in accordance with equations (3a), (3b), (4), and (5a) to (5d), and the calculated parameters FMAX, FR', FG', and FB' are used in the color addition processing. It should be noted however that, to reduce the calculation amount in the image processing IP core 22, it is preferable that the parameters FMAX, FR', FG', and FB' are stored in the nonvolatile memory 26.

In a second embodiment described below, color addition processing suppressing a color change is performed, and subpixel rendering is further performed at the same time in the color addition processing. A basic concept of the color addition processing according to the present embodiment is first described below.

In a display panel 1 in which each pixel 10 comprises an F subpixel 8F in addition to an R subpixel 8R, a G subpixel 8G, and a B subpixel 8B, one pixel is composed of four subpixels, and therefore the number of subpixels is increased by 25% compared with a display panel in which each pixel comprises only the R subpixel, the G subpixel, and the B subpixel for the same resolution. This increases the number of source outputs of a display driver that drives the display panel and has an undesirable effect on the circuit scale, power consumption, and ease of wiring on the substrate of the display panel.

Generating output FRGB data for one pixel from input RGB data for two pixels in color addition processing can resolve the problem of the increase in the number of subpixels of the display panel. However, unsuitable generation of output FRGB data causes remarkable degradation in the resolution of an image displayed on the display panel from the original resolution of the original input RGB data.

Figure 9:
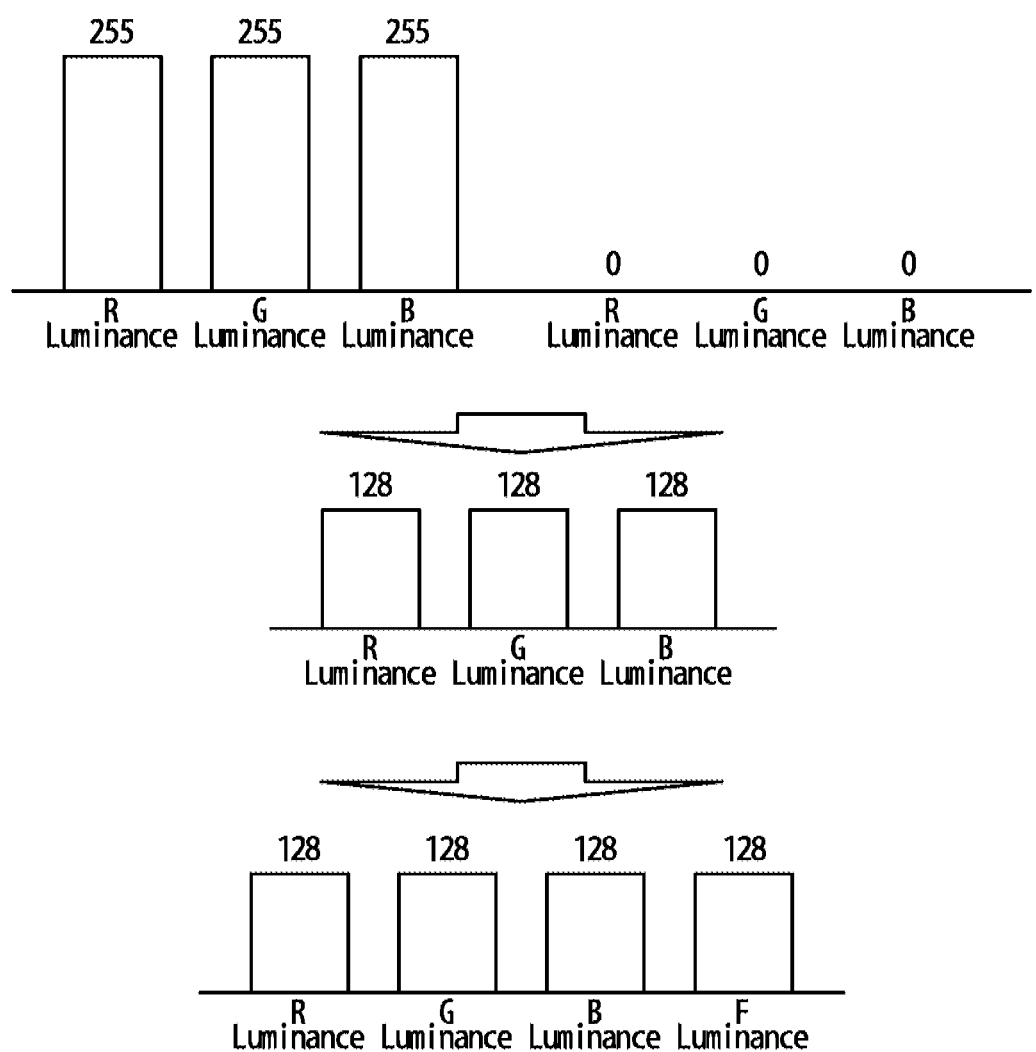
FIG. 9 conceptually illustrates an unsuitable example of the color addition processing of generating output FRGB data for one pixel from input RGB data for two pixels.

FIG. 9 schematically illustrates an unsuitable example of color addition processing for generating output FRGB data for one pixel from input RGB data for two pixels. For simplicity, discussed below is the case where the grayscale value of each of the primary colors R, G, and B described in the input RGB data of the left pixel of the two pixels is "255" and the grayscale value of each of the primary colors R, G, and B described in the input RGB data of the right pixel is "0". The simplest approach may be to perform color addition processing on pixel data acquired by averaging input RGB data of the two pixels. The simplest color addition processing when the color F is white is to determine the minimum value among the grayscale values of the primary colors R, G, and B as the grayscale value of the color F, and FIG. 9 illustrates such the case.

The color addition processing illustrated in FIG. 9, however, omits information that the input RGB data of the left pixel are different from the input RGB data of the right pixel. This implies the resolution is degraded for the entire image.

In the color addition processing according to a second embodiment, subpixel rendering is performed in generating output FRGB data for one pixel from input RGB data for two pixels to thereby suppress degradation in the resolution. Specifically, the color addition processing according to the second embodiment involves generating averaged RGB data by averaging input RGB data of two pixels and generating output FRGB luminance data by performing color addition processing similar to that in the first embodiment on the averaged RGB data. Correction for subpixel rendering is performed on the output FRGB luminance data based on the difference between the input RGB data of the two pixels and information concerning the arrangement of the F subpixel 8F, the R subpixel 8R, the G subpixel 8G, and the B subpixel 8B in each pixel 10 of the display panel 1. Output FRGB data to be finally output are generated by performing an inverse gamma transformation on the output FRGB luminance data acquired by this correction. Such processing suppresses degradation in the resolution in the color addition processing.

A detailed description is given below of the color addition processing according to the second embodiment. The configuration of the display device 100 according to the second embodiment (that is, the configurations of the display panel 1 and the display driver 2) is similar to that according to the first embodiment. The color addition processing is performed in the image processing IP core 22 in the display driver 2.

Also in the present embodiment, F subpixel data are stored in a storage device in the display driver 2 in the advance preparation. In one embodiment, the F subpixel data may be stored in the nonvolatile memory 26 in a nonvolatile manner and read out from the nonvolatile memory 26 and stored into the register circuitry 25 on startup of the display driver 2, where the F subpixel data stored in the register circuitry 25 may be used in the color addition processing in the image processing IP core 22. Also in the present embodiment, the F subpixel data comprises the parameters FMAX, FR', FG', and FB', or a set of data from which these parameters can be calculated, similarly to the first embodiment.

Additionally, in the second embodiment, the F subpixel data comprises subpixel arrangement data indicating the arrangement of the F subpixel 8F, the R subpixel 8R, the G subpixel 8G, and the B subpixel 8B in each pixel 10 of the display panel 1. In one embodiment, the subpixel arrangement data may comprise data indicating whether the F subpixel 8F in each pixel 10 belongs to the two left subpixels in the pixel 10 or to the two right subpixels. In this case, the subpixel arrangement data are 1-bit data. In one embodiment, when the F subpixel 8F is positioned at the left end of each pixel 10 as illustrated in FIG. 2A, the subpixel arrangement data comprises data (such as data "1") indicating that the F subpixel 8F in each pixel 10 belongs to the two left subpixels in the pixel 10. Further, when the F subpixel 8F is positioned at the right end of each pixel 10 as illustrated in FIG. 2B, the subpixel arrangement data comprises data (such as data "0") indicating that the F subpixel 8F in each pixel 10 belongs to the two right subpixels in the pixel 10. As will be described later, the subpixel arrangement data are used in correction for subpixel rendering.

Figure 10:
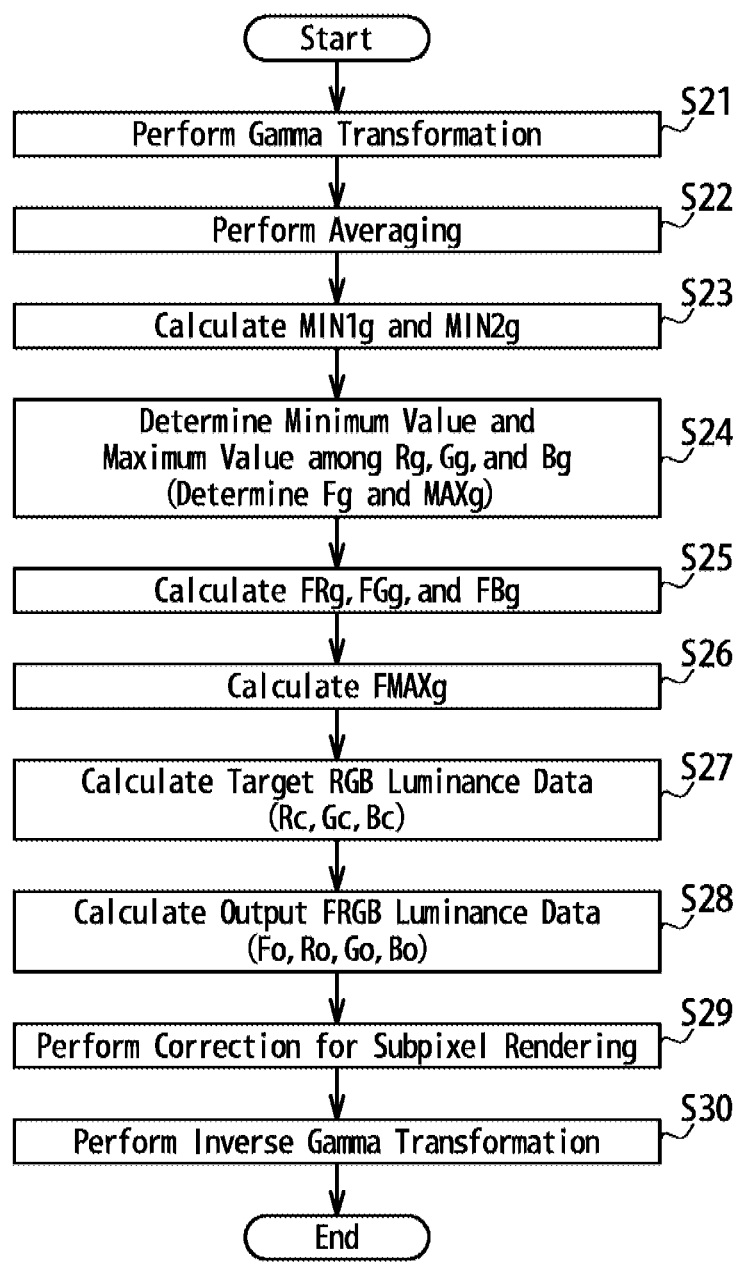
FIG. 10 is a flowchart illustrating color addition processing, according to a second embodiment.

FIG. 10 is a flowchart illustrating the color addition processing performed in the image processing IP core 22 in the second embodiment. In the present embodiment, input RGB data for two pixels adjoining in the horizontal direction are given as an input to the color addition processing, where the input RGB data are in the RGB format. With respect to the input RGB data for the two pixels, the grayscale values of the primary colors R, G, and B described in the input RGB data of a first pixel that is on the left of the two pixels are denoted as R1i, G1i, and B1i, respectively, and the grayscale values of the primary colors R, G, and B described in input RGB data of a second pixel that it on the right are denoted as R2i, G2i, and B2i, respectively. The input RGB data (R1i, G1i, B1i) and (R2i, G2i, B2i) may be RGB data acquired by performing image processing for color space management on image data supplied from the application processor 3 to the display driver 2.

In step S21, a gamma transformation is performed on input RGB data (R1i, G1i, B1i) and (R2i, G2i, B2i) for the two target pixels, and in step S22, gamma-transformed RGB data (Rg, Gg, Bg) are further calculated by averaging the RGB data for the two pixels acquired by the gamma transformation. Specifically, the gamma-transformed RGB data (Rg, Gg, Bg) are calculated in accordance with the following equations (14a) to (14c):

$$Rg=(R1i\hat{\ }\gamma+R2i\hat{\ }\gamma)/2, \tag{14a}$$

$$Gg=(G1i\hat{\ }\gamma+G2i\hat{\ }\gamma)/2, \text{ and} \tag{14b}$$

$$Bg=(B1i\hat{\ }\gamma+B2i\hat{\ }\gamma)/2, \tag{14c}$$

where γ is the gamma value set to the display device 100. Note that "^" is the symbol expressing exponentiation. Specifically, Rg is calculated as the average of the γ-th power of the grayscale value R1i and the γ-th power of the grayscale value R2i. Similarly, Gg is calculated as the average of the γ-th power of the grayscale value G1i and the γ-th power of the grayscale value G2i, and Bg is calculated as the average of the γ-th power of the grayscale value B1i and the γ-th power of the grayscale value B2i.

In step S23, the γ-th power of the minimum value among the grayscale values R1i, G1i, and B1i described in the input RGB data of the left pixel is then calculated as a parameter MIN1g, and the γ-th power of the minimum value among the grayscale value R2i, G2i, and B2i described in the input RGB data of the right pixel is calculated as a parameter MIN2g. Specifically, MIN1g and MIN2g are calculated in accordance with equations (15a) and (15b) described below:

$$MIN1g=\{Min(R1i,G1i,B1i)\}\hat{\ }\gamma, \text{ and} \tag{15a}$$

$$MIN2g=\{Min(R2i,G2i,B2i)\}\hat{\ }\gamma. \tag{15b}$$

As will be described later, the parameters MIN1g and MIN2g are used in correction for subpixel rendering.

In steps S24 to S27, output FRGB luminance data (Fo, Ro, Go, Bo) are calculated by performing processing similar to the color addition processing according to the first embodiment on the gamma-transformed RGB data (Rg, Gg, Bg) acquired in step S21.

Specifically, in step S24, the minimum value and the maximum value among Rg, Gg, and Bg are determined. The minimum value among Rg, Gg, and Bg is determined as a luminance value Fg of the color F added in the color addition processing as described in equation (7a) mentioned above, and the maximum value among Rg, Gg, and Bg is determined as MAXg as described in equation (7b).

In step S25, a luminance value FRg of a component of the primary color R of the color F, a luminance value FGg of a component of the primary color G, and a luminance value FBg of a component of the primary color B are calculated from the luminance value Fg of the color F in accordance with equations (8a) to (8c) described above. It should be noted that the added amount of the color F may be adjusted by using an appropriate value $F_{CTRL}$ in place of the maximum grayscale value $RGB_{MAX}$ in equations (8a) to (8c).

In step S26, $FMAXg$ is calculated in accordance with equations (10a) to (10c) described above. In other words, FMAXg is calculated as follows:
 (a) When Rg is selected as MAXg, FMAXg is calculated as the sum of MAXg and FRg.
 (b) When Gg is selected as MAXg, FMAXg is calculated as the sum of MAXg and FGg.
 (c) When Bg is selected as MAXg, FMAXg is calculated as the sum of MAXg and FBg.

Next, in step S27, target RGB luminance data (Rc, Gc, Bc) are calculated by multiplying the gamma-transformed RGB data (Rg, Gg, Bg) by a ratio FMAXg/MAXg. Specifically, the target RGB luminance data (Rc, Gc, Bc) are calculated in accordance with equations (11a) to (11c) described above.

In step S28, output FRGB luminance data (Fo, Ro, Go, Bo) are calculated in accordance with equations (12a) to (12d) described above. Specifically, Fo is calculated as the product of Fg and a ratio $RGB_{MAX}$/FMAX. Ro, Go, and Bo are calculated as differences acquired by subtracting FRg, FGg, and FBg from Rc, Gc, and Bc, respectively.

In step S29, rendering-corrected FRGB luminance data (Fr, Rr, Gr, Br) IS calculated by performing correction for subpixel rendering on the calculated output FRGB luminance data (Fo, Ro, Go, Bo). In the correction for subpixel rendering, a correction term Cg is first calculated based on the parameters MIN1g and MIN2g calculated in step S23 and subpixel arrangement data. Specifically, the correction term Cg is calculated as the difference acquired by subtracting MIN1g from MIN2g when the subpixel arrangement data indicate that the F subpixel 8F in each pixel 10 belongs to the two right subpixels in the pixel 10; otherwise the correction term Cg is calculated as the difference acquired by subtracting MIN2g from MIN1g.

Specifically, when the subpixel arrangement data indicate that the F subpixel 8F in each pixel 10 belongs to the two right subpixels in the pixel 10, the correction term Cg is calculated in accordance with the following equation (16a):

$$Cg=MIN2g-MIN1g. \tag{16a}$$

Further, when the subpixel arrangement data indicate that the F subpixel 8F in each pixel 10 belongs to the two left subpixels in the pixel 10, the correction term Cg is calculated in accordance with the following equation (16b) described below:

$$Cg=MIN1g-MIN2g. \tag{16b}$$

Furthermore, correction terms CRg, CGg, and CBg respectively associated with the primary colors R, G, and B are calculated based on parameters FR', FG', and FB' contained in the F subpixel data and the correction term Cg described above. In the present embodiment, the correction terms CRg, CGg, and CBg are calculated in accordance with the following equations (17a) to (17c):

$$CRg=Cg \times FR'/RGB_{MAX}, \tag{17a}$$

$$CGg=Cg \times FG'/RGB_{MAX}, \text{ and} \tag{17b}$$

$$CBg=Cg \times FB'/RGB_{MAX}. \tag{17c}$$

As described above, $RGB_{MAX}$ is the allowed maximum value of the grayscale values of the primary color R, the primary color G, and the primary color B described in input RGB data, which is given as the input to the color addition processing. When the grayscale values of the primary color R, the primary color G, and the primary color B are expressed with eight bits, $RGB_{MAX}$ is "255." In this case, equations (17a) to (17c) can be rewritten into the following equations (17a') to (17c'):

$$CRg=Cg \times FR'/255, \tag{17a'}$$

$$CGg=Cg \times FG'/255, \text{ and} \tag{17b'}$$

$$CBg=Cg \times FB'/255. \tag{17c'}$$

The rendering-corrected FRGB luminance data (Fr, Rr, Gr, Br) are calculated by correcting the output FRGB luminance data (Fo, Ro, Go, Bo) based on the correction terms Cg, CRg, CGg, and CBg. In the present embodiment, the rendering-corrected FRGB luminance data (Fr, Rr, Gr, Br) are calculated in accordance with the following equations (18a) to (18d):

$$Fr=Fo+Cg, \tag{18a}$$

$$Rr=Ro-CRg, \tag{18b}$$

$$Gr=Go-CGg, \text{ and} \tag{18c}$$

$$Br=Bo-CBg. \tag{18d}$$

Specifically, the luminance value Fr is calculated as the sum of Fo and the correction term Cg, and the luminance values Rr, Gr, and Br are calculated as differences acquired by subtracting the correction terms CRg, CGg, and CBg from the luminance values Ro, Go, and Bo, respectively.

It should be noted that the parameters FR', FG', and FB' described in the F subpixel data are used in the calculation of the correction terms CRg, CGg, and CBg. This suppresses a color change due to correction for subpixel rendering.

In step S30, output FRGB data ($F_{OUT}$, $R_{OUT}$, $G_{OUT}$, $B_{OUT}$) to be output in the color addition processing is generated by performing an inverse gamma transformation on the rendering-corrected FRGB luminance data (Fr, Rr, Gr, Br) thus acquired. Specifically, the output FRGB data ($F_{OUT}$, $R_{OUT}$, $G_{OUT}$, $B_{OUT}$) is calculated in accordance with the following equations (19a) to (19d):

$$F_{OUT}=Fr^{\wedge}(1/\gamma), \tag{19a}$$

$$R_{OUT}=Rr^{\wedge}(1/\gamma), \tag{19b}$$

$$G_{OUT}=Gr^{\wedge}(1/\gamma), \tag{19c}$$

$$B_{OUT}=Br^{\wedge}(1/\gamma), \tag{19d}$$

where γ is the gamma value γ set to the display device 100.

The output FRGB data ($F_{OUT}$, $R_{OUT}$, $G_{OUT}$, $B_{OUT}$) thus acquired may be supplied to the source driver circuitry 23 as the processed image data output from the image processing IP core 22. Alternatively, image data acquired by performing desired image processing on the output FRGB data ($F_{OUT}$, $R_{OUT}$, $G_{OUT}$, $B_{OUT}$) may be supplied to the source driver circuitry 23 as the processed image data.

Also in the color addition processing according to the second embodiment, the color addition processing is performed based on color coordinate data indicating color coordinates of the color in a predetermined color space displayed on the display panel 1 when the R subpixels 8R, the G subpixels 8G, and the B subpixels 8B of the display panel 1 are driven with drive signals corresponding to the minimum grayscale value and the F subpixels 8F are driven with drive signals corresponding to the maximum grayscale value, more specifically, based on the F subpixel data generated from the luminance coordinate data indicating the stimulus value Y and chromaticity coordinates (x, y) in the xyY color system. This suppresses a color change due to the color addition processing. Further, in the second embodiment, correction for subpixel rendering is performed based on the F subpixel data, more specifically, based on the parameters FR', FG', and FB', and the subpixel arrangement data. This prevents degradation in the resolution while suppressing a color change.

Figure 11:
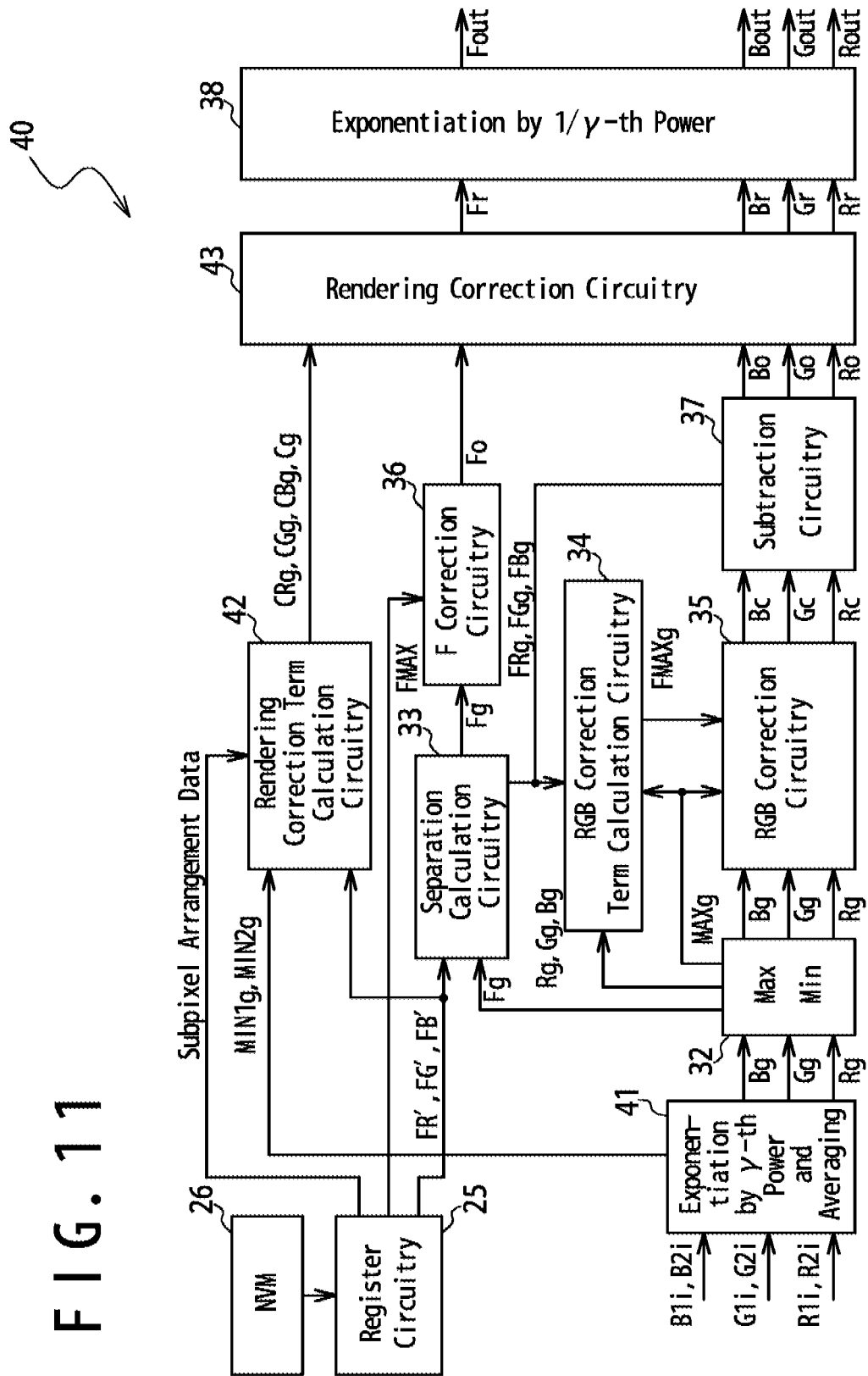
FIG. 11 is a block diagram illustrating an example configuration of color addition processing circuitry, according to a second embodiment.

FIG. 11 is a block diagram illustrating an example configuration of color addition processing circuitry 40 performing the color addition processing, according to the second embodiment. The color addition processing circuitry 40 is integrated and used in the image processing IP core 22, for example. Also in the present embodiment, the color addition processing circuitry 40 performs the color addition processing based on the F subpixel data stored in the register circuitry 25. It should be noted however that the F subpixel data stored in the register circuitry 25 comprise subpixel arrangement data in addition to parameters FMAX, FR', FG', and FB' calculated in accordance with equations (5a) to (5d) described above. In one embodiment, the F subpixel data may be stored in the nonvolatile memory 26 in a nonvolatile manner, read out from the nonvolatile memory 26, and stored into the register circuitry 25 on startup of the display driver 2, and the F subpixel data stored in the register circuitry 25 may be used in the color addition processing in the color addition processing circuitry 40.

The color addition processing circuitry 40 according to the second embodiment is configured generally similarly to that of the color addition processing circuitry 30 according to the first embodiment illustrated in FIG. 8. Specifically, the color addition processing circuitry 40 according to the second embodiment comprises maximum-minimum determination circuitry 32, separation calculation circuitry 33, RGB correction term calculation circuitry 34, RGB correction circuitry 35, F correction circuitry 36, subtraction circuitry 37, and inverse gamma transformation circuitry 38, similarly to the color addition processing circuitry 30 according to the first embodiment.

Note that the color addition processing circuitry 40 according to the second embodiment comprises gamma transformation/averaging circuitry 41 in place of the gamma transformation circuitry 31. Further, the color addition processing circuitry 40 additionally comprises rendering correction term calculation circuitry 42 and rendering correction circuitry 43.

The gamma transformation/averaging circuitry 41 operates as follows: The gamma transformation/averaging circuitry 41 performs a gamma transformation on input RGB data (R1i, G1i, B1i) and (R2i, G2i, B2i) for two pixels of interest, and calculates gamma-transformed RGB data (Rg, Gg, Bg) by averaging the RGB data of the two pixels acquired by the gamma transformation. The gamma-transformed RGB data (Rg, Gg, Bg) is calculated in accordance with equations (14a) to (14c) described above. The thus calculated gamma-transformed RGB data (Rg, Gg, Bg) is supplied to the maximum-minimum determination circuitry 32.

The gamma transformation/averaging circuitry 41 further calculates the γ-th power of the minimum value among the grayscale values R1i, G1i, and B1i described in the input RGB data of the left pixel as the parameter MIN1g and calculates the γ-th power of the minimum value among the grayscale values R2i, G2i, and B2i described in the input RGB data of the right pixel as the parameter MIN2g. The calculated parameters MIN1g and MIN2g are supplied to the rendering correction term calculation circuitry 42.

The operations of the maximum-minimum determination circuitry 32, the separation calculation circuitry 33, the RGB correction term calculation circuitry 34, the RGB correction circuitry 35, the F correction circuitry 36, and the subtraction circuitry 37 are as described in the first embodiment. The luminance value Fo in the output FRGB luminance data (Fo, Ro, Go, Bo) is output from the F correction circuitry 36, and luminance values Ro, Go, and Bo in the output FRGB luminance data (Fo, Ro, Go, Bo) are output from the subtraction circuitry 37.

The rendering correction term calculation circuitry 42 calculates the correction terms Cg, CRg, CGg, and CBg based on the parameters FR', FG', and FB' and the subpixel arrangement data contained in the F subpixel data stored in the register circuitry 25, and the parameters MIN1g and MIN2g received from the gamma transformation/averaging circuitry 41. The correction term Cg is calculated in accordance with equation (16a) or (16b) depending on the subpixel arrangement data, and the correction terms CRg, CGg, and CBg are calculated in accordance with equations (17a) to (17c).

The rendering correction circuitry 43 calculates the rendering-corrected FRGB luminance data (Fr, Rr, Gr, Br) by correcting the output FRGB luminance data (Fo, Ro, Go, Bo) based on the correction terms Cg, CRg, CGg, and CBg received from the rendering correction term calculation circuitry 42. In the present embodiment, the rendering-corrected FRGB luminance data (Fr, Rr, Gr, Br) is calculated in accordance with equations (18a) to (18d) described above. The inverse gamma transformation circuitry 38 generates the output FRGB data ($F_{OUT}$, $R_{OUT}$, $G_{OUT}$, $B_{OUT}$) to be finally output in the color addition processing, by performing the inverse gamma transformation on the calculated rendering-corrected FRGB luminance data (Fr, Rr, Gr, Br). The output FRGB data ($F_{OUT}$, $R_{OUT}$, $G_{OUT}$, $B_{OUT}$) is calculated in accordance with equations (19a) to (19d) described above.

Accordingly, the color addition processing circuitry 40 thus configured can execute the aforementioned color addition processing according to the second embodiment.

Figure 12:
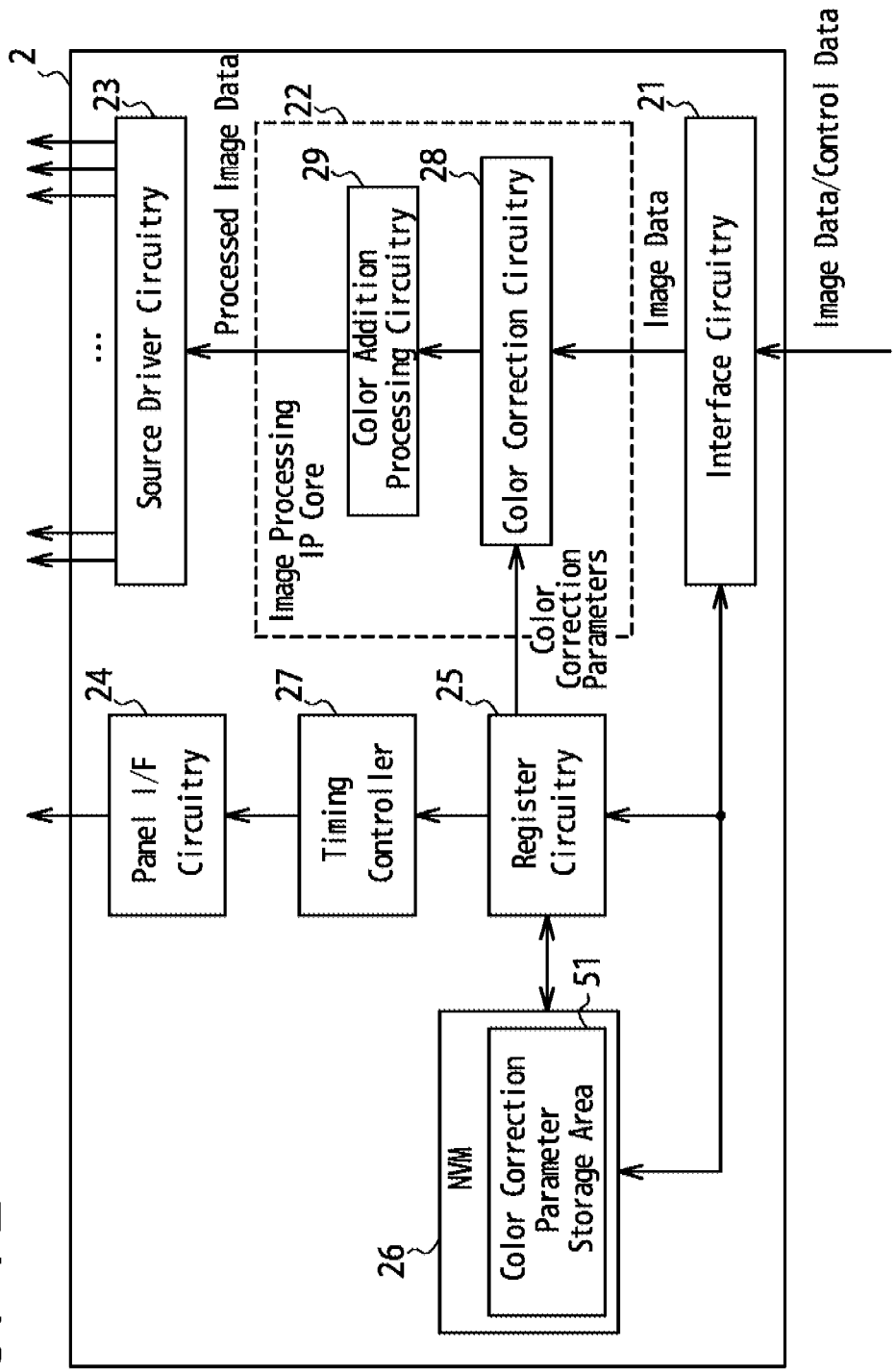
FIG. 12 is a block diagram illustrating a configuration of a display driver, according to a third embodiment.

FIG. 12 is a block diagram illustrating the configuration of a display driver 2, according to a third embodiment. In the present embodiment, the image processing IP core 22 comprises color correction circuitry 28 that performs color correction processing and color addition processing circuitry 29 that performs color addition processing.

The color correction circuitry 28 generates color-corrected RGB data by performing color correction processing on RGB-format image data received from interface circuitry 21. The color correction processing in the color correction circuitry 28 is performed based on color correction parameters supplied from register circuitry 25. The color correction parameters specify how the color correction processing is performed in the color correction circuitry 28, including a degree of emphasis on each primary color and a degree of emphasis on saturation.

The color correction parameters are stored in a color correction parameter storage area 51 in the nonvolatile memory 26 in a nonvolatile manner. The color correction parameters stored in the color correction parameter storage area 51 are read out and stored into the register circuitry 25 on startup of the display driver 2, and the color correction parameters stored in the register circuitry 25 are supplied to the color correction circuitry 28. The color correction circuitry 28 performs the color correction processing based on the color correction parameters received from the register circuitry 25.

The color addition processing circuitry 29 generates FRGB data by performing color addition processing on the color-corrected RGB data received from the color correction circuitry 28. As described above, the FRGB data are image data in a format describing grayscale values of the R subpixel, the G subpixel, the B subpixel, and the F subpixel in each pixel. The generated FRGB data or image data acquired by performing desired image processing on the FRGB data are supplied to the source driver circuitry 23 as processed image data.

To provide desired color adjustment, such as desired color space management, the color correction parameters used in the color correction processing are optimally calculated. In the present embodiment, the color correction parameters are calculated in consideration of a color change in color addition processing to thereby finally acquire image data subjected to the desired color adjustment. In the following, a description is given of a technology for calculating suitable color correction parameters in consideration of a color change in the color addition processing.

In the calculation of the color correction parameters in the present embodiment, color coordinate data indicating color coordinates of the color F for the maximum grayscale value in a predetermined color space are acquired, and the acquired color coordinate data are used in the calculation of the color correction parameters. More strictly, the color coordinate data of the color F for the maximum grayscale value are data indicating color coordinates of the displayed color in the predetermined color space displayed on the display panel 1 when the R subpixels 8R, the G subpixels 8G, and the B subpixels 8B of the display panel 1 are driven with drive signals corresponding to the minimum grayscale value, and the F subpixels 8F are driven with drive signals corresponding to the maximum grayscale value.

In the present embodiment, the acquired color coordinate data of the color F for the maximum grayscale value are used for evaluating properness of the color correction parameters. The properness of the color correction parameters is evaluated schematically as described below.

Calibration target RGB data (Ri, Gi, Bi) and target RGB data (Rt, Gt, Bt) associated therewith are previously prepared. The calibration target RGB data (Ri, Gi, Bi) are RGB data for which the properness of the color correction parameters are determined. The target RGB data (Rt, Gt, Bt) are data indicating, in the RGB format, a target color to be displayed when the color correction processing and the color addition processing are performed on the calibration target RGB data (Ri, Gi, Bi) and are used for determining whether the color correction parameters are proper with respect to the associated calibration target RGB data (Ri, Gi, Bi).

Color-corrected RGB data are generated by performing the color correction processing on the calibration target RGB data (Ri, Gi, Bi) by use of the color correction parameters for which the properness is to be evaluated, and FRGB data (Fa, Ra, Ga, Ba) are further generated by performing the color addition processing on the color-corrected RGB data, where Fa, Ra, Ga, and Ba are grayscale values of an F subpixel 8F, an R subpixel 8R, a G subpixel 8G, and a B subpixel 8B, respectively. RGB luminance component data (Rr, Gr, Br) that represent, in the RGB format, a color displayed on the display panel 1 when the display panel 1 is driven according to the FRGB data are calculated by use of the color coordinate data of the color F for the maximum grayscale value. The RGB luminance component data (Rr, Gr, Br) indicates components of the primary color R, the primary color G, and the primary color B of the color displayed on the display panel 1 when the display panel 1 is driven based on the FRGB data. Since the color coordinate data of the color F for the maximum grayscale value comprise information about the color displayed by the F subpixels 8F, the RGB luminance component data (Rr, Gr, Br) can be calculated from the FRGB data.

The properness of the color correction parameters is determined based on a comparison result between the RGB luminance component data (Rr, Gr, Br) and the target RGB data (Rt, Gt, Bt), that is, the similarity therebetween. When the RGB luminance component data (Rr, Gr, Br) match the target RGB data (Rt, Gt, Bt) or are close to the target RGB data (Rt, Gt, Bt), the color correction parameters are determined to be proper. When the RGB luminance component data (Rr, Gr, Br) largely differ from the target RGB data (Rt, Gt, Bt), the color correction parameters are determined to be improper, and the color correction parameters are adjusted. After the color correction parameters are adjusted, a similar evaluation is performed on the adjusted color correction parameters. Such a procedure is repeated until the color correction parameters are determined to be proper. The color correction parameters determined to be proper are stored in the nonvolatile memory 26 in the display driver 2.

In one embodiment, the color coordinate data of the color F for the maximum grayscale value may be acquired by performing actual measurement on the display panel 1. In this case, the color coordinate data indicating color coordinates of the displayed color in the predetermined color space displayed on the display panel 1 in a state in which the F subpixels 8F of all the pixels 10 of the display panel 1 are driven with drive signals corresponding to the maximum grayscale value and the other subpixels, that is, the R subpixels 8R, the G subpixels 8G, and the B subpixels 8B are driven with drive signals corresponding to the minimum grayscale value are measured as the color coordinate data of the color F for the maximum grayscale value by a measurement device such as a luminance meter. For example, the xyY color system may be used as the color space. In this case, the color coordinate data of the color F may be acquired as luminance coordinate data indicating a stimulus value (luminance) Y and chromaticity coordinates (x, y) in the xyY color system.

In another embodiment, the color coordinate data of the color F for the maximum grayscale value, that is, color coordinate data or luminance coordinate data of the displayed color displayed on the display panel 1 when the R subpixels 8R, the G subpixels 8G, and the B subpixels 8B of the display panel 1 are driven with drive signals corresponding to the minimum grayscale value and the F subpixel 8F are driven with drive signals corresponding to the maximum grayscale value may be calculated from design data of the display panel 1, such as data indicating the characteristics of a filter disposed in the display panel 1.

The number of additional colors F other than the primary color R, the primary color G, and the primary color B is not limited to one. When the number of additional colors F is two or more, color coordinate data of each additional color F are acquired for the maximum grayscale value, and the acquired color coordinate data are used for evaluating the properness of the color correction parameters.

Figure 13:
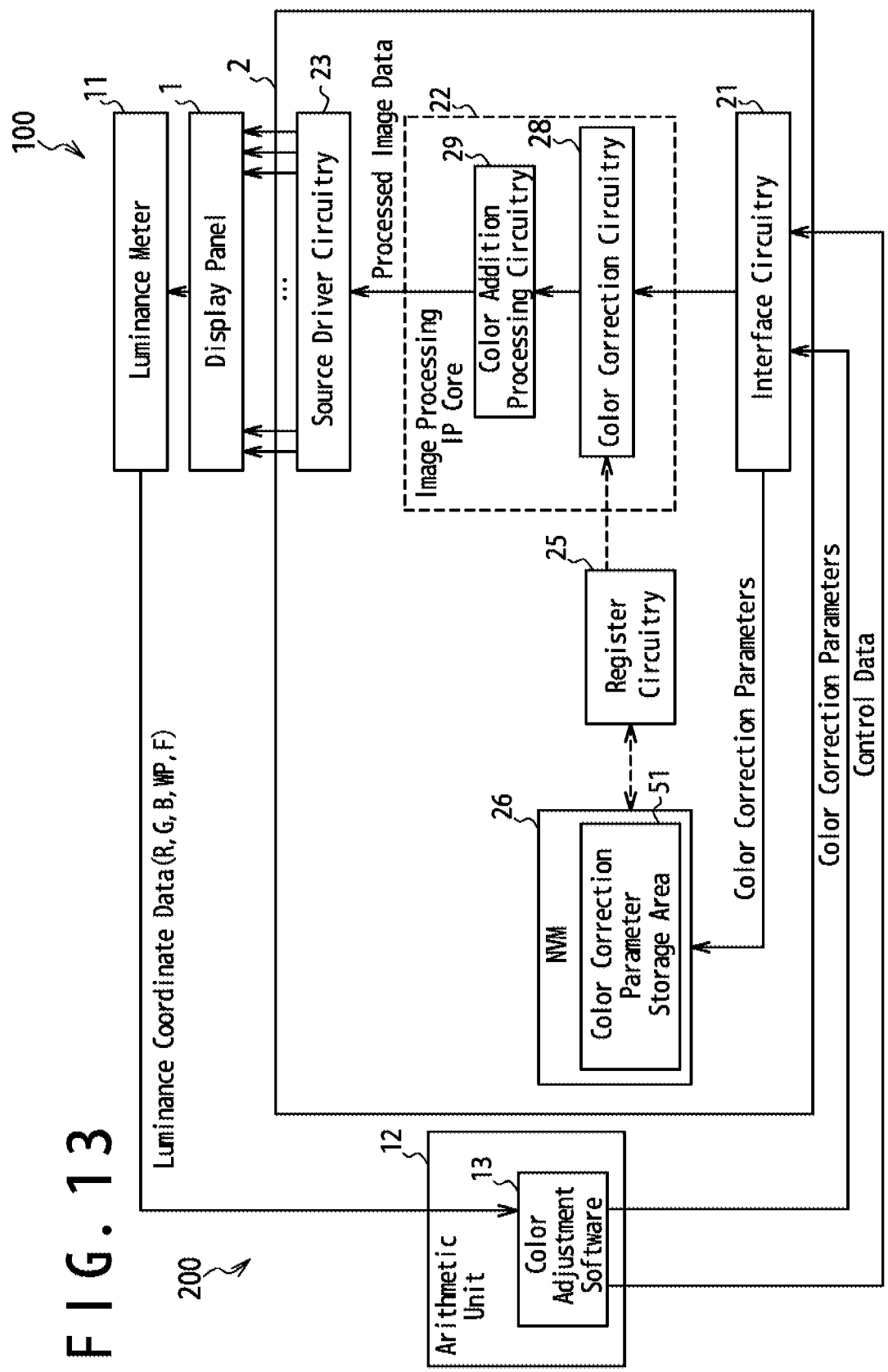
FIG. 13 is a block diagram illustrating a configuration of a color adjustment device, according to a third embodiment.

In the following, a description is given of calculation of the color correction parameters according to the present embodiment. FIG. 13 is a block diagram illustrating a configuration of a color adjustment device 200 used for optimally calculating color correction parameters to be set to the display driver 2 in the present embodiment. The color adjustment device 200 comprising a luminance meter 11 and an arithmetic unit 12.

The luminance meter 11 measures color coordinates of a displayed color in a predetermined color space displayed on the display panel 1, generates color coordinate data indicating the color coordinates, and supplies the color coordinate data to the arithmetic unit 12. In the present embodiment, the luminance meter 11 measures a stimulus value (luminance) Y and chromaticity coordinates (x, y) in the xyY color system and supplies luminance coordinate data indicating the measured stimulus value Y and the measured chromaticity coordinates (x, y) to the arithmetic unit 12 as the color coordinate data described above. As will be described later, in the present embodiment, luminance coordinate data indicating a stimulus value Y and chromaticity coordinates (x, y) when the primary color R, the primary color G, the primary color B, and the color F are displayed on the display panel 1 with the maximum grayscale value, and luminance coordinate data indicating the stimulus value Y and chromaticity coordinates (x, y) of the white point (WP) of the display panel 1 are acquired by the luminance meter 11, and the acquired luminance coordinate data are supplied to the arithmetic unit 12.

Figure 14:
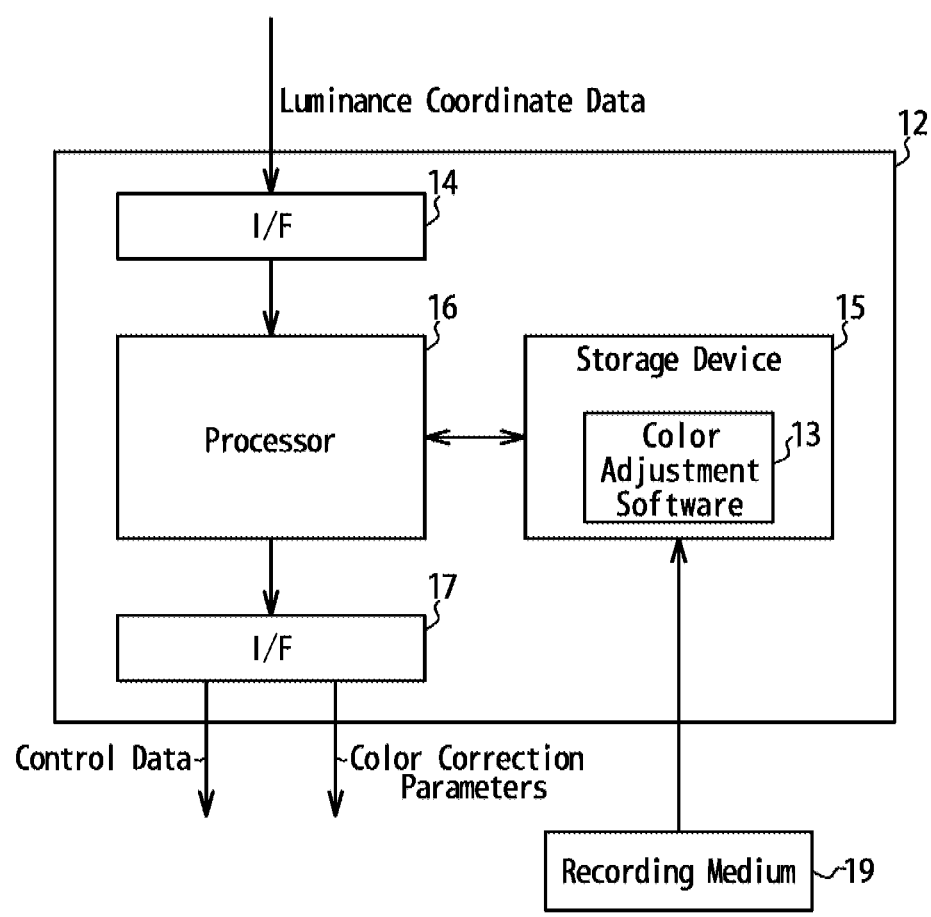
FIG. 14 is a block diagram illustrating a configuration of an arithmetic unit in the color adjustment device, according to a third embodiment.

The arithmetic unit 12 calculates the color correction parameters to be set to the display driver 2 from color coordinate data, luminance coordinate data in the present embodiment, received from the luminance meter 11. FIG. 14 is a block diagram illustrating an example configuration of the arithmetic unit 12.

In the present embodiment, the arithmetic unit 12, which is configured as a computer on which color adjustment software 13 is installed, comprises an interface 14, a storage device 15, a processor 16, and an interface 17. The interface 14 receives color coordinate data, that is, luminance coordinate data in the present embodiment, from the luminance meter 11.

The storage device 15 is used as a non-transitory tangible storage medium storing the color adjustment software 13 for calculating the color correction parameters. The calculation of the color correction parameters is performed by executing the color adjustment software 13 by the processor 16. In addition to the calculation of the color correction parameters, the color adjustment software 13 also performs processing of generating image data and control data to be supplied to the display driver 2 in the calculation process of the color correction parameters. The color adjustment software 13 may be provided as a computer program product recorded on a non-transitory tangible computer-readable recording medium 19 or may be provided as a computer program product downloadable from a server. The storage device 15 is also used as a work area for the calculation of the color correction parameters. The storage device 15 stores various data used in the calculation process of the color correction parameters and generated in the calculation process, such as the aforementioned luminance coordinate data. The interface 17 transmits the calculated color correction parameters to the display driver 2 and further transmits the image data and control data to be supplied to the display driver 2 in the calculation process of the color correction parameters to the display driver 2.

The storage device 15 in the arithmetic unit 12 stores calibration target RGB data (Ri, Gi, Bi) and target RGB data (Rt, Gt, Bt) associated therewith. The calibration target RGB data (Ri, Gi, Bi) are RGB data for which the properness of color correction parameters is to be determined. The target RGB data (Rt, Gt, Bt) are data indicating a target color to be displayed when the color correction processing and the color addition processing are performed on the calibration target RGB data (Ri, Gi, Bi) and are used for determining whether the color correction parameters are proper with respect to the associated calibration target RGB data (Ri, Gi, Bi). The number of sets of calibration target RGB data (Ri, Gi, Bi) and target RGB data (Rt, Gt, Bt) stored in the storage device 15 may be one or more than one.

Figure 15:
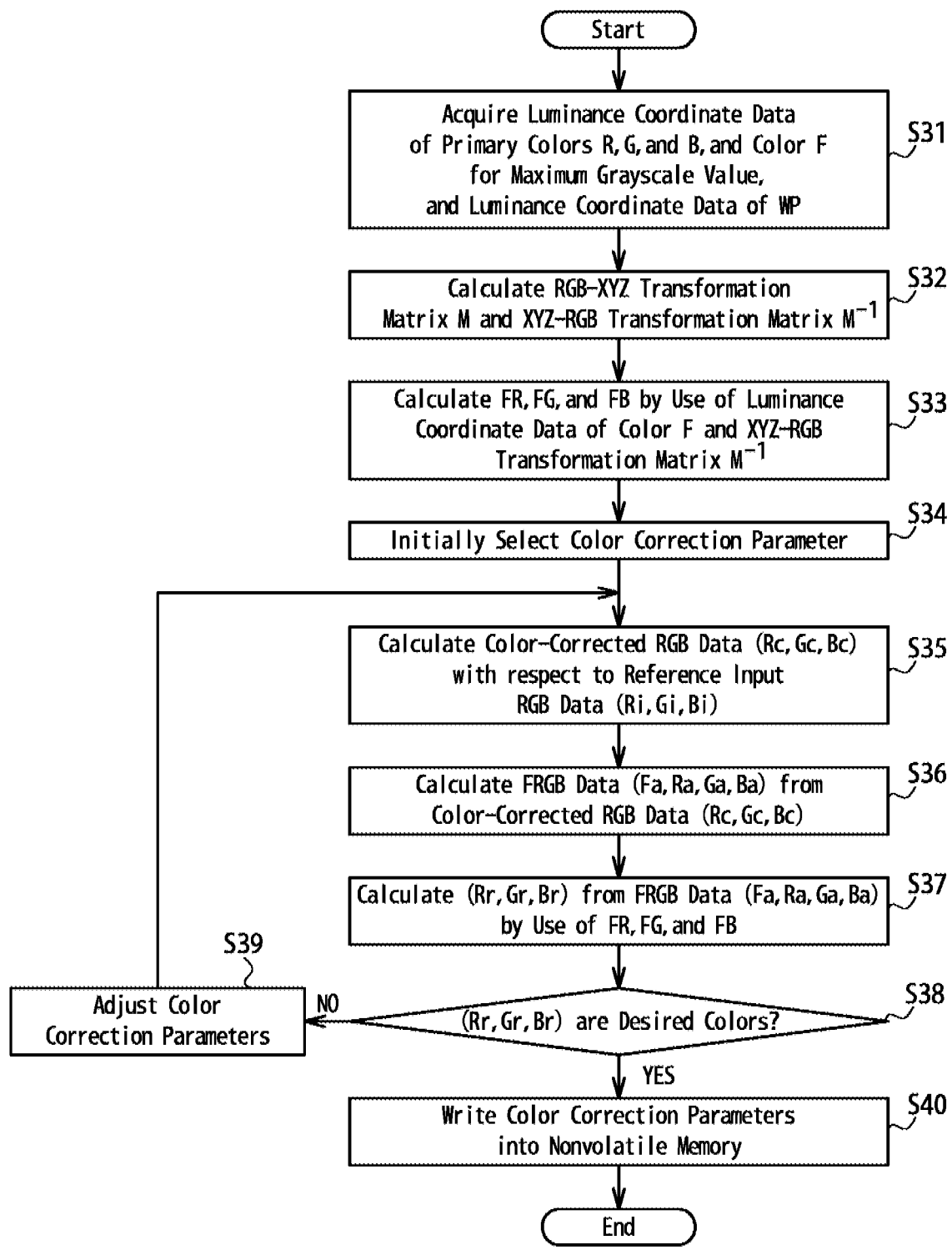
FIG. 15 is a flowchart illustrating a calculation procedure of color adjustment parameters, according to a third embodiment.

A description is then given of a calculation procedure of the color correction parameters using the color adjustment device 200 illustrated in FIG. 13. FIG. 15 is a flowchart illustrating a calculation procedure of the color correction parameters in the present embodiment. Each step illustrated in FIG. 15 is executed by executing the color adjustment software 13 by the processor 16 in the arithmetic unit 12.

In step S31, luminance coordinate data of the primary color R, the primary color G, the primary color B, and the color F for the maximum grayscale value, and luminance coordinate data of the white point (WP) are acquired.

In the present embodiment, the luminance coordinate data of the primary color R for the maximum grayscale value are acquired as data comprising a stimulus value Y and chromaticity coordinates (x, y) of the displayed color in the xyY color system displayed on the display panel 1 in a state in which the R subpixels 8R of the display panel 1 are driven with drive signals corresponding to the maximum grayscale value and the other subpixels, that is, the F subpixels 8F, the G subpixels 8G, and the B subpixels 8B are driven with drive signals corresponding to the minimum grayscale value. The luminance coordinate data of the primary color R for the maximum grayscale value may be hereinafter denoted as (RY, Rx, Ry), where RY denotes a stimulus value Y of the primary color R, and Rx and Ry are chromaticity coordinates x and y of the primary color R, respectively.

In one embodiment, in the acquisition of the luminance coordinate data of the primary color R for the maximum grayscale value, the color adjustment software 13 transmits, to the display driver 2, control data instructing the image processing IP core 22 to supply, as the processed image data supplied to the source driver circuitry 23, image data in which the grayscale values of the R subpixels 8R of all the pixels 10 are the maximum grayscale value and the grayscale values of the F subpixels 8F, the G subpixels 8G, and the B subpixels 8B of all the pixels 10 are the minimum grayscale value. While the source driver circuitry 23 drives the display panel 1 based on the thus generated processed image data, the color adjustment software 13 measures luminance coordinate data of a displayed color displayed on the display panel 1 by controlling the luminance meter 11. The thus acquired luminance coordinate data are the luminance coordinate data of the primary color R for the maximum grayscale value.

Similarly, the luminance coordinate data of the primary color G for the maximum grayscale value is acquired as data comprising a stimulus value Y and chromaticity coordinates (x, y) of the displayed color in the xyY color system displayed on the display panel 1 in a state in which the G subpixels 8G of the display panel 1 are driven with drive signals corresponding to the maximum grayscale value and the other subpixels, that is, the F subpixels 8F, the R subpixels 8R, and the B subpixels 8B are driven with drive signals corresponding to the minimum grayscale value. The luminance coordinate data of the primary color G for the maximum grayscale value may be hereinafter denoted as (GY, Gx, Gy), where GY denotes a stimulus value Y of the primary color G, and Gx and Gy denote chromaticity coordinates x and y of the primary color G, respectively. The luminance coordinate data of the primary color G for the maximum grayscale value are measured similarly to the luminance coordinate data of the primary color R for the maximum grayscale value except that image data in which the grayscale values of the G subpixels 8G of all the pixels 10 are the maximum grayscale value, and the grayscale values of the F subpixels 8F, the R subpixels 8R, and the B subpixels 8B of all the pixels 10 are the minimum grayscale value are supplied to the source driver circuitry 23.

Further, the luminance coordinate data of the primary color B with the maximum grayscale value are acquired as data including a stimulus value Y and chromaticity coordinates (x, y) of the displayed color in the xyY color system displayed on the display panel 1 in a state in which the B subpixels 8B of the display panel 1 are driven with drive signals corresponding to the maximum grayscale value and the other subpixels, that is, the F subpixels 8F, the R subpixels 8R, and the G subpixels 8G are driven with drive signals corresponding to the minimum grayscale value. The luminance coordinate data of the primary color B with the maximum grayscale value may be hereinafter denoted as (BY, Bx, By), where BY denotes a stimulus value Y of the primary color B, and Bx and By denote chromaticity coordinates x and y of the primary color B, respectively. The luminance coordinate data of the primary color B for the maximum grayscale value are measured similarly to the luminance coordinate data of the primary color R and the primary color G for the maximum grayscale value except that image data in which the grayscale values of the B subpixels 8B of all the pixels 10 are the maximum grayscale value, and the grayscale values of the F subpixels 8F, the R subpixels 8R, and the G subpixels 8G of all the pixels 10 are the minimum grayscale value are supplied to the source driver circuitry 23.

Furthermore, the luminance coordinate data of the color F for the maximum grayscale value are acquired as data including a stimulus value Y and chromaticity coordinates (x, y) of the displayed color in the xyY color system displayed on the display panel 1 in a state in which the F subpixels 8F of the display panel 1 is driven with drive signals corresponding to the maximum grayscale value and the other subpixels, that is, the R subpixels 8R, the G subpixels 8G, and the B subpixels 8B are driven with drive signals corresponding to the minimum grayscale value. The luminance coordinate data of the color F may be hereinafter denoted as (FY, Fx, Fy), where FY denotes a stimulus value Y of the color F, and Fx and Fy denote chromaticity coordinates x and y of the color F, respectively. The luminance coordinate data of the color F for the maximum grayscale value are measured similarly to the luminance coordinate data of the primary color R, the primary color G, and the primary color B for the maximum grayscale value except that image data in which the grayscale values of the F subpixels 8F of all the pixels 10 are the maximum grayscale value, and the grayscale values of the R subpixels 8R, the G subpixels 8G, and the B subpixels 8B of all the pixels 10 are the minimum grayscale value are supplied to the source driver circuitry 23.

Meanwhile, the luminance coordinate data of the white point (WP) are measured as data including a stimulus value Y and chromaticity coordinates (x, y) of the displayed color in the xyY color system displayed on the display panel 1 in a state in which the R subpixels 8R, the G subpixels 8G, and the B subpixels 8B of the display panel 1 are driven with drive signals corresponding to the maximum grayscale value and the F subpixels 8F are driven with drive signals corresponding to the minimum grayscale value. The luminance coordinate data of the white point may be hereinafter denoted as (WY, Wx, Wy), where WY denotes a stimulus value Y of the white point, and Wx and Wy denote chromaticity coordinates x and y of the white point, respectively.

In acquisition of the luminance coordinate data of the white point (WP), the color adjustment software 13 transmits, to the display driver 2, control data instructing the image processing IP core 22 to supply, as the processed image data supplied to the source driver circuitry 23, image data in which the grayscale values of the R subpixel 8R, the G subpixel 8G, and the B subpixel 8B of all the pixels 10 are the maximum grayscale value and the grayscale values of the F subpixels 8F of all the pixels 10 are the minimum grayscale value. While the source driver circuitry 23 drives the display panel 1 according to the thus generated processed image data, the color adjustment software 13 measures the luminance coordinate data of the displayed color displayed on the display panel 1 by controlling the luminance meter 11. The luminance coordinate data thus acquired are the luminance coordinate data of the white point (WP).

A chromaticity diagram in FIG. 16 illustrates the luminance coordinate data of the primary color R, the primary color G, the primary color B, and the color F for the maximum grayscale value and luminance coordinate data of the white point (WP) in the xyY color system.

While the luminance coordinate data of the primary color R, the primary color G, the primary color B, and the color F for the maximum grayscale value and luminance coordinate data of the white point (WP) are acquired by performing a measurement on the display panel 1 in the description above, the luminance coordinate data of the primary color R, the primary color G, the primary color B, and the color F for the maximum grayscale value and the luminance coordinate data of the white point (WP) may be acquired from design data of the display panel 1, such as data indicating the characteristics of the filter disposed on the display panel 1.

Referring back to FIG. 15, in step S32 following step S31, an RGB-XYZ transformation matrix M indicating display characteristics of the display panel 1 when an image is displayed by use of only the R subpixels 8R, the G subpixels 8G, and the B subpixels 8B without using the F subpixels 8F, and an XYZ-RGB transformation matrix $M^{-1}$ that is an inverse matrix of the RGB-XYZ transformation matrix M are calculated with respect to the display panel 1. In one embodiment, the calculation of the RGB-XYZ transformation matrix M and the XYZ-RGB transformation matrix $M^{-1}$ is performed by the following procedure.

First, based on the luminance coordinate data of the primary color R, the primary color G, the primary color B for the maximum grayscale value and the luminance coordinate data of the white point (WP) acquired in step S31, the RGB-XYZ transformation matrix indicating the display characteristics of the display panel 1 is calculated. The RGB-XYZ transformation matrix is calculated as a transformation matrix M in equation (21a) described below:

$$M = \begin{pmatrix} rRx/Ry & gGx/Gy & bBx/By \\ r & g & b \\ rRz/Ry & gGz/Gy & bBz/By \end{pmatrix} \quad (21a)$$

Note that r, g, and b denote the luminances of the primary colors R, G, and B, respectively, in an assumption that the luminance of the white point is 1, and are acquired by solving simultaneous equation (21b) described below:

$$\begin{pmatrix} Wx/Wy \\ 1 \\ Wz/Wy \end{pmatrix} = \begin{pmatrix} Rx/Ry & Gx/Gy & Bx/By \\ 1 & 1 & 1 \\ Rz/Ry & Gz/Gy & Bz/By \end{pmatrix} \begin{pmatrix} r \\ g \\ b \end{pmatrix} \quad (21b)$$

The XYZ-RGB transformation matrix is acquired as the inverse matrix $M^{-1}$ of the RGB-XYZ transformation matrix M. Specifically, the XYZ-RGB transformation matrix $M^{-1}$ is expressed by equation (22) described below.

$$M^{-1} = \begin{pmatrix} rRx/Ry & gGx/Gy & bBx/By \\ r & g & b \\ rRz/Ry & gGz/Gy & bBz/By \end{pmatrix}^{-1} \quad (22)$$

Furthermore, in step S33, RGB data (FR, FG, FB) of the color F is calculated based on the luminance coordinate data (FY, Fx, Fy) of the color F for the maximum grayscale value and XYZ-RGB transformation matrix $M^{-1}$. The RGB data (FR, FG, FB) of the color F is data indicating a ratio among components of the primary color R, the primary color G, and the primary color B of the displayed color displayed on the display panel 1 in a state in which the F subpixels 8F of the display panel 1 are driven with drive signals corresponding to the maximum grayscale value and the other subpixels (the R subpixels 8R, the G subpixels 8G, and the B subpixels 8B) are driven with drive signals corresponding to the minimum grayscale value.

Specifically, the luminance coordinate data (FY, Fx, Fy) of the color F for the maximum grayscale value are first transformed into color coordinate data (FX, FY, FZ) in the XYZ color system in accordance with expressions (23a) and (23b) described below.

$$FX = FY \times Fx/Fy, \text{ and} \quad (23a)$$

$$FZ = FY \times (1 - Fx - Fy)/Fy. \quad (23b)$$

The stimulus value FY in the luminance coordinate data are used as FY in the color coordinate data in the XYZ color system without modification.

Furthermore, RGB data (FR, FG, FB) of the color F is calculated through an XYZ-RGB transformation by applying the XYZ-RGB transformation matrix to the color coordinate data (FX, FY, FZ) of the color F. The RGB data (FR, FG, FB) of the color F is expressed as equation (24) described below.

$$\begin{pmatrix} FR \\ FG \\ FB \end{pmatrix} = M^{-1} \begin{pmatrix} FX \\ FY \\ FZ \end{pmatrix} \quad (24)$$

In steps S34 to S39, color correction parameters are calculated by use of the thus calculated RGB data (FR, FG, FB) of the color F. Specifically, the color correction parameters are calculated by the following procedure.

In step S34, color correction parameters are initially selected by an appropriate technique. In one embodiment, color correction parameters previously prepared in the storage device 15 in the arithmetic unit 12 are selected. The color correction parameters may be arbitrarily selected in step S34 since the color correction parameters are adjusted in a later step when the color correction parameters are not proper.

Next, in steps S35 to S38, the properness of the selected color correction parameters is determined.

Specifically, in step S35, color-corrected RGB data (Rc, Gc, Bc) are calculated by performing color correction processing on the calibration target RGB data (Ri, Gi, Bi) based on the color correction parameters selected in step S34. As described above, the calibration target RGB data (Ri, Gi, Bi) are RGB data for which the properness of the color correction parameters is determined. The color adjustment software 13 performs, by software processing, the same color correction processing as the color correction processing performed in the color correction circuitry 28 in the image processing IP core 22 in the display driver 2. In step S35, color-corrected RGB data (Rc, Gc, Bc) are calculated by executing, by the color adjustment software 13, the same color correction processing as the color correction processing performed in the color correction circuitry 28. When a plurality of sets of calibration target RGB data (Ri, Gi, Bi) and target RGB data (Rt, Gt, Bt) are prepared, a plurality of color-corrected RGB data (Rc, Gc, Bc) respectively associated with the plurality of calibration target RGB data (Ri, Gi, Bi) are calculated.

In step S36, FRGB data (Fa, Ra, Ga, Ba) are then calculated by performing color addition processing on the color-corrected RGB data (Rc, Gc, Bc). The color adjustment software 13 performs, by software processing, the same color addition processing as the color addition processing performed in the color addition processing circuitry 29 in the image processing IP core 22 in the display driver 2, and in step S36, FRGB data (Fa, Ra, Ga, Ba) are calculated by the color adjustment software 13 by executing the same color addition processing as the color addition processing performed in the color addition processing circuitry 29. When a plurality of sets of calibration target RGB data (Ri, Gi, Bi) and target RGB data (Rt, Gt, Bt) are prepared, in other words, when a plurality of color-corrected RGB data (Rc, Gc, Bc) are calculated in step S36, a plurality of FRGB data (Fa, Ra, Ga, Ba) respectively associated with the plurality of pieces of color-corrected RGB data (Rc, Gc, Bc) are calculated.

In step S37, RGB luminance component data (Rr, Gr, Br) are then calculated from the FRGB data (Fa, Ra, Ga, Ba) by use of the RGB data (FR, FG, FB) of the color F calculated in step S33. The RGB luminance component data (Rr, Gr, Br) are data indicating luminance components of the primary color R, the primary color G, and the primary color B in the color displayed on the display panel 1 when the display panel 1 is driven based on the FRGB data (Fa, Ra, Ga, Ba), and the RGB luminance component data (Rr, Gr, Br) are calculated in accordance with equations (25a) to (25c) described below in the present embodiment:

$$Rr=Ra+\{FRGB_{MAX}\times[(Fa/FRGB_{MAX})^{\gamma}\times(FR/FRGB_{MAX})]^{1/\gamma}\} \quad (25a)$$

$$Gr=Ga+\{FRGB_{MAX}\times[(Fa/FRGB_{MAX})^{\gamma}\times(FG/FRGB_{MAX})]^{1/\gamma}\} \quad (25b)$$

$$Br=Ba+\{FRGB_{MAX}\times[(Fa/FRGB_{MAX})^{\gamma}\times(FB/FRGB_{MAX})]^{1/\gamma}\} \quad (25c)$$

Note that γ is the gamma value set to the display device 100. Further, $FRGB_{MAX}$ is the allowed maximum grayscale value of the grayscale values of the R subpixels 8R, the G subpixels 8G, the B subpixels 8B, and the F subpixels 8F described in the FRGB data (Fa, Ra, Ga, Ba). When the grayscale values of the R subpixels 8R, the G subpixels 8G, the B subpixels 8B, and the F subpixels 8F are expressed by eight bits, $FRGB_{MAX}$ is "255." In this case, equations (25a) to (25c) can be rewritten to equations (25a') to (25c') described below:

$$Rr=Ra+\{255\times[(Fa/255)^{\gamma}\times(FR/255)]^{1/\gamma}\} \quad (25a')$$

$$Gr=Ga+\{255\times[(Fa/255)^{\gamma}\times(FG/255)]^{1/\gamma}\} \quad (25b')$$

$$Br=Ba+\{255\times[(Fa/255)^{\gamma}\times(FB/255)]^{1/\gamma}\} \quad (25c')$$

In step S38, the properness of the color correction parameters selected in step S34 is determined based on the calculated RGB luminance component data (Rr, Gr, Br). As described above, the RGB luminance component data (Rr, Gr, Br) indicate the luminance components of the primary color R, the primary color G, and the primary color B in the color displayed on the display panel 1 when the display panel 1 is driven based on the FRGB data (Fa, Ra, Ga, Ba). Accordingly, the properness of the color correction parameters can be determined based on the RGB luminance component data (Rr, Gr, Br) and target RGB data (Rt, Gt, Bt). For example, when the RGB luminance component data (Rr, Gr, Br) calculated in step S37 match the target RGB data (Rt, Gt, Bt) or are close to the target RGB data (Rt, Gt, Bt), the color correction parameters are determined to be proper. On the other hand, when the RGB luminance component data (Rr, Gr, Br) largely differ from the target RGB data (Rt, Gt, Bt), the color correction parameters are determined to be improper.

In one embodiment, a degree of similarity between the RGB luminance component data (Rr, Gr, Br) and the target RGB data (Rt, Gt, Bt) may be calculated. In one embodiment, the degree of similarity between the RGB luminance component data (Rr, Gr, Br) and the target RGB data (Rt, Gt, Bt) may be calculated as a distance D defined by equation (26) described below:

$$D=\sqrt{(Rr-Rt)^2+(Gr-Gt)^2+(Br-Bt)^2} \quad (26)$$

In one embodiment, the color correction parameters may be determined to be proper when the distance D is less than a predetermined value, and the color correction parameters may be determined to be improper otherwise.

When a plurality of sets of calibration target RGB data (Ri, Gi, Bi) and target RGB data (Rt, Gt, Bt) are prepared, degrees of similarity (or the distance D) may be calculated for the respective sets of RGB luminance component data (Rr, Gr, Br) and target RGB data (Rt, Gt, Bt) associated therewith, and the properness of the color correction parameters may be determined based on the calculated degrees of similarity. In one embodiment, the properness of the color correction parameters may be determined based on the sum of the degrees of similarity (distances D) calculated for the respective sets of RGB luminance component data (Rr, Gr, Br) and target RGB data (Rt, Gt, Bt).

When the color correction parameters are determined to be improper in step S38, the color correction parameters are adjusted in step S39, steps S35 to S38 are further executed again, and the properness of the adjusted color correction parameters is determined through the procedure described above. Specifically, color-corrected RGB data (Rc, Gc, Bc) are calculated by performing the color correction processing on the calibration target RGB data (Ri, Gi, Bi) based on the adjusted color correction parameters in step S35, and FRGB data (Fa, Ra, Ga, Ba) are further calculated by performing the color addition processing on the color-corrected RGB data (Rc, Gc, Bc) in step S36. Furthermore, in step S37, RGB luminance component data (Rr, Gr, Br) are calculated from the FRGB data (Fa, Ra, Ga, Ba) by use of the RGB data (FR, FG, FB) of the color F calculated in step S33, and in step S38, the properness of the color correction parameters acquired by the adjustment in step S39 is determined based on the calculated RGB luminance component data (Rr, Gr, Br). The adjustment of the color correction parameters and the determination of the properness of the color correction parameters are repeatedly performed until the color correction parameters are determined to be proper.

When the color correction parameters are determined to be proper, in step S40, the color correction parameters are transmitted from the arithmetic unit 12 to the display driver 2 and written into the color correction parameter storage area 51 in the nonvolatile memory 26 in the display driver 2. This completes the calculation of the color correction parameters and setting of the calculated color correction parameters to the display driver 2.

According to the calculation procedure of the color correction parameters described above, even when the color changes due to color addition processing, desired color adjustment such as desired color space management can be provided in consideration of the color change.

While the properness of the color correction parameters is determined based on the color coordinate data of the color F for the maximum grayscale value, more specifically, the luminance coordinate data (FY, Fx, Fy) of the color F for the maximum grayscale value, in the above-described calculation procedure of the color correction parameters, the properness of the color correction parameters may be determined additionally based on the color coordinate data of the color F for a specific intermediate grayscale value mid. More strictly, the color coordinate data of the color F for the intermediate grayscale value mid are data indicating the color coordinates of the displayed color in a predetermined color space displayed on the display panel 1 when the R subpixels 8R, the G subpixels 8G, and the B subpixels 8B of the display panel 1 are driven with drive signals corresponding to the minimum grayscale value and the F subpixels 8F are driven with drive signals corresponding to the intermediate grayscale value mid. The intermediate grayscale value mid is a predetermined grayscale value greater than the minimum grayscale value and less than the maximum grayscale value. When grayscale values of the F subpixels 8F in output FRGB data are expressed by eight bits, the minimum grayscale value is "0" and the maximum grayscale value is "255," and in this case, the intermediate grayscale value mid is determined to be an integer value greater than 0 and less than 255. Additionally using the color coordinate data of the color F for the intermediate grayscale value mid enables determining the properness of the color correction parameters more precisely.

Luminance coordinate data ($FY^{mid}$, $Fx^{mid}$, $Fy^{mid}$) of the color F for the intermediate grayscale value mid may be used as the color coordinate data of the color F for the intermediate grayscale value mid, where $FY^{mid}$ is a stimulus value Y of the color F for the intermediate grayscale value mid, and $Fx^{mid}$ and $Fy^{mid}$ are chromaticity coordinates x and y of the color F for the intermediate grayscale value mid, respectively. In the following, a description is given of calculation of color correction parameters in a case where the properness of the color correction parameters is determined based on the luminance coordinate data ($FY^{mid}$, $Fx^{mid}$, $Fy^{mid}$) of the color F for the intermediate grayscale value mid in addition to the luminance coordinate data (FY, Fx, Fy) of the color F for the maximum grayscale value. The luminance coordinate data (FY, Fx, Fy) of the color F for the maximum grayscale value are hereinafter denoted as ($FY^{max}$, $Fx^{max}$, $Fy^{max}$) to clearly distinguish the same from the luminance coordinate data ($FY^{mid}$, $Fx^{mid}$, $Fy^{mid}$) of the color F for the intermediate grayscale value mid.

Figure 17:
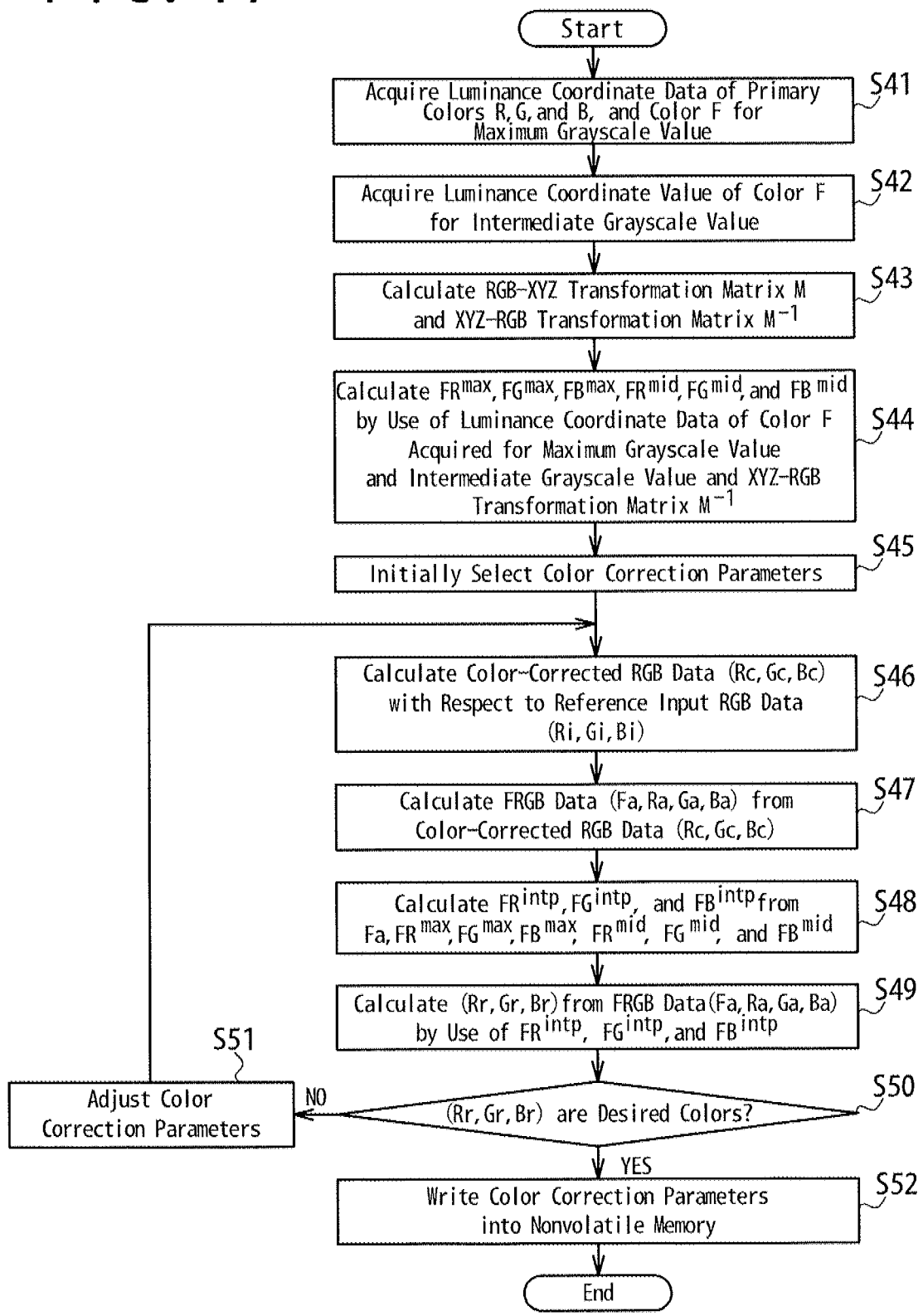
FIG. 17 is a flowchart illustrating a calculation procedure of a color adjustment parameter, according to another embodiment.

FIG. 17 is a flowchart illustrating a calculation procedure of color correction parameters when the properness of the color correction parameters is determined based on the luminance coordinate data ($FY^{mid}$, $Fx^{mid}$, $Fy^{mid}$) of the color F for an intermediate grayscale value mid.

In step S41, the luminance coordinate data of the primary color R, the primary color G, the primary color B, and the color F for the maximum grayscale value, and the luminance coordinate data of the white point (WP) are acquired. The acquisition of the luminance coordinate data of the primary color R, the primary color G, the primary color B, and the color F for the maximum grayscale value, and the luminance coordinate data of the white point (WP) is performed similarly to step S31 described above.

Furthermore, in step S42, luminance coordinate data of the color F for the intermediate grayscale value mid are acquired. The luminance coordinate data of the color F for the intermediate grayscale value mid are acquired as data comprising a stimulus value Y and chromaticity coordinates (x, y) of the displayed color in the xyY color system displayed on the display panel 1 in a state in which the F subpixels 8F of the display panel 1 is driven with drive signals corresponding to the intermediate grayscale value mid and the other subpixels (the R subpixels 8R, the G subpixels 8G, and the B subpixels 8B) are driven with drive signals corresponding to the minimum grayscale value.

In one embodiment, in the acquisition of the luminance coordinate data of the color F for the intermediate grayscale value mid, the color adjustment software 13 transmits, to the display driver 2, control data instructing the image processing IP core 22 to supply, as the processed image data supplied to the source driver circuitry 23, image data in which the grayscale values of the F subpixels 8F of all the pixels 10 are the intermediate grayscale value mid and the grayscale values of the R subpixels 8R, the G subpixels 8G, and the B subpixels 8B of all the pixels 10 are the minimum grayscale value. While the source driver circuitry 23 drives the display panel 1 according to the thus generated processed image data, the color adjustment software 13 measures luminance coordinate data of the displayed color displayed on the display panel 1 by controlling the luminance meter 11. The thus acquired luminance coordinate data are the luminance coordinate data of the color F for the intermediate grayscale value mid.

Next, in step S43, an RGB-XYZ transformation matrix M indicating the display characteristics of the display panel 1 when an image is displayed by use of only the R subpixels 8R, the G subpixels 8G, and the B subpixels 8B without using the F subpixels 8F, and an XYZ-RGB transformation matrix $M^{-1}$, which is the inverse matrix of the RGB-XYZ transformation matrix M, are calculated with respect to the display panel 1. The calculation of the RGB-XYZ transformation matrix M and the XYZ-RGB transformation matrix $M^{-1}$ is performed similarly to step S32 described above. The RGB-XYZ transformation matrix is calculated in accordance with the above-described equation (21a), and the XYZ-RGB transformation matrix $M^{-1}$ is calculated in accordance with the above-described equation (22).

Furthermore, in step S44, RGB data ($FR^{max}$, $FG^{max}$, $FB^{max}$) of the color F for the maximum grayscale value are calculated based on the luminance coordinate data ($FY^{max}$, $Fx^{max}$, $Fy^{max}$) of the color F for the maximum grayscale value and the XYZ-RGB transformation matrix $M^{-1}$, and RGB data ($FR^{mid}$, $FG^{mid}$, $FB^{mid}$) of the color F for the intermediate grayscale value mid are further calculated based on the luminance coordinate data ($FY^{mid}$, $Fx^{mid}$, $Fy^{mid}$) of the color F for the intermediate grayscale value mid and the XYZ-RGB transformation matrix $M^{-1}$. The RGB data ($FR^{max}$, $FG^{max}$, $FB^{max}$) of the color F for the maximum grayscale value are data indicating a ratio among components of the primary color R, the primary color G, and the primary color B of the displayed color displayed on the display panel 1 in a state in which the F subpixels 8F of the display panel 1 are driven with drive signals corresponding to the maximum grayscale value and the other subpixels, that is, the R subpixels 8R, the G subpixels 8G, and the B subpixels 8B are driven with drive signals corresponding to the minimum grayscale value. Further, the RGB data ($FR^{mid}$, $FG^{mid}$, $FB^{mid}$) of the color F for the intermediate grayscale value mid are data indicating a ratio among components of the primary color R, the primary color G, and the primary color B of the displayed color displayed on the display panel 1 in a state in which the F subpixels 8F of the display panel 1 are driven with drive signals corresponding to the intermediate grayscale value mid and the other subpixels, that is, the R subpixels 8R, the G subpixels 8G, and the B subpixels 8B are driven with drive signals corresponding to the minimum grayscale value.

More specifically, the RGB data ($FR^{max}$, $FG^{max}$, $FB^{max}$) of the color F for the maximum grayscale value are calculated as described below. The luminance coordinate data ($FY^{max}$, $Fx^{max}$, $Fy^{max}$) of the color F for the maximum grayscale value are transformed into color coordinate data (FX, FY, FZ) in the XYZ color system in accordance with (27a) and (27b) described below:

$$FX^{max} = FY^{max} \times Fx^{max}/Fy^{max}, \text{ and} \tag{27a}$$

$$FZ^{max} = FY^{max} \times (1 - Fx^{max} - Fy^{max})/Fy^{max}. \tag{27b}$$

The stimulus value $FY^{max}$ in the luminance coordinate data is used as $FY^{max}$ in the color coordinate data in the XYZ color system without modification.

Furthermore, the RGB data ($FR^{max}$, $FG^{max}$, $FB^{max}$) of the color F for the maximum grayscale value are calculated through an XYZ-RGB transformation by applying the XYZ-RGB transformation matrix to the color coordinate data ($FX^{max}$, $FY^{max}$, $FZ^{max}$). The RGB data ($FR^{max}$, $FG^{max}$, $FB^{max}$) of the color F for the maximum grayscale value are expressed by equation (28) as described below:

$$\begin{pmatrix} FR^{max} \\ FG^{max} \\ FB^{max} \end{pmatrix} = M^{-1} \begin{pmatrix} FX^{max} \\ FY^{max} \\ FZ^{max} \end{pmatrix} \tag{28}$$

The RGB data ($FR^{mid}$, $FG^{mid}$, $FB^{mid}$) of the color F for the intermediate grayscale value mid are similarly calculated. Specifically, the luminance coordinate data ($FY^{mid}$, $Fx^{mid}$, $Fy^{mid}$) of the color F for the intermediate grayscale value mid are transformed into color coordinate data ($FX^{mid}$, $FY^{mid}$, $FZ^{mid}$) in the XYZ color system in accordance with equations (29a) and (29b) described below:

$$FX^{mid}=FY^{mid}\times Fx^{mid}/Fy^{mid}, \text{ and} \qquad (29a)$$

$$FZ^{mid}=FY^{mid}\times(1-Fx^{mid}-Fy^{mid})/Fy^{mid}. \qquad (29b)$$

The stimulus value $FY^{mid}$ in the luminance coordinate data is used as $FY^{mid}$ in the color coordinate data in the XYZ color system without modification.

Furthermore, the RGB data ($FR^{mid}$, $FG^{mid}$, $FB^{mid}$) of the color F for the intermediate grayscale value mid are calculated through an XYZ-RGB transformation by applying the XYZ-RGB transformation matrix to the color coordinate data ($FX^{mid}$, $FY^{mid}$, $FZ^{mid}$). The RGB data ($FR^{mid}$, $FG^{mid}$, $FB^{mid}$) of the color F with the intermediate grayscale value mid are expressed as equation (30) described below.

$$\begin{pmatrix} FR^{mid} \\ FG^{mid} \\ FB^{mid} \end{pmatrix} = M^{-1} \begin{pmatrix} FX^{mid} \\ FY^{mid} \\ FZ^{mid} \end{pmatrix} \qquad (30)$$

In steps S45 to S51, color correction parameters are calculated based on the RGB data ($FR^{max}$, $FG^{max}$, $FB^{max}$) of the color F for the maximum grayscale value and the RGB data ($FR^{mid}$, $FG^{mid}$, $FB^{mid}$) of the color F for the intermediate grayscale value mid calculated as described above.

In step S45, color correction parameters are initially selected by an appropriate technique. In one embodiment, color correction parameters previously prepared in the storage device 15 in the arithmetic unit 12 are selected. The color correction parameters may be arbitrarily selected in step S45 since the color correction parameters are adjusted in a later step when the color correction parameters are not proper.

In steps S46 to S50, the properness of the selected color correction parameters is then determined.

Specifically, in step S46, color-corrected RGB data (Rc, Gc, Bc) are calculated by performing the color correction processing on the calibration target RGB data (Ri, Gi, Bi) based on the color correction parameter selected in step S45. The calculation of the color-corrected RGB data (Rc, Gc, Bc) is performed similarly to step S35 described above.

Furthermore, in step S47, FRGB data (Fa, Ra, Ga, Ba) are calculated by performing the color addition processing on the color-corrected RGB data (Rc, Gc, Bc). The calculation of the FRGB data (Fa, Ra, Ga, Ba) is performed similarly to step S36 described above.

Furthermore, in step S48, RGB data (FRintp, FGintp, FBintp) of the color F for the F grayscale value Fa of the FRGB data calculated in step S47 are calculated from the F grayscale value Fa and the RGB data (FRmax, FGmax, FBmax) of the color F for the maximum grayscale value and the RGB data (FRmid, FGmid, FBmid) of the color F for the intermediate grayscale value mid which are calculated in step S44. The RGB data (FRintp, FGintp, FBintp) of the color F for the F grayscale value Fa are data indicating luminance components of the primary color R, the primary color G, and the primary color B of the displayed color displayed by the F subpixels 8F when the F subpixels 8F are driven with drive signals corresponding to the F grayscale value Fa and are calculated in accordance with equations (31a) to (31c) described below.

$$FR^{intp}=\{FR^{max}\times(Fa-\text{mid})+FR^{mid}\times(FRGB_{MAX}-Fa)\}/(FRGB_{MAX}-\text{mid}) \qquad (31a)$$

$$FG^{intp}=\{FG^{max}\times(Fa-\text{mid})+FG^{mid}\times(FRGB_{MAX}-Fa)\}/(FRGB_{MAX}-\text{mid}) \qquad (31b)$$

$$FB^{intp}=\{FB^{max}\times(Fa-\text{mid})+FB^{mid}\times(FRGB_{MAX}-Fa)\}/(FRGB_{MAX}-\text{mid}) \qquad (31c)$$

When the grayscale values of the R subpixels 8R, the G subpixels 8G, the B subpixels 8B, and the F subpixels 8F are expressed by eight bits in the FRGB data (Fa, Ra, Ga, Ba), $FRGB_{MAX}$ is "255." In this case, equations (31a) to (31c) can be rewritten into equations (31a') to (31c') described below.

$$FR^{intp}=\{FR^{max}\times(Fa-\text{mid})+FR^{mid}\times(255-Fa)\}/(255-\text{mid}) \qquad (31a')$$

$$FG^{intp}=\{FG^{max}\times(Fa-\text{mid})+FG^{mid}\times(255-Fa)\}/(255-\text{mid})* \qquad (31b')$$

$$FB^{intp}=\{FB^{max}\times(Fa-\text{mid})+FB^{mid}\times(255-Fa)\}/(255-\text{mid}) \qquad (31c')$$

Next, in step S49, RGB luminance component data (Rr, Gr, Br) are calculated from the FRGB data (Fa, Ra, Ga, Ba) by use of the RGB data ($FR^{intp}$, $FG^{intp}$, $FB^{intp}$) of the color F for the F grayscale value Fa calculated in step S48. The RGB luminance component data (Rr, Gr, Br) are data indicating luminance components of the primary color R, the primary color G, and the primary color B of the color displayed on the display panel 1 when the display panel 1 is driven based on the FRGB data (Fa, Ra, Ga, Ba). The RGB luminance component data (Rr, Gr, Br) are calculated in accordance with equations (32a) to (32c) described below in the present embodiment:

$$Rr=Ra+\{FRGB_{MAX}\times[(Fa/FRGB_{MAX})^{\gamma}\times(FR^{intp}/FRGB_{MAX})]^{1/\gamma}\} \qquad (32a)$$

$$Gr=Ga+\{FRGB_{MAX}\times[(Fa/FRGB_{MAX})^{\gamma}\times(FG^{intp}/FRGB_{MAX})]^{1/\gamma}\} \qquad (32b)$$

$$Br=Ba+\{FRGB_{MAX}\times[(Fa/FRGB_{MAX})^{\gamma}\times(FB^{intp}/FRGB_{MAX})]^{1/\gamma}\} \qquad (32c)$$

Note that $\gamma$ is the gamma value set to the display device 100.

When the grayscale values of the R subpixel 8R, the G subpixel 8G, the B subpixel 8B, and the F subpixel 8F are expressed by eight bits in the FRGB data (Fa, Ra, Ga, Ba), $FRGB_{MAX}$ is "255." In this case, equations (32a) to (32c) can be rewritten to equations (32a') to (32c') described below.

$$Rr=Ra+\{255\times[(Fa/255)^{\gamma}\times(FR^{intp}/255)]^{1/\gamma}\} \qquad (32a')$$

$$Gr=Ga+\{255\times[(Fa/255)^{\gamma}\times(FG^{intp}/255)]^{1/\gamma}\} \qquad (32b')$$

$$Br=Ba+\{255\times[(Fa/255)^{\gamma}\times(FB^{intp}/255)]^{1/\gamma}\} \qquad (32c')$$

In step S50, the properness of the color correction parameters selected in step S45 is determined based on the calculated RGB luminance component data (Rr, Gr, Br). As described above, the RGB luminance component data (Rr, Gr, Br) indicate luminance components of the primary color R, the primary color G, and the primary color B of the color displayed on the display panel 1 when the display panel 1 is driven based on the FRGB data (Fa, Ra, Ga, Ba). Accordingly, the properness of the color correction parameters is proper can be determined based on the RGB luminance component data (Rr, Gr, Br) and the target RGB data (Rt, Gt, Bt). The determination of the properness of the color correction parameters based on the RGB luminance component data (Rr, Gr, Br) is performed similarly to step S38 described above.

When the color correction parameters are determined to be improper in step S50, the color correction parameters are adjusted in step S51, steps S46 to S50 described above are further performed again, and the properness of the adjusted color correction parameters is determined. Specifically, in step S46, color-corrected RGB data (Rc, Gc, Bc) are calculated by performing the color correction processing on the calibration target RGB data (Ri, Gi, Bi) based on the adjusted color correction parameter, and in step S47, FRGB data (Fa, Ra, Ga, Ba) are calculated by further performing the color addition processing on the color-corrected RGB data (Rc, Gc, Bc). Furthermore, in step S48, RGB data ($FR^{intp}$, $FG^{intp}$, $FB^{intp}$) of the color F for the F grayscale value Fa are calculated based on the F grayscale value Fa in the FRGB data calculated in step S47, the RGB data ($FR^{max}$, $FG^{max}$, $FB^{max}$) of the color F for the maximum grayscale value, and the RGB data ($FR^{mid}$, $FG^{mid}$, $FB^{mid}$) of the color F for the intermediate grayscale value mid. Further, in step S49, RGB luminance component data (Rr, Gr, Br) are calculated from the FRGB data (Fa, Ra, Ga, Ba) by use of the RGB data ($FR^{intp}$, $FG^{intp}$, $FB^{intp}$) of the color F for the F grayscale value Fa calculated in step S48, and the properness of the adjusted color correction parameters is determined based on the calculated RGB luminance component data (Rr, Gr, Br). The adjustment of the color correction parameters and the determination of the properness of the color correction parameter are repeatedly performed until the color correction parameters are determined to be proper.

When the color correction parameters are determined to be proper, the color correction parameters are transmitted to the display driver 2 from the arithmetic unit 12 and written into the color correction parameter storage area 51 in the nonvolatile memory 26 in the display driver 2 in step S52. This completes the calculation of the color correction parameters and setting of the calculated color correction parameters to the display driver 2.

According to the calculation procedure of color correction parameters illustrated in FIG. 17, even when a color changes due to the color addition processing, desired color adjustment (such as desired color space management) can be provided in consideration of the color change. Further, since the properness of the color correction parameters is determined by use of luminance coordinate data (FYmid, Fxmid, Fymid) of the color F for the intermediate grayscale value mid in addition to luminance coordinate data (FYmax, Fxmax, Fymax) of the color F for the maximum grayscale value in the procedure illustrated in FIG. 17, the properness of the color correction parameters can be more precisely determined.

While the above-described embodiments recite that the color correction parameters to be set to the color correction circuitry 28 are calculated by the arithmetic unit 12 in the color adjustment device 200, and the calculated color correction parameters are written into the nonvolatile memory 26 in the display driver 2 from the color adjustment device 200, the method of the calculation and setting of color correction parameters may be variously changed.

Figure 18:
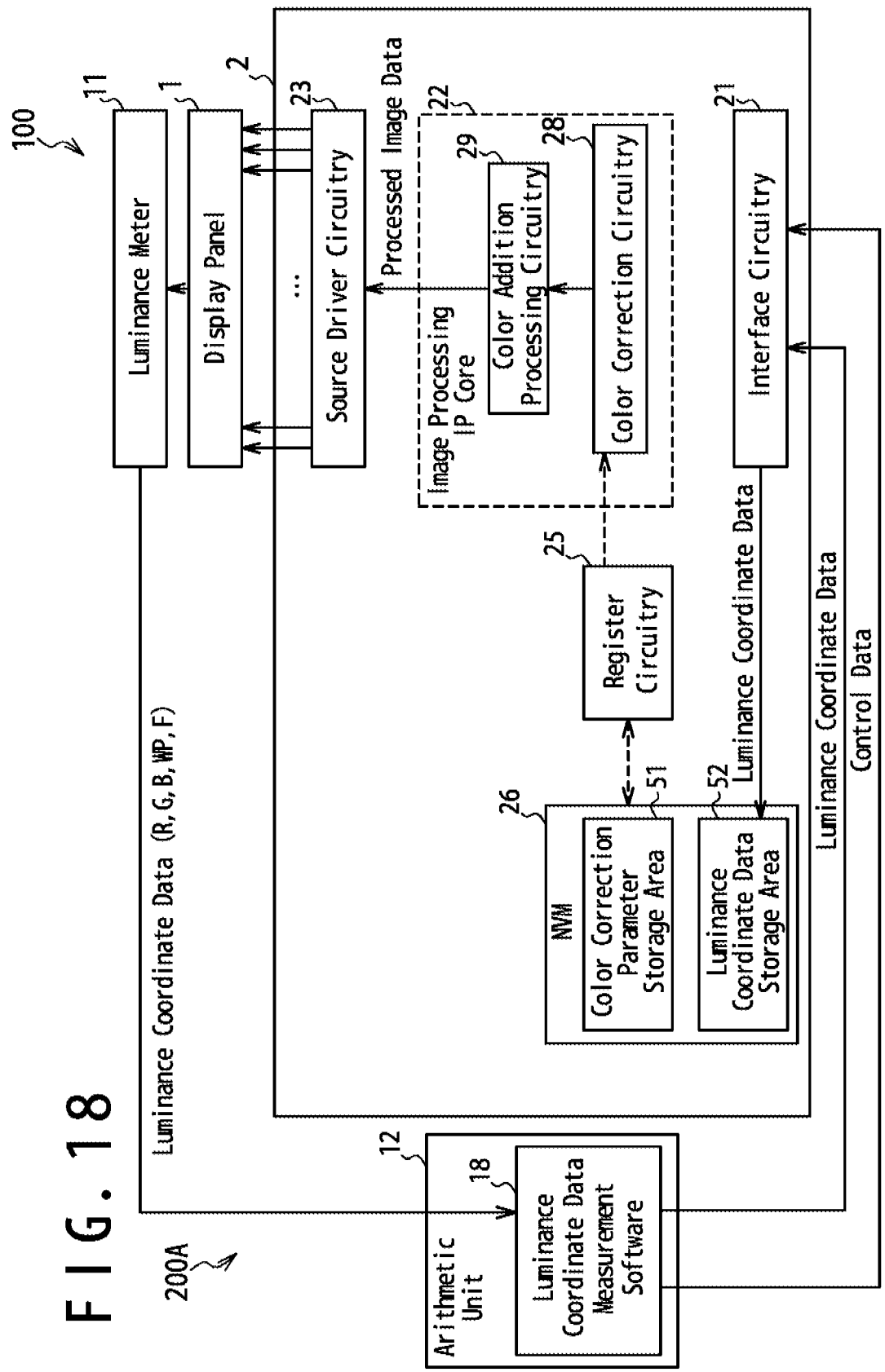
FIG. 18 is a block diagram schematically illustrating configurations of a luminance coordinate measurement device and a display device, according to another embodiment.
Figure 19:
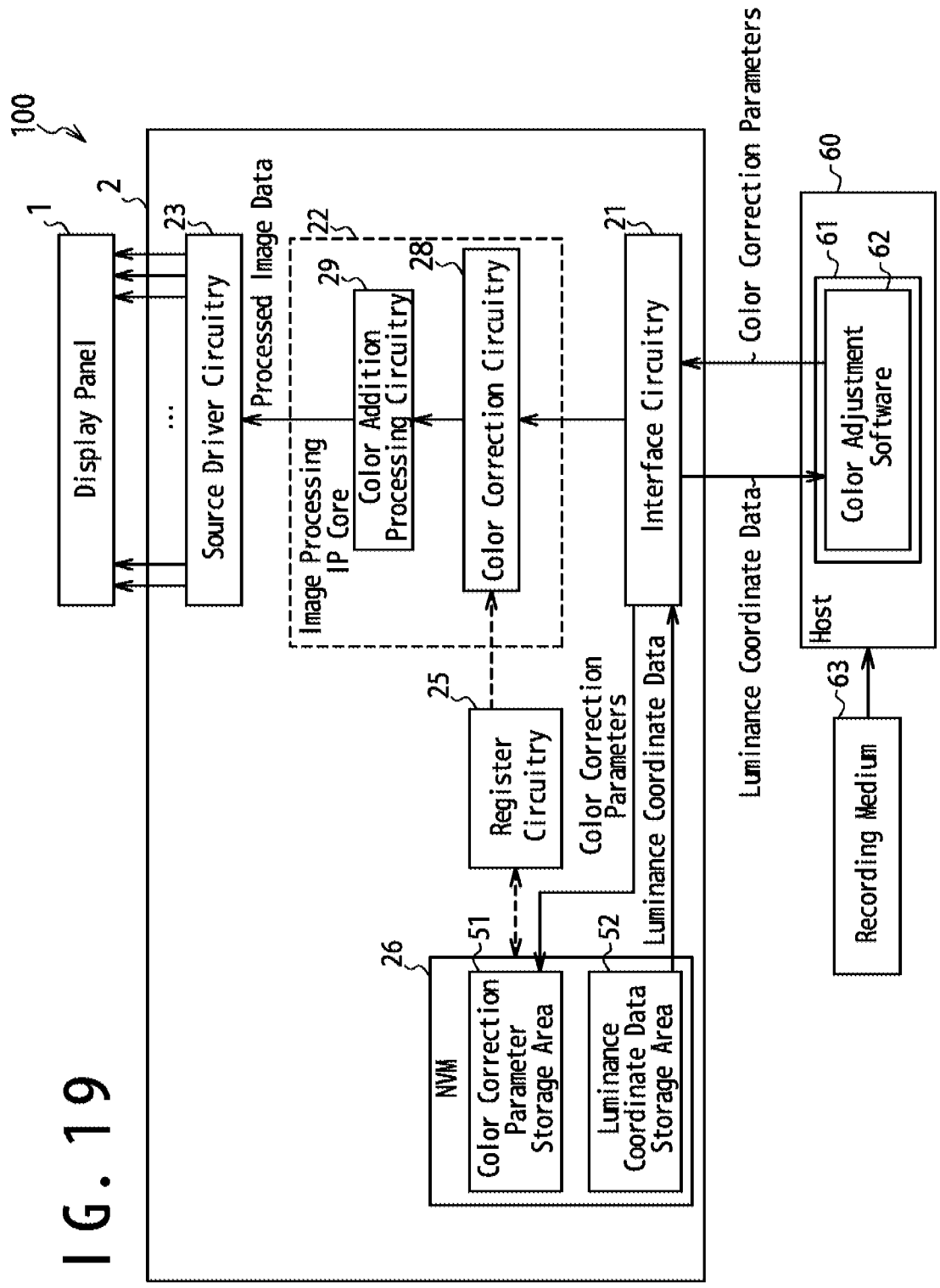
FIG. 19 is a block diagram schematically illustrating a configuration of a display system according to the embodiment of FIG. 18.

FIGS. 18 and 19 are block diagrams schematically illustrating configurations of a luminance coordinate measurement device 200A and a display device 100, according to another embodiment. Referring to FIG. 18, the luminance coordinate measurement device 200A that measures luminance coordinate data is used in place of the color adjustment device 200 in the present embodiment. Further, a luminance coordinate data storage area 52 storing luminance coordinate data is prepared in the nonvolatile memory 26 in the display driver 2, in addition to the color correction parameter storage area 51 storing the color correction parameters.

The luminance coordinate measurement device 200A comprises a luminance meter 11 and an arithmetic unit 12, and luminance coordinate data measurement software 18 is installed on the arithmetic unit 12. The luminance coordinate data is measured by executing the luminance coordinate data measurement software 18 by the arithmetic unit 12. When color correction parameters are calculated through the procedure illustrated in FIG. 15, luminance coordinate data of the primary color R, the primary color G, the primary color B, and the color F for the maximum grayscale value, and luminance coordinate data of the white point (WP) are measured. When color correction parameters are calculated through the procedure illustrated in FIG. 17, luminance coordinate data of the color F for an intermediate grayscale value mid are additionally measured. The measured luminance coordinate data are written into the luminance coordinate data storage area 52 in the display driver 2.

As illustrated in FIG. 19, a display system is configured with a host 60 and the display device 100 in an implementation of the display device 100 in the present embodiment. In the display system, color correction parameters to be set to color correction circuitry 28 are calculated by the host 60. Color adjustment software 62 is installed on a storage device 61 in the host 60, and the color correction parameters are calculated by executing the color adjustment software 62 by the host 60. The storage device 61 is used as a non-transitory tangible storage medium storing the color adjustment software 62. The color adjustment software 62 may be provided as a computer program product recorded on a non-transitory tangible computer-readable recording medium 63 or may be provided as a computer program product downloadable from a server.

When the display system is started, the luminance coordinate data written in the luminance coordinate data storage area 52 in the nonvolatile memory 26 are read out and transferred from the display driver 2 to the host 60, as illustrated in FIG. 19. The host 60 calculates color correction parameters to be set to the color correction circuitry 28 from the luminance coordinate data through the procedure described above. In this configuration, target RGB data (Rt, Gt, Bt) used for the color correction parameters are stored in a storage device in the host 60. The color correction parameters calculated by the host 60 are transferred to the display driver 2 and written into the color correction parameter storage area 51 in the nonvolatile memory 26 in the display driver 2.

Figure 20:
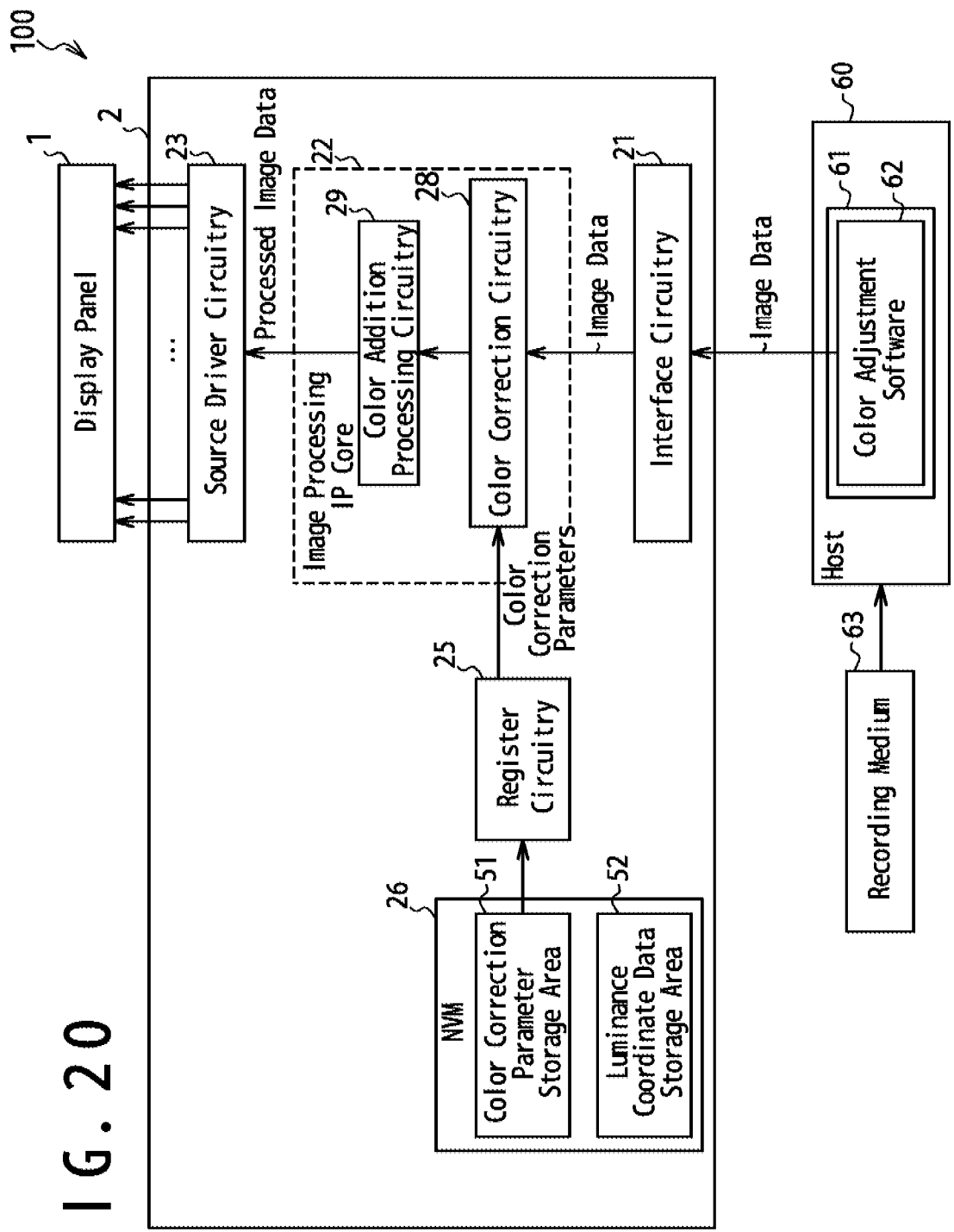
FIG. 20 is a block diagram schematically illustrating an actual operation of the display system of FIG. 19.

In an actual operation of the display driver 2, the color correction parameters are read out from the color correction parameter storage area 51 to the register circuitry 25, and the color correction parameters are further supplied from the register circuitry 25 to the color correction circuitry 28, as illustrated in FIG. 20. The host 60 supplies image data to the display driver 2. The color correction circuitry 28 performs color correction processing on the image data supplied from the host 60 based on the color correction parameters received from the register circuitry 25.

This configuration is useful to a user of the display device 100 for performing color adjustment. The manufacturer of the display device 100 writes the luminance coordinate data measured by the luminance coordinate measurement device 200A into the nonvolatile memory 26 in the display driver 2. By executing desired color adjustment software 62 by the host 60, the user of the display device 100 can precisely execute the color adjustment.

Figure 22:
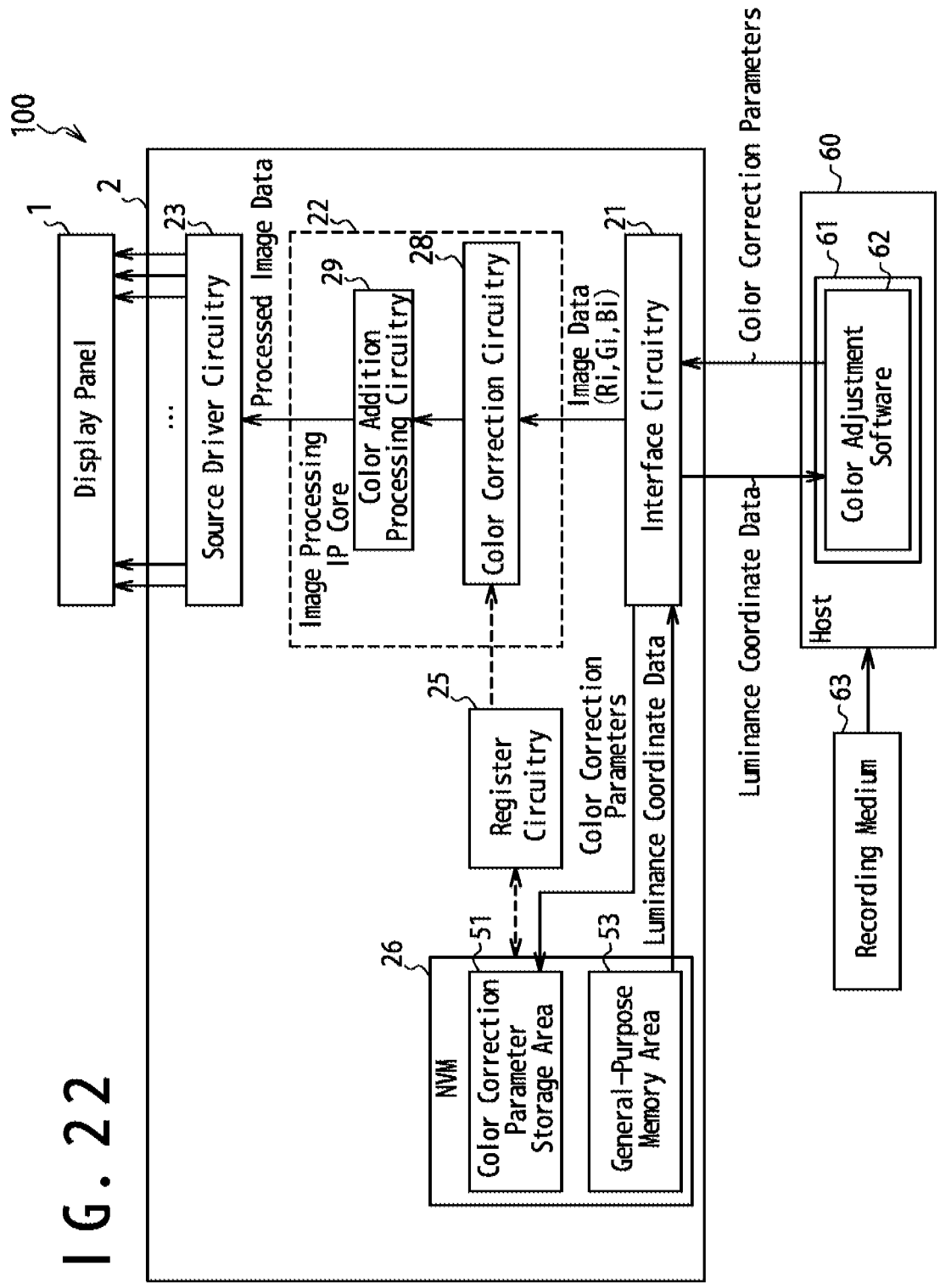
FIG. 22 is a block diagram schematically illustrating a configuration of a display system, according to the embodiment of FIG. 21.

FIGS. 21 and 22 are block diagrams schematically illustrating configurations of a luminance coordinate measurement device 200A and a display device 100, according to yet another embodiment. As illustrated in FIG. 21, the nonvolatile memory 26 in the display driver 2 comprises the color correction parameter storage area 51 storing color correction parameters and a general-purpose memory area 53, in the present embodiment. Luminance coordinate data measured by the luminance coordinate measurement device 200A are written into the general-purpose memory area 53 in the display driver 2.

As illustrated in FIG. 22, the display system is configured with the host 60 and the display device 100 in an implementation of the display device 100 also in the present embodiment. In this display system, luminance coordinate data written in the general-purpose memory area 53 are read out and transferred from the display driver 2 to the host 60 when color correction parameters are calculated. Color adjustment software 62 is installed on the host 60, and the host 60 calculates the color correction parameters to be set to color correction circuitry 28 from the luminance coordinate data through the procedure described above. The color correction parameters calculated by the host 60 are transferred to the display driver 2 and written into the color correction parameter storage area 51 in the nonvolatile memory 26 in the display driver 2. The general-purpose memory area 53 in which the luminance coordinate data are written is hereafter released for a use other than holding the luminance coordinate data.

This configuration is useful for effective utilization of the nonvolatile memory 26 in the display driver 2. The luminance coordinate data do not necessarily need to be held after the calculation of the color correction parameters to be set to the color correction circuitry 28 is completed. When the calculation of the color correction parameters to be set to the color correction circuitry 28 is performed only once, the nonvolatile memory 26 can be effectively utilized by using the general-purpose memory area 53, which have stored the luminance coordinate data, for a use other than storing the luminance coordinate data after the calculation of the color correction parameters is completed. Note that the luminance coordinate data may continue to be held in the general-purpose memory area 53 to enable performing the color adjustment, that is, the calculation of the color correction parameters by the color correction circuitry 28 at desired timing.

Figure 23:
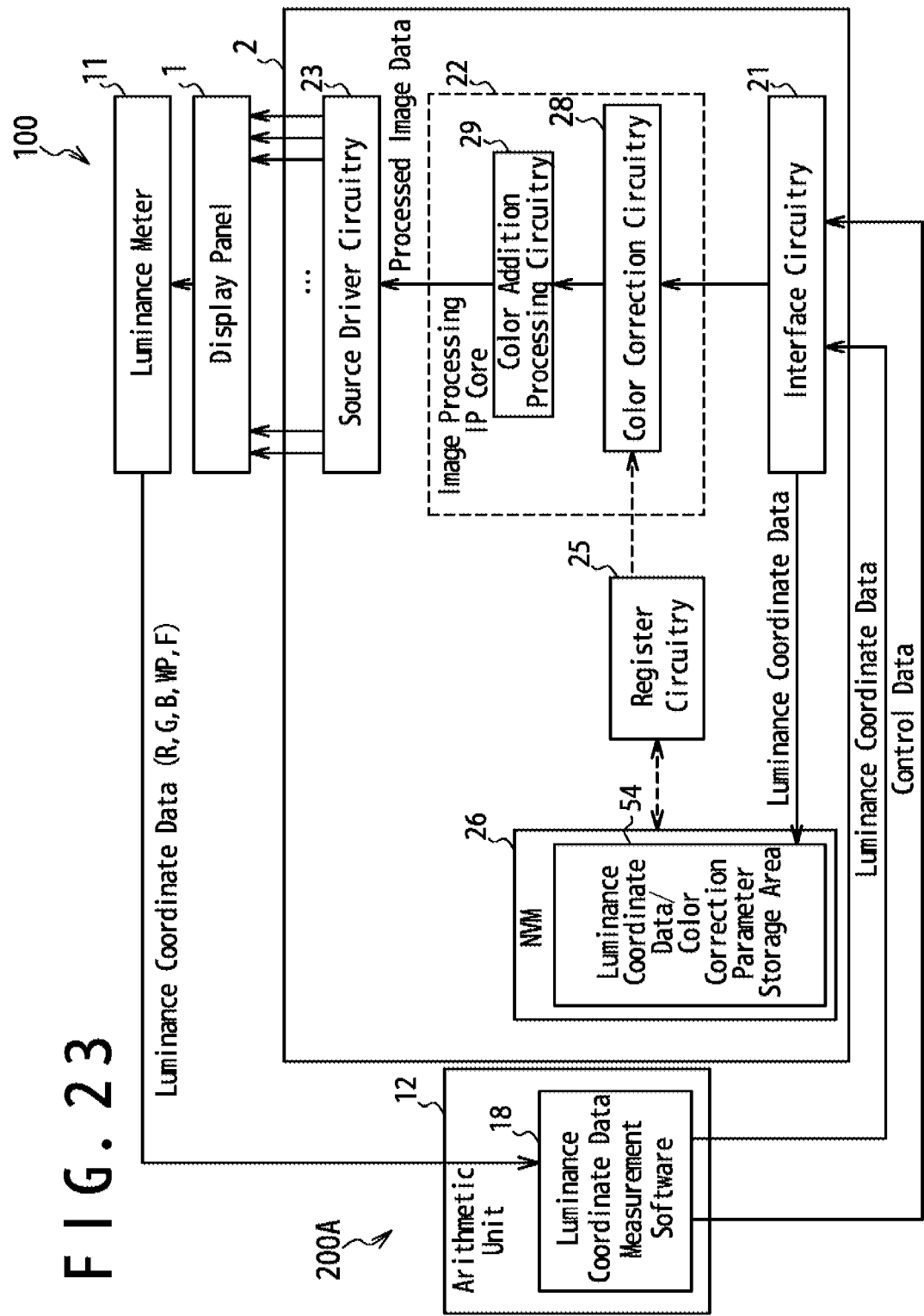
FIG. 23 is a block diagram schematically illustrating configurations of a luminance coordinate measurement device and a display device, according to yet another embodiment.
Figure 24:
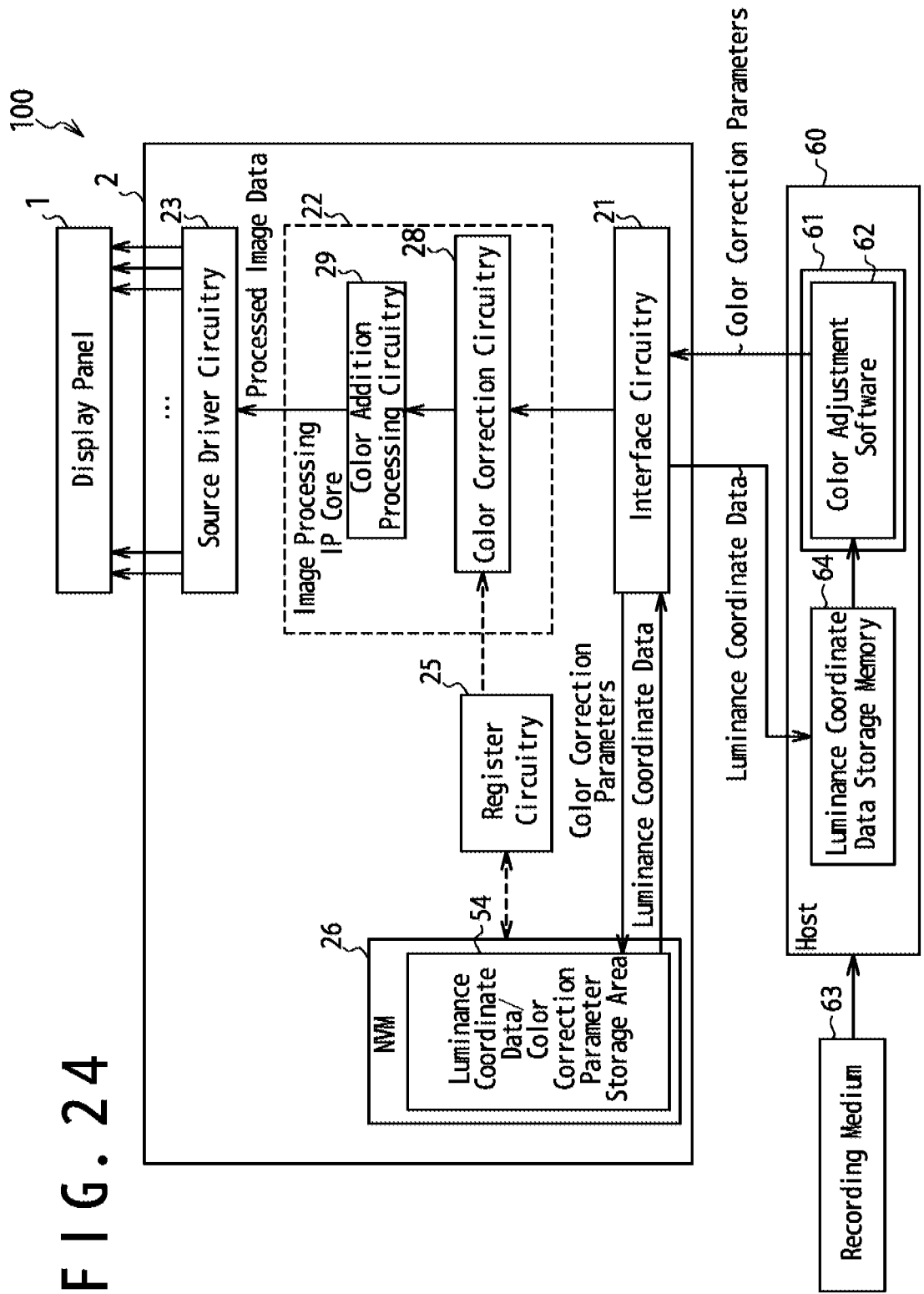
FIG. 24 is a block diagram schematically illustrating a configuration of a display system according to the embodiment of FIG. 23.

FIGS. 23 and 24 are block diagrams schematically illustrating configurations of the luminance coordinate measurement device 200A and the display device 100, according to yet another embodiment. As illustrated in FIG. 23, the nonvolatile memory 26 in the display driver 2 comprises a luminance coordinate data/color correction parameter storage area 54 in the present embodiment. The luminance coordinate data measured by the luminance coordinate measurement device 200A are written into the luminance coordinate data/color correction parameter storage area 54 in the display driver 2.

As illustrated in FIG. 24, the display system is configured with the host 60 and the display device 100 in an implementation of the display device 100 also in the present embodiment. The host 60 comprises a luminance coordinate data storage memory 64 in the present embodiment.

When color correction parameters are calculated in the display system, the luminance coordinate data written in the luminance coordinate data/color correction parameter storage area 54 are read out therefrom, transferred from the display driver 2 to the host 60, and written into the luminance coordinate data storage memory 64 in the host 60. Color adjustment software 62 is installed on the host 60, and the host 60 calculates the color correction parameters to be set to the color correction circuitry 28 from the luminance coordinate data stored in the luminance coordinate data storage memory 64 through the procedure described above. The color correction parameters calculated by the host 60 are transferred to the display driver 2 and written into the luminance coordinate data/color correction parameter storage area 54 in the display driver 2. In writing of the color correction parameters, the luminance coordinate data stored in the luminance coordinate data/color correction parameter storage area 54 are overwritten by the color correction parameters. This configuration can reduce the capacity of the nonvolatile memory 26 in the display driver 2.

The luminance coordinate data stored in the luminance coordinate data storage memory 64 in the host 60 may be held or discarded after the calculation of the color correction parameters. To enable performing color adjustment, that is, the calculation of the color correction parameters set to the color correction circuitry 28 at desired timing, the luminance coordinate data continue to be held in the luminance coordinate data storage memory 64. When the color correction parameters are calculated only once, on the other hand, the luminance coordinate data are discarded after the calculation of the color correction parameters. In this case, a general-purpose memory may be used as the luminance coordinate data storage memory 64. The general-purpose memory may be used for a use other than storing the luminance coordinate data after the calculation of the color correction parameters. This is preferable for effective utilization of memory resources.

Examples of embodiments included in the present disclosure are listed below.

(Item 1)

A display driver setting method, comprising:

acquiring first color coordinate data indicating color coordinates of a first displayed color in a predetermined color space displayed on a display panel when an R subpixel, a G subpixel, and a B subpixel in each of a plurality of pixels of the display panel are driven with drive signals corresponding to a minimum grayscale value and an F subpixel in each of the plurality of pixels which displays an additional color different from a primary color R, a primary color G, and a primary color B is driven with a drive signal corresponding to a maximum grayscale value;

determining an evaluation target color correction parameter;

generating evaluation target color-corrected RGB data by performing color correction processing on calibration target RGB data, based on the evaluation target color correction parameter;

generating evaluation target FRGB data by performing color addition processing on the evaluation target color-corrected RGB data;

determining properness of the evaluation target color correction parameter based on the evaluation target FRGB data and the first color coordinate data; and when the evaluation target color correction parameter is determined to be proper, determining the evaluation target color correction parameter to be a color correction parameter to be set to a display driver that drives the display panel.

(Item 2)

The display driver setting method of item 1, wherein determining the properness of the evaluation target color correction parameter comprises:

calculating RGB luminance component data indicating components of the primary color R, the primary color G, and the primary color B of a color displayed on the display panel when the display panel is driven according to the evaluation target FRGB data, based on the evaluation target FRGB data and the first color coordinate data; and determining the properness of the evaluation target color correction parameter based on the RGB luminance component data.

(Item 3)

The display driver setting method of item 2, further comprises preparing target RGB data associated with the calibration target RGB data, wherein determining the properness of the evaluation target color correction parameter based on the RGB luminance component data comprises determining the properness of the evaluation target color correction parameter based on a degree of similarity between the RGB luminance component data and the target RGB data.

(Item 4)

The display driver setting method of item 2 or 3, further comprises:

calculating a value FR indicating a component of the primary color R of the additional color, a value FG indicating a component of the primary color G of the additional color, and a value FB indicating a component of the primary color B of the additional color by applying an XYZ-RGB transformation matrix indicating display characteristics of the display panel when an image is displayed by use of the R subpixels, the G subpixels, and the B subpixels without using the F subpixels to color coordinates of the first displayed color in an XYZ color system displayed on the display panel when the R subpixels, the G subpixels, and the B subpixels are driven with drive signals corresponding to the minimum grayscale value and the F subpixels are driven with drive signals corresponding to the maximum grayscale value, wherein the RGB luminance component data are calculated based on the evaluation target FRGB data, the value FR, the value FG, and the value FB.

(Item 5)

The display driver setting method of item 4, wherein the RGB luminance component data comprises:

a value Rr indicating a component of the primary color R of a color displayed on the display panel when the display panel is driven according to the evaluation target FRGB data;

a value Gr indicating a component of the primary color G of the color displayed on the display panel when the display panel is driven according to the evaluation target FRGB data; and a value Br indicating a component of the primary color B of the color displayed on the display panel when the display panel is driven according to the evaluation target FRGB data, wherein the evaluation target FRGB data comprises:
a grayscale value Fa of an F subpixel;
a grayscale value Ra of an R subpixel;
a grayscale value Ga of a G subpixel; and
a grayscale value Ba of a B subpixel, and
wherein the value Rr, the value Gr, and the value Br are calculated in accordance with equations (33a) to (33c) described below:

$$Rr = Ra + \{FRGB_{MAX} \times [(Fa/FRGB_{MAX})^{\gamma} \times (FR/FRGB_{MAX})]^{1/\gamma}\} \quad (33a)$$

$$Gr = Ga + \{FRGB_{MAX} \times [(Fa/FRGB_{MAX})^{\gamma} \times (FG/FRGB_{MAX})]^{1/\gamma}\} \quad (33b)$$

$$Br = Ba + \{FRGB_{MAX} \times [(Fa/FRGB_{MAX})^{\gamma} \times (FB/FRGB_{MAX})]^{1/\gamma}\} \quad (33c)$$

where $FRGB_{MAX}$ is the maximum grayscale value, and $\gamma$ is a gamma value set to a display device comprising the display panel.

(Item 6)

The display device setting method of item 1, further comprises:

acquiring second color coordinate data indicating color coordinates of a second displayed color in the color space displayed on the display panel when the R subpixels, the G subpixels, and the B subpixels are driven with drive signals corresponding to the minimum grayscale value and the F subpixels are driven with drive signals corresponding to an intermediate grayscale value greater than the minimum grayscale value and less than the maximum grayscale value, wherein determining the properness of the evaluation target color correction parameter comprises determining the properness of the evaluation target color correction parameter based on the evaluation target FRGB data, the first color coordinate data, and the second color coordinate data.

(Item 7)

The display driver setting method of item 6, wherein determining the properness of the evaluation target color correction parameter comprises:

based on the evaluation target FRGB data, the first color coordinate data, and the second color coordinate data, calculating RGB luminance component data indicating components of the primary color R, the primary color G, and the primary color B of a color displayed on the display panel when the display panel is driven according to the evaluation target FRGB data; and determining the properness of the evaluation target color correction parameter based on the RGB luminance component data.

(Item 8)

The display driver setting method of item 7, further comprising:

preparing target RGB data associated with the calibration target RGB data, wherein determining the properness of the evaluation target color correction parameter based on the RGB luminance component data comprises determining the properness of the evaluation target color correction parameter based on a degree of similarity between the RGB luminance component data and the target RGB data.

(Item 9)

The display driver setting method of item 7 or 8, further comprising:

calculating a value $FR^{max}$ indicating a component of the primary color R of the additional color, a value $FG^{max}$ indicating a component of the primary color G of the additional color, and a value $FB^{max}$ indicating a component of the primary color B of the additional color by applying an XYZ-RGB transformation matrix indicating display characteristics of the display panel when an image is displayed by use of the R subpixels, the G subpixels, and the B subpixels without using the F subpixels to color coordinates of the first displayed color in an XYZ color system displayed on the display panel when the R subpixels, the G subpixels, and the B subpixels are driven with drive signals corresponding to the minimum grayscale value and the F subpixels is driven with drive signals corresponding to the maximum grayscale value; and calculating a value $FR^{mid}$ indicating a component of the primary color R of the additional color, a value $FG^{mid}$ indicating a component of a primary color G of the additional color, and a value $FB^{mid}$ indicating a component of a primary color B of the additional color by applying the XYZ-RGB transformation matrix to color coordinates of the second displayed color in an XYZ color system displayed on the display panel when the R subpixels, the G subpixels, and the B subpixels are driven with drive signals corresponding to the minimum grayscale value and the F subpixels are driven with drive signals corresponding to the intermediate grayscale value, wherein the RGB luminance component data are calculated based on the evaluation target FRGB data, the value $FR^{max}$, the value $FG^{max}$, the value $FB^{max}$, the value $FR^{mid}$, the value $FG^{mid}$, and the value $FB^{mid}$.

(Item 10)

The display driver setting method of item 9, wherein the RGB luminance component data comprise:

a value Rr indicating a component of the primary color R of a color displayed on the display panel when the display panel is driven according to the evaluation target FRGB data;

a value Gr indicating a component of the primary color G of the color displayed on the display panel when the display panel is driven according to the evaluation target FRGB data; and a value Br indicating a component of the primary color B of the color displayed on the display panel when the display panel is driven according to the evaluation target FRGB data, wherein the evaluation target FRGB data comprise:
a grayscale value Fa of an F subpixel;
a grayscale value Ra of an R subpixel;
a grayscale value Ga of a G subpixel; and
a grayscale value Ba of a B subpixel, and wherein calculating the RGB luminance component data comprises:

by use of a gamma value γ set to a display device comprising the display panel and a value $FR^{intp}$, a value $FG^{intp}$, and a value $FG^{intp}$ calculated in accordance with equations (34a) to (34c) described below:

$$FR^{intp} = \{FR^{max} \times (Fa - \text{mid}) + FR^{mid} \times (FRGB_{MAX} - Fa)\} / (FRGB_{MAX} - \text{mid}) \quad (34a)$$

$$FG^{intp} = \{FG^{max} \times (Fa - \text{mid}) + FG^{mid} \times (FRGB_{MAX} - Fa)\} / (FRGB_{MAX} - \text{mid}) \quad (34b)$$

$$FB^{intp} = \{FB^{max} \times (Fa - \text{mid}) + FB^{mid} \times (FRGB_{MAX} - Fa)\} / (FRGB_{MAX} - \text{mid}) \quad (34c)$$

where mid denotes the intermediate grayscale value and $FRGB_{MAX}$ denotes the maximum grayscale value, calculating the value Rr, the value Gr, and the value Br in accordance with equations (35a) to (35c) described below.

$$Rr = Ra + \{FRGB_{MAX} \times [(Fa/FRGB_{MAX})^\gamma \times (FR^{intp}/FRGB_{MAX})]^{1/\gamma}\} \quad (35a)$$

$$Gr = Ga + \{FRGB_{MAX} \times [(Fa/FRGB_{MAX})^\gamma \times (FG^{intp}/FRGB_{MAX})]^{1/\gamma}\} \quad (35b)$$

$$Br = Ba + \{FRGB_{MAX} \times [(Fa/FRGB_{MAX})^\gamma \times (FB^{intp}/FRGB_{MAX})]^{1/\gamma}\} \quad (35c)$$

(Item 11)

A color adjustment device, comprises:
an arithmetic unit; and
an interface,
wherein the arithmetic unit:
acquires first color coordinate data indicating color coordinates of a first displayed color in a predetermined color space displayed on a display panel when an R subpixel, a G subpixel, and a B subpixel in each of a plurality of pixels of the display panel are driven with drive signals corresponding to a minimum grayscale value and an F subpixel in each of the plurality of pixels which displays an additional color different from a primary color R, a primary color G, and a primary color B is driven with a drive signal corresponding to a maximum grayscale value;

determines an evaluation target color correction parameter;

generates evaluation target color-corrected RGB data by performing color correction processing on calibration target RGB data based on the evaluation target color correction parameter;

generates evaluation target FRGB data by performing color addition processing on the evaluation target color-corrected RGB data;

determines properness of the evaluation target color correction parameter based on the evaluation target FRGB data and the first color coordinate data; and, when the evaluation target color correction parameter is determined to be proper, determines the evaluation target color correction parameter to be a color correction parameter to be set to a display driver driving the display panel; and wherein the interface transmits the color correction parameter to the display driver.

(Item 12)

The color adjustment device of item 11, wherein the arithmetic unit calculates, based on the evaluation target FRGB data and the first color coordinate data, RGB luminance component data indicating components of the primary color R, the primary color G, and the primary color B of a color displayed on the display panel when the display panel is driven according to the evaluation target FRGB data, and determines the properness of the evaluation target color correction parameter based on the RGB luminance component data.

(Item 13)

The color adjustment device of item 12, further comprising a storage device that stores target RGB data associated with the calibration target RGB data, wherein the arithmetic unit determines the properness of the evaluation target color correction parameter based on a degree of similarity between the RGB luminance component data and the target RGB data.

(Item 14)

A program which causes an arithmetic unit to execute:

acquiring color coordinate data indicating color coordinates of a displayed color in a predetermined color space displayed on a display panel when an R subpixel, a G subpixel, and a B subpixel in each a plurality of pixels of the display panel are driven with drive signals corresponding to a minimum grayscale value and an F subpixel in each of the plurality of pixels which displays an additional color different from a primary color R, a primary color G, and a primary color B is driven with a drive signal corresponding to a maximum grayscale value;

determining an evaluation target color correction parameter;

generating evaluation target color-corrected RGB data by performing color correction processing on calibration target RGB data, based on the evaluation target color correction parameter;

generating evaluation target FRGB data by performing color addition processing on the evaluation target color-corrected RGB data;

determining properness of the evaluation target color correction parameter based on the evaluation target FRGB data and the color coordinate data; and when determining that the evaluation target color correction parameter is proper, determining the evaluation target color correction parameter to be a color correction parameter to be set to a display driver driving the display panel.

(Item 15)

The program of item 14, wherein determining the properness of the evaluation target color correction parameter comprises:

based on the evaluation target FRGB data and the color coordinate data, calculating RGB luminance component data indicating components of the primary color R, the primary color G, and the primary color B in a color displayed on the display panel when the display panel is driven according to the evaluation target FRGB data; and determining the properness of the evaluation target color correction parameter based on the RGB luminance component data.

(Item 16)

The program of item 15, wherein determining the properness of the evaluation target color correction parameter based on the RGB luminance component data comprises determining the properness of the evaluation target color correction parameter based on a degree of similarity between target RGB data stored in a storage device of the arithmetic unit and the RGB luminance component data.

(Item 17)

A storage medium storing the program of any one of items 14 to 16.

(Item 18)

A display system, comprising:

a display panel comprising a plurality of pixels each comprising an R subpixel displaying a primary color R, a G subpixel displaying a primary color G, a B subpixel displaying a primary color B, and an F subpixel displaying an additional color that is a color other than the primary color R, the primary color G, and the primary color B;

a display driver driving the display panel; and a host, wherein the display driver comprises:

color correction circuitry that generates color-corrected RGB data by performing color correction processing on RGB data based on a color correction parameter;

color addition circuitry that generates FRGB data comprising an F grayscale value specifying a grayscale level of the F subpixel, an R grayscale value specifying a grayscale level of the R subpixel, a G grayscale value specifying a grayscale level of the G subpixel, and a B grayscale value specifying a grayscale level of the B subpixel, by performing color addition processing on the color-corrected RGB data;

a driver that drives the display panel based on the FRGB data; and a nonvolatile memory that stores, in a nonvolatile manner, color coordinate data indicating color coordinates of a displayed color in a predetermined color space displayed on the display panel when the R subpixels, the G subpixels, and the B subpixels are driven with drive signals corresponding to a minimum grayscale value and the F subpixels are driven with drive signals corresponding to a maximum grayscale value, wherein the host is configured to receive the color coordinate data from the display driver; determine an evaluation target color correction parameter; generate evaluation target color-corrected RGB data by performing the color correction processing on calibration target RGB data, based on the evaluation target color correction parameter; generate evaluation target FRGB data by performing the color addition processing on the evaluation target color-corrected RGB data; determine properness of the evaluation target color correction parameter based on the evaluation target FRGB data and the color coordinate data; determine the evaluation target color correction parameter to be the color correction parameter to be set to the display driver when determining that the evaluation target color correction parameter is proper; and transfer the color correction parameter to be set to the display driver to the display driver.

(Item 19)

The display system according to item 18, wherein the host is configured to calculate, based on the evaluation target FRGB data and the color coordinate data, RGB luminance component data indicating components of the primary color R, the primary color G, and the primary color B of a color displayed on the display panel when the display panel is driven according to the evaluation target FRGB data; and determine the properness of the evaluation target color correction parameter based on the RGB luminance component data.

(Item 20)

The display system according to Item 19, wherein the host stores target RGB data associated with the calibration target RGB data, and wherein the host determines the properness of the evaluation target color correction parameter based on a degree of similarity between the RGB luminance component data and the target RGB data.

While embodiments of the present disclosure are specifically described above, it would be apparent to a person skilled in the art that the technologies described herein may be implemented with various modifications. It should be particularly noted that the technologies described herein are applicable to not only a display driver configured as a dedicated semiconductor integrated circuit that drives a display panel but also a display driver into which a touch panel controller performing an operation for touch detection of a touch panel is monolithically (that is, on the same chip) integrated.

This application claims the benefit of Japanese Patent Application No. 2017-118497, filed on Jun. 16, 2017, and Japanese Patent Application No. 2017-119507, filed on Jun. 19, 2017, the disclosures of which are incorporated herein in their entirety by reference.

What is claimed is:

1. A method comprising:

acquiring first color coordinate data of a first displayed color in a predetermined color space displayed on a display panel in response to an R subpixel, a G subpixel, and a B subpixel being driven with drive signals corresponding to a minimum grayscale value and an F subpixel being driven with a drive signal corresponding to a maximum grayscale value;

performing, until a determination is made of a RGB luminance component data being equal to or within a threshold of target RGB data:

generating evaluation target color-corrected RGB data by applying a color correction processing to a calibration target RGB data in accordance with an evaluation target color correction parameter;

generating evaluation target FRGB data by applying a color addition processing to the evaluation target color-corrected RGB data;

determining, based on the evaluation target FRGB data and the first color coordinate data, the RGB luminance component data that represents, in an RGB format, a color displayed on the display panel when the display panel is driven in response to the evaluation target FRGB data; and adjusting the evaluation target color correction parameter to a different color correction parameter when the RGB luminance component data is neither equal to nor within the threshold of the target RGB data; and determining the evaluation target color correction parameter is a color correction parameter.

2. The method of claim 1, wherein the evaluation target color correction parameter specifies how the color correction processing is performed.

3. The method of claim 1, wherein the evaluation target color correction parameter specifies a degree of emphasis on each primary color and a degree of emphasis on saturation.

4. The method of claim 1, further comprising:
preparing the calibration target RGB data, and the target RGB data that represents a target color to be achieved from applying the color correction processing and the color addition processing to the calibration target RGB data.

5. The method of claim 1, further comprising:
applying a color space transformation matrix to color coordinates of the first displayed color in an XYZ color system, wherein the color transformation matrix indicates display characteristics of the display panel when an image is displayed by using the R subpixel, the G subpixel, and the B subpixel without using the F subpixel.

6. The method of claim 1,
wherein the RGB luminance component data comprises a red component value, a green component value, and a blue component value when the display panel is driven in response to the evaluation target FRGB data, and
wherein the evaluation target FRGB data comprises a grayscale value for each of the F subpixel, R subpixel, G subpixel, and B subpixel.

7. The method of claim 1, further comprising:
acquiring second color coordinate data of a second displayed color in a color space displayed on the display panel in response to the R subpixel, the G subpixel, and the B subpixel being driven with drive signals corresponding to the minimum grayscale value and the F subpixel being driven with a drive signal corresponding to an intermediate grayscale value greater than the minimum grayscale value and less than the maximum grayscale value; and
calculating the RGB luminance component data using the intermediate grayscale value.

8. A non-transitory tangible computer-readable recording medium comprising a program for determining a color correction parameter for a display driver adapted to a display panel, the display panel comprising a plurality of pixels each including an R subpixel, a G subpixel, a B subpixel, and an F subpixel, wherein the program causes circuitry to execute operations comprising:

acquiring color coordinate data of a first displayed color in a predetermined color space displayed on the display panel in response to the R subpixel, the G subpixel, and the B subpixel being driven with drive signals corresponding to a minimum grayscale value and the F subpixel being driven with a drive signal corresponding to a maximum grayscale value;

performing, until a determination is made of a RGB luminance component data being equal or within a threshold of target RGB data:
generating evaluation target color-corrected RGB data by applying a color correction processing to a calibration target RGB data in accordance with an evaluation target color correction parameter;
generating evaluation target FRGB data by applying a color addition processing to the evaluation target color-corrected RGB data;
determining, based on the evaluation target FRGB data and the color coordinate data, the RGB luminance component data that represents, in an RGB format, a color displayed on the display panel when the display panel is driven in response to the evaluation target FRGB data; and
adjusting the evaluation target color correction parameter to a different color correction parameter when the RGB luminance component data is neither equal nor within the threshold of the target RGB data; and determining the evaluation target color correction parameter is the color correction parameter.

9. The non-transitory tangible computer-readable recording medium of claim 8, wherein the evaluation target color correction parameter specifies how the color correction processing is performed.

10. The non-transitory tangible computer-readable recording medium of claim 8, wherein the evaluation target color correction parameter specifies a degree of emphasis on each primary color and a degree of emphasis on saturation.

11. The non-transitory tangible computer-readable recording medium of claim 8, wherein the operations further comprise:
preparing the calibration target RGB data, and the target RGB data that represents a target color to be achieved from applying the color correction processing and the color addition processing to the calibration target RGB data.

12. The non-transitory tangible computer-readable recording medium of claim 8, wherein the operations further comprise:
applying a color space transformation matrix to color coordinates of the first displayed color in an XYZ color system, wherein the color transformation matrix indicates display characteristics of the display panel when an image is displayed by using the R subpixel, the G subpixel, and the B subpixel without using the F subpixel.

13. The non-transitory tangible computer-readable recording medium of claim 8,
wherein the RGB luminance component data comprises a red component value, a green component value, and a blue component value when the display panel is driven in response to the evaluation target FRGB data, and
wherein the evaluation target FRGB data comprises a grayscale value for each of the F subpixel, R subpixel, G subpixel, and B subpixel.

14. The non-transitory tangible computer-readable recording medium of claim 8, wherein the operations further comprise:
  acquiring second color coordinate data of a second displayed color in a color space displayed on the display panel in response to the R subpixel, the G subpixel, and the B subpixel being driven with drive signals corresponding to the minimum grayscale value and the F subpixel being driven with a drive signal corresponding to an intermediate grayscale value greater than the minimum grayscale value and less than the maximum grayscale value; and
  calculating the RGB luminance component data using the intermediate grayscale value.

15. A display system, comprising:
  a display panel comprising a plurality of pixels each including an R subpixel, a G subpixel, a B subpixel, and an F subpixel;
  a display driver configured to drive the display panel; and
  a host,
  wherein the display driver comprises:
    color correction circuitry configured to generate color-corrected RGB data by applying color correction processing in accordance with a color correction parameter that specifies how the color correction processing is to be performed;
    color addition circuitry configured to generate FRGB data through applying color addition processing to the color-corrected RGB data;
    a driver configured to drive the display panel based on the FRGB data; and
    a nonvolatile memory configured to store, in a nonvolatile manner, color coordinate data of a displayed color in a predetermined color space displayed on the display panel in response to the R subpixel, the G subpixel, and the B subpixel being driven with drive signals corresponding to a minimum grayscale value and the F subpixel being driven with a drive signal corresponding to a maximum grayscale value, and
  wherein the host is configured to perform operations comprising:
    performing, until a determination is made of a RGB luminance component data being equal or within a threshold of target RGB data:
      generating evaluation target color-corrected RGB data by applying a color correction processing to a calibration target RGB data in accordance with an evaluation target color correction parameter;
      generating evaluation target FRGB data by applying a color addition processing to the evaluation target color-corrected RGB data;
      determining, based on the evaluation target FRGB data and the color coordinate data, the RGB luminance component data that represents, in an RGB format, a color displayed on the display panel when the display panel is driven in response to the evaluation target FRGB data; and
      adjusting the evaluation target color correction parameter to a different color correction parameter when the RGB luminance component data is neither equal nor within the threshold of the target RGB data; and
    determining the evaluation target color correction parameter is the color correction parameter.

16. The display system of claim 15, wherein the evaluation target color correction parameter specifies how the color correction processing is performed.

17. The display system of claim 15, wherein the evaluation target color correction parameter specifies a degree of emphasis on each primary color and a degree of emphasis on saturation.

18. The display system of claim 15, wherein the operations further comprise:
  preparing the calibration target RGB data, and the target RGB data that represents a target color to be achieved from applying the color correction processing and the color addition processing to the calibration target RGB data.

19. The display system of claim 15, wherein the operations further comprise:
  applying a color space transformation matrix to color coordinates of the first displayed color in an XYZ color system, wherein the color transformation matrix indicates display characteristics of the display panel when an image is displayed by using the R subpixel, the G subpixel, and the B subpixel without using the F subpixel.

20. The display system of claim 15,
  wherein the RGB luminance component data comprises a red component value, a green component value, and a blue component value when the display panel is driven in response to the evaluation target FRGB data, and
  wherein the evaluation target FRGB data comprises a grayscale value for each of the F subpixel, R subpixel, G subpixel, and B subpixel.

\* \* \* \* \*